(12) United States Patent
Wang et al.

(10) Patent No.: US 11,606,758 B2
(45) Date of Patent: *Mar. 14, 2023

(54) TECHNIQUES FOR POWER CONTROL USING CARRIER AGGREGATION IN WIRELESS COMMUNICATIONS

(71) Applicant: QUALCOMM Incorporated, San Diego, CA (US)

(72) Inventors: Xiao Feng Wang, San Diego, CA (US); Peter Gaal, San Diego, CA (US); Wanshi Chen, San Diego, CA (US); Seyedkianoush Hosseini, San Diego, CA (US); Tao Luo, San Diego, CA (US); Juan Montojo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,135

(22) Filed: Sep. 20, 2021

(65) Prior Publication Data
US 2022/0000224 A1 Jan. 6, 2022

Related U.S. Application Data

(60) Division of application No. 16/921,737, filed on Jul. 6, 2020, which is a continuation of application No.
(Continued)

(51) Int. Cl.
*H04W 52/14* (2009.01)
*H04L 5/00* (2006.01)
(Continued)

(52) U.S. Cl.
CPC ......... *H04W 52/146* (2013.01); *A44C 5/0069* (2013.01); *H04L 5/001* (2013.01);
(Continued)

(58) Field of Classification Search
CPC ..... H04L 5/001; H04L 5/0053; H04L 5/0048; H04L 1/1812; H04L 5/0094; H04L 5/14;
(Continued)

(56) References Cited

U.S. PATENT DOCUMENTS 9,521,632 B2 12/2016 Narasimha et al.
9,615,339 B2 4/2017 Dinan
(Continued)

FOREIGN PATENT DOCUMENTS

CN 102282903 A 12/2011
CN 102301800 B 3/2014
(Continued)

OTHER PUBLICATIONS

Huawei, et al., "sTTI Combinations in CA Scenarios", 3GPP TSG RAN WG1 Meeting #90, R1-1712072, Aug. 21-25, 2017, 5 pages.
(Continued)

*Primary Examiner* — Golam Sorowar
(74) *Attorney, Agent, or Firm* — Holland & Hart LLP/Qualcomm Incorporated

(57) ABSTRACT

Methods, systems, and devices for wireless communications are described that provide for managing transmissions using multiple component carriers (CCs) in which transmissions using one or more of the CCs may span less than a full transmission time of a slot or other transmission time interval. A UE may signal a capability to transmit such transmissions, and one or more capabilities related to carrier aggregation that may be used by a base station for scheduling of transmissions on different CCs. In the event that overlapping transmissions on two or more CCs exceed a maximum power threshold, various techniques for dropping at least a portion of one or more transmissions of one or more CCs are described.

36 Claims, 25 Drawing Sheets

Related U.S. Application Data

15/974,372, filed on May 8, 2018, now Pat. No. 10,708,865.

(60) Provisional application No. 62/588,205, filed on Nov. 17, 2017, provisional application No. 62/588,164, filed on Nov. 17, 2017.

(51) Int. Cl.
| | |
|---|---|
| *H04W 52/34* | (2009.01) |
| *H04W 56/00* | (2009.01) |
| *A44C 5/00* | (2006.01) |
| *H04W 16/14* | (2009.01) |
| *H04W 28/06* | (2009.01) |
| *H04W 52/36* | (2009.01) |
| *H04W 72/04* | (2009.01) |
| *H04W 72/14* | (2009.01) |
| *H04W 52/16* | (2009.01) |
| *H04W 72/12* | (2009.01) |
| *H04W 52/28* | (2009.01) |
| *H04W 72/10* | (2009.01) |
| *H04W 72/0446* | (2023.01) |

(52) U.S. Cl.
CPC .......... *H04L 5/0053* (2013.01); *H04L 5/0082* (2013.01); *H04L 5/0094* (2013.01); *H04W 16/14* (2013.01); *H04W 28/065* (2013.01); *H04W 52/16* (2013.01); *H04W 52/34* (2013.01); *H04W 52/346* (2013.01); *H04W 52/367* (2013.01); *H04W 56/005* (2013.01); *H04W 72/0406* (2013.01); *H04W 72/14* (2013.01); *H04L 5/0023* (2013.01); *H04W 52/281* (2013.01); *H04W 72/0446* (2013.01); *H04W 72/10* (2013.01); *H04W 72/1284* (2013.01)

(58) Field of Classification Search
CPC ... H04L 5/0023; H04L 5/0007; H04L 5/0091; H04L 5/0051; H04L 5/0055; H04L 5/0092; H04L 27/18; H04L 5/0078; H04L 61/6022; H04L 69/22; H04L 5/0044; H04L 5/005; H04L 5/0073; H04L 1/0004; H04L 1/0006; H04L 1/0021; H04L 1/0029; H04L 1/003; H04L 1/0031; H04L 1/0038; H04L 1/0073; H04L 1/1825; H04L 25/00; H04L 25/0228; H04L 27/2657; H04L 27/2689; H04L 41/08; H04L 41/0813; H04L 41/0836; H04L 5/0012; H04W 8/22; H04W 88/06; H04W 28/0278; H04W 52/267; H04W 56/0005; H04W 72/121; H04W 72/1263; H04W 74/0808; H04W 74/0816; H04W 28/0236; H04W 52/0251; H04W 52/241; H04W 52/247; H04W 52/248; H04W 52/343; H04W 52/386; H04W 52/58; H04W 72/082; H04W 72/1294; H04W 76/28; H04W 28/0215; H04W 36/0069; H04W 52/0235; H04W 52/06; H04W 52/14; H04W 52/265; H04W 72/00; H04W 72/04; H04W 72/12; H04W 72/1205; H04W 72/1247; H04W 74/04; H04W 74/0841; H04W 76/20; H04W 24/02; H04W 28/02; H04W 4/70; H04W 48/16; H04W 88/08; H04W 16/02; H04W 16/28
See application file for complete search history.

(56) References Cited

U.S. PATENT DOCUMENTS

| | | |
|---|---|---|
| 9,749,970 B2 | 8/2017 | Vajapeyam et al. |
| 9,820,283 B2 | 11/2017 | Dinan |
| 9,844,006 B2 | 12/2017 | Dinan |
| 9,900,923 B2 | 2/2018 | Damnjanovic et al. |
| 9,955,462 B2 | 4/2018 | Chen et al. |
| 10,098,059 B2 | 10/2018 | Ly et al. |
| 10,153,871 B2 | 12/2018 | Dinan |
| 10,285,028 B2 | 5/2019 | Chincholi et al. |
| 10,517,045 B2 | 12/2019 | Wang et al. |
| 10,708,865 B2 | 7/2020 | Wang et al. |
| 2011/0261759 A1 | 10/2011 | Yamada et al. |
| 2011/0280169 A1 | 11/2011 | Seo et al. |
| 2013/0010712 A1 | 1/2013 | Kim et al. |
| 2013/0028149 A1 | 1/2013 | Chen et al. |
| 2013/0064165 A1 | 3/2013 | Chen et al. |
| 2013/0089062 A1 | 4/2013 | Ahn et al. |
| 2013/0114505 A1 | 5/2013 | Haim et al. |
| 2013/0114572 A1 | 5/2013 | Fong et al. |
| 2013/0148619 A1 | 6/2013 | Ahn et al. |
| 2013/0279433 A1 | 10/2013 | Dinan |
| 2014/0016593 A1 | 1/2014 | Park et al. |
| 2014/0050194 A1 | 2/2014 | Gaal et al. |
| 2014/0086050 A1 | 3/2014 | Swann et al. |
| 2014/0105141 A1 | 4/2014 | Noh et al. |
| 2014/0198765 A1 | 7/2014 | Krishnamurthy et al. |
| 2014/0250479 A1 | 9/2014 | Lee et al. |
| 2014/0314014 A1 | 10/2014 | Zhang et al. |
| 2015/0031410 A1 | 1/2015 | Lim et al. |
| 2015/0124673 A1 | 5/2015 | Ouchi et al. |
| 2015/0201388 A1* | 7/2015 | Cheng .................. H04L 1/1887 370/329 |
| 2015/0236834 A1 | 8/2015 | Seo et al. |
| 2015/0271765 A1 | 9/2015 | Hakola et al. |
| 2015/0334702 A1 | 11/2015 | Ji et al. |
| 2016/0081022 A1 | 3/2016 | Haneji et al. |
| 2016/0100420 A1 | 4/2016 | Chen et al. |
| 2016/0192349 A1 | 6/2016 | Wei et al. |
| 2016/0219558 A1 | 7/2016 | Bertrand et al. |
| 2016/0234830 A1 | 8/2016 | Kim et al. |
| 2016/0255593 A1* | 9/2016 | Blankenship ......... H04L 5/0003 370/328 |
| 2016/0255601 A1 | 9/2016 | Axmon et al. |
| 2016/0278072 A1 | 9/2016 | Palle et al. |
| 2016/0286559 A1 | 9/2016 | Abedini et al. |
| 2016/0295560 A1 | 10/2016 | Chen et al. |
| 2016/0302203 A1 | 10/2016 | Liu et al. |
| 2016/0330676 A1 | 11/2016 | Thangarasa et al. |
| 2016/0330782 A1 | 11/2016 | Ang et al. |
| 2016/0353387 A1 | 12/2016 | Gao et al. |
| 2017/0013565 A1 | 1/2017 | Pelletier et al. |
| 2017/0041882 A1 | 2/2017 | Chae et al. |
| 2017/0079028 A1 | 3/2017 | Dinan |
| 2017/0094680 A1 | 3/2017 | Patel et al. |
| 2017/0142668 A1 | 5/2017 | Takeda et al. |
| 2017/0195890 A1 | 7/2017 | Chen et al. |
| 2017/0223635 A1 | 8/2017 | Dinan |
| 2017/0223676 A1 | 8/2017 | Dinan et al. |
| 2017/0280507 A1 | 9/2017 | Wang |
| 2017/0302419 A1 | 10/2017 | Liu et al. |
| 2017/0325225 A1 | 11/2017 | Dinan |
| 2018/0014255 A1* | 1/2018 | Pelletier .............. H04W 52/343 |
| 2018/0014262 A1 | 1/2018 | Lee et al. |
| 2018/0131479 A1 | 5/2018 | Chen et al. |
| 2018/0249420 A1 | 8/2018 | Lim et al. |
| 2018/0288760 A1 | 10/2018 | Lee et al. |
| 2018/0343624 A1 | 11/2018 | Akula et al. |
| 2019/0007171 A1* | 1/2019 | Gao .................... H04L 1/1671 |
| 2019/0014596 A1* | 1/2019 | Yang .................... H04W 74/08 |
| 2019/0021107 A1 | 1/2019 | Negro et al. |
| 2019/0082408 A1 | 3/2019 | Kim et al. |
| 2019/0098622 A1 | 3/2019 | Lee et al. |
| 2019/0104477 A1 | 4/2019 | Molavianjazi et al. |
| 2019/0159134 A1 | 5/2019 | Wang et al. |
| 2019/0159135 A1 | 5/2019 | Molavianjazi et al. |
| 2019/0159140 A1 | 5/2019 | Wang et al. |

(56) References Cited

U.S. PATENT DOCUMENTS

| | | |
|---|---|---|
| 2019/0191459 A1 | 6/2019 | Kim et al. |
| 2020/0037256 A1 | 1/2020 | Wang et al. |
| 2020/0077437 A1 | 3/2020 | Stern-Berkowitz et al. |
| 2020/0329832 A1 | 10/2020 | Wang et al. |

FOREIGN PATENT DOCUMENTS

| | | |
|---|---|---|
| CN | 106134263 A | 11/2016 |
| TW | 201701634 A | 1/2017 |
| TW | 201722184 A | 6/2017 |
| TW | 201722190 A | 6/2017 |
| TW | 201739296 A | 11/2017 |
| WO | WO2015065855 A1 | 5/2015 |
| WO | WO2015116866 A1 | 8/2015 |
| WO | WO2016048597 | 3/2016 |
| WO | WO2016053660 A1 | 4/2016 |
| WO | WO2016137816 A2 | 9/2016 |
| WO | WO2017136666 | 8/2017 |
| WO | WO2017189118 | 11/2017 |

OTHER PUBLICATIONS

Huawei, et al: "UL Power Control for Short TTI," 3GPP Draft; R1-1706999, 3rd Generation Partnership Project (3GPP), Mobile Competence Centre; 650, Route Des Lucioles; F-06921 Sophia-Antipolis Cedex; France, vol. RAN WG1, no. Hangzhou, China; May 15, 2017-May 19, 2017, May 14, 2017, XP051272229, 5 pages, Retrieved from the Internet: URL: http://www.3gpp.org/ftp/Meetings_3GPP_SYNC/RAN1/Docs/ [retrieved on May 14, 2017].
International Search Report and Written Opinion—PCT/US2018/056177—ISA/EPO—dated Jan. 17, 2019.
International Preliminary Report on Patentability—PCT/US2018/056177, The International Bureau of WIPO—Geneva, Switzerland, dated May 28, 2020.
International Preliminary Report on Patentability—PCT/US2018/056201, The International Bureau of WIPO—Geneva, Switzerland, dated May 28, 2020.
International Search Report and Written Opinion—PCT/US2018/056201—ISA/EPO—dated Mar. 18, 2019.
PANTECH: "Parallel SRS transmission in multiple TA" 3GPP Draft; R1-125252, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 2, 2012-Nov. 16, 2012, Nov. 13, 2012 (Nov. 13, 2012), XP050663107, 4 Pages, Retrieved from the Internet: URL: http://www.3gpp.org/ftp/tsg_ran/WG1_RL1/TSGR1_71/Docs/ [retrieved on Nov. 13, 2012].
Partial International Search Report—PCT/US2018/056201—ISA/EPO—dated Jan. 15, 2019.
Taiwan Search Report—TW107136523—TIPO—dated Apr. 14, 2021.
Taiwan Search Report—TW107136521—TIPO—dated Aug. 7, 2020.
VIVO: "Remaining Issues on NR UL Power Control," 3GPP TSG RAN WG1 Meeting #90bis, R1-1717508, Oct. 9-13, 2017, 5 pages.

\* cited by examiner

TECHNIQUES FOR POWER CONTROL USING CARRIER AGGREGATION IN WIRELESS COMMUNICATIONS

CROSS REFERENCES

The present Applications for Patent is a Divisional of U.S. patent application Ser. No. 16/921,737 by WANG et al., entitled "TECHNIQUES FOR POWER CONTROL USING CARRIER AGGREGATION IN WIRELESS COMMUNICATIONS" filed Jul. 6, 2020, which is a Continuation of U.S. patent application Ser. No. 15/974,372 by WANG et al., entitled "TECHNIQUES FOR POWER CONTROL USING CARRIER AGGREGATION IN WIRELESS COMMUNICATIONS" filed May 8, 2018, which claims priority to U.S. Provisional Patent Application No. 62/588,164 by WANG et al., entitled "TECHNIQUES FOR POWER CONTROL USING CARRIER AGGREGATION IN WIRELESS COMMUNICATIONS," filed Nov. 17, 2017, and to U.S. Provisional Patent Application No. 62/588,205 by WANG et al., entitled "TECHNIQUES FOR POWER CONTROL USING CARRIER AGGREGATION IN WIRELESS COMMUNICATIONS," filed Nov. 17, 2017, each of which is assigned to the assignee hereof. Each of these applications is incorporated by reference herein.

BACKGROUND

The following relates generally to wireless communication, and more specifically to techniques for power control using carrier aggregation in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support communication between a UE and a base station on multiple aggregated component carriers (CCs), a feature referred to as carrier aggregation. In some cases, a UE may transmit uplink signals on different carriers during transmission time intervals (TTIs) having different durations. Additionally, the UE may transmit the uplink signals in accordance with a maximum transmit power limit. In such cases, however, it may be challenging for the UE to identify appropriate uplink power to be used for multiple CCs within bounds of a maximum transmit power limit. Further, in some cases UEs having different capabilities associated with transmissions using multiple CCs may be present in a wireless communications system, and thus uniform treatment of all UEs may not fully utilize capabilities of some UEs. Thus, efficient determination of uplink transmit power and considerations of UE capabilities in network management may enhance efficiency of a wireless communications system.

SUMMARY

The described techniques relate to improved methods, systems, devices, or apparatuses that support techniques for power control using carrier aggregation in wireless communications. Various described techniques provide for managing transmissions using multiple component carriers (CCs) in which transmissions using one or more of the CCs may span less than a full transmission time interval (TTI) such as a transmission slot, subframe, or other TTI. In some cases a UE may, in accordance with some techniques described herein, signal one or more capabilities related to carrier aggregation that may be used by a base station for scheduling of transmissions on different CCs. In some cases, a UE may signal a capability indication to a base station of a capability of the UE for supporting transmissions that have different starting times or durations on different CCs.

In some cases, a UE may support CCs in which different CCs may belong to different timing advance groups (TAGs) such that starting times of TTIs (e.g., symbols, slots, subframes, of combinations thereof) may be unsynchronized up to a certain threshold. Such synchronization offsets may result in transmit powers at a UE having transient values that may exceed a maximum power threshold, and in some cases a UE may provide an indication to a UE of an overlap threshold that indicates an amount of time that UE transmit power can exceed the maximum power threshold.

In some cases, a UE may also perform power control for multiple CCs to provide uplink transmit powers that comply with the maximum power threshold where transmissions of different CCs may have different start times, different stop times, different durations, or combinations thereof. In some cases, a UE may receive a number of grants of uplink resources for a plurality of uplink transmissions on two or more CCs during a slot, and determine that a transmit power to transmit the uplink transmissions exceeds the maximum power threshold for the UE during at least a portion of the slot. The UE may, responsive to such a determination, drop at least a portion of a first uplink transmission of the number of uplink transmissions, where a resulting transmit power is less than or equal to the maximum power threshold, and transmit remaining uplink transmissions of the number of uplink transmissions during the slot using one or more of the CCs. Additionally or alternatively, the UE may scale a transmit power of one or more of the CCs for at least a portion of the slot such that the UE transmit power is less than or equal to the maximum power threshold. In some cases, the UE may perform look-ahead power scaling for uplink grants received at least a predetermined time in advance of a start of a slot.

A method of wireless communication is described. The method may include establishing, at a UE, a connection with a base station, the connection supporting two or more CCs within a TAG, identifying, at the UE, a capability for supporting transmissions that have different starting times or durations on different CCs, and transmitting an indication of the capability to the base station.

An apparatus for wireless communication is described. The apparatus may include means for establishing, at a UE, a connection with a base station, the connection supporting two or more CCs within a TAG, means for identifying, at the UE, a capability for supporting transmissions that have different starting times or durations on different CCs, and means for transmitting an indication of the capability to the base station.

Another apparatus for wireless communication is described. The apparatus may include a processor, memory in electronic communication with the processor, and instructions stored in the memory. The instructions may be operable to cause the processor to establish, at a UE, a connection with a base station, the connection supporting two or more CCs within a TAG, identify, at the UE, a capability for supporting transmissions that have different starting times or durations on different CCs, and transmit an indication of the capability to the base station.

A non-transitory computer-readable medium for wireless communication is described. The non-transitory computer-readable medium may include instructions operable to cause a processor to establish, at a UE, a connection with a base station, the connection supporting two or more CCs within a TAG, identify, at the UE, a capability for supporting transmissions that have different starting times or durations on different CCs, and transmit an indication of the capability to the base station.

In some examples of the method, apparatus, and non-transitory computer-readable medium described above, the identifying comprises identifying the capability for supporting transmissions that may have different starting times or durations for each of a plurality of different frequency bands or combinations of different frequency bands.

In some examples of the method, apparatus, and non-transitory computer-readable medium described above, the capability for supporting different starting times or durations for each of the plurality of different frequency bands or combinations of different frequency bands may be determined based at least in part on a number of RF chains available for transmissions at the UE. In some examples of the method, apparatus, and non-transitory computer-readable medium described above, the plurality of different frequency bands or combinations of different frequency bands include intra-band contiguous carrier frequencies per RF chain at the UE. In some examples of the method, apparatus, and non-transitory computer-readable medium described above, the plurality of different frequency bands or combinations of different frequency bands include intra-band noncontiguous or inter-band carrier frequencies for multiple RF chains at the UE.

A method of wireless communication is described. The method may include establishing, at a UE, a connection with a base station, the connection supporting two or more CCs within different TAGs, identifying, at the UE, an overlap threshold corresponding to an amount of time that is exempt from a power control limit in which a new transmission on a first CC of a first TAG can overlap with a last portion of an existing transmission on a second CC of a second TAG, and transmitting an indication of the overlap threshold to the base station.

An apparatus for wireless communication is described. The apparatus may include means for establishing, at a UE, a connection with a base station, the connection supporting two or more CCs within different TAGs, means for identifying, at the UE, an overlap threshold corresponding to an amount of time that is exempt from a power control limit in which a new transmission on a first CC of a first TAG can overlap with a last portion of an existing transmission on a second CC of a second TAG, and means for transmitting an indication of the overlap threshold to the base station.

Another apparatus for wireless communication is described. The apparatus may include a processor, memory in electronic communication with the processor, and instructions stored in the memory. The instructions may be operable to cause the processor to establish, at a UE, a connection with a base station, the connection supporting two or more CCs within different TAGs, identify, at the UE, an overlap threshold corresponding to an amount of time that is exempt from a power control limit in which a new transmission on a first CC of a first TAG can overlap with a last portion of an existing transmission on a second CC of a second TAG, and transmit an indication of the overlap threshold to the base station.

A non-transitory computer-readable medium for wireless communication is described. The non-transitory computer-readable medium may include instructions operable to cause a processor to establish, at a UE, a connection with a base station, the connection supporting two or more CCs within different TAGs, identify, at the UE, an overlap threshold corresponding to an amount of time that is exempt from a power control limit in which a new transmission on a first CC of a first TAG can overlap with a last portion of an existing transmission on a second CC of a second TAG, and transmit an indication of the overlap threshold to the base station.

In some examples of the method, apparatus, and non-transitory computer-readable medium described above, a transmit power of the UE can exceed a maximum transmit power threshold for a time period up to the overlap threshold. In some examples of the method, apparatus, and non-transitory computer-readable medium described above, the overlap threshold applies to a start or an end of a transmission on one or more of the CCs.

Some examples of the method, apparatus, and non-transitory computer-readable medium described above may further include processes, features, means, or instructions for receiving grants of uplink resources for uplink transmissions in consecutive slots on the first CC and the second CC. Some examples of the method, apparatus, and non-transitory computer-readable medium described above may further include processes, features, means, or instructions for determining that a timing difference between the first CC and the second CC exceeds the overlap threshold. Some examples of the method, apparatus, and non-transitory computer-readable medium described above may further include processes, features, means, or instructions for modifying an uplink transmission of one or both of the first CC or second CC based at least in part on the timing difference. The modifying may include one of dropping a first CC transmission that ends at a slot boundary between the consecutive slots, dropping a second CC transmission that starts at the slot boundary, reducing a transmit power of the first CC transmission, the second CC transmission, or both, dropping a last symbol of a the first CC transmission, or dropping a first symbol of the second CC transmission.

Some examples of the method, apparatus, and non-transitory computer-readable medium described above may further include processes, features, means, or instructions for selecting, prior to the modifying, the first CC transmission or the second CC transmission to be dropped or transmitted with reduced power based at least in part on a priority associated with each of the first CC transmission and the second CC transmission.

A method of wireless communication is described. The method may include establishing a connection with a UE having two or more CCs within a TAG or in different TAGs, receiving an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG, scheduling a plurality uplink transmissions for the UE using the two or more CCs based at least in part on the indication and overlap threshold, and transmitting a plurality of uplink grants to the UE that include resource grants for the plurality of uplink transmissions.

An apparatus for wireless communication is described. The apparatus may include means for establishing a connection with a UE having two or more CCs within a TAG or in different TAGs, means for receiving an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG, means for scheduling a plurality uplink transmissions for the UE using the two or more CCs based at least in part on the indication and overlap threshold, and means for transmitting a plurality of uplink grants to the UE that include resource grants for the plurality of uplink transmissions.

Another apparatus for wireless communication is described. The apparatus may include a processor, memory in electronic communication with the processor, and instructions stored in the memory. The instructions may be operable to cause the processor to establish a connection with a UE having two or more CCs within a TAG or in different TAGs, receive an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG, schedule a plurality uplink transmissions for the UE using the two or more CCs based at least in part on the indication and overlap threshold, and transmit a plurality of uplink grants to the UE that include resource grants for the plurality of uplink transmissions.

A method of wireless communication is described. The method may include determining, at a UE, that a transmit power to transmit a plurality of uplink transmissions via two or more component carriers (CCs) in a slot exceeds a maximum power threshold for the UE during at least a portion of the slot, dropping at least a portion of a first uplink transmission of the plurality of uplink transmissions, where a resulting transmit power is less than or equal to the maximum power threshold, and transmitting remaining uplink transmissions of the plurality of uplink transmissions during the slot using one or more of the CCs.

An apparatus for wireless communication is described. The apparatus may include means for determining that a transmit power to transmit a plurality of uplink transmissions via two or more CCs in a slot exceeds a maximum power threshold for the UE during at least a portion of the slot, means for dropping at least a portion of a first uplink transmission of the plurality of uplink transmissions, where a resulting transmit power is less than or equal to the maximum power threshold, and means for transmitting remaining uplink transmissions of the plurality of uplink transmissions during the slot using one or more of the CCs.

Another apparatus for wireless communication is described. The apparatus may include a processor, memory in electronic communication with the processor, and instructions stored in the memory. The instructions may be operable to cause the processor to determine that a transmit power to transmit a plurality of uplink transmissions via two or more CCs in a slot exceeds a maximum power threshold for the UE during at least a portion of the slot, drop at least a portion of a first uplink transmission of the plurality of uplink transmissions, where a resulting transmit power is less than or equal to the maximum power threshold, and transmit remaining uplink transmissions of the plurality of uplink transmissions during the slot using one or more of the CCs.

A non-transitory computer-readable medium for wireless communication is described. The non-transitory computer-readable medium may include instructions operable to cause a processor to determine that a transmit power to transmit a plurality of uplink transmissions via two or more CCs in a slot exceeds a maximum power threshold for the UE during at least a portion of the slot, drop at least a portion of a first uplink transmission of the plurality of uplink transmissions, where a resulting transmit power is less than or equal to the maximum power threshold, and transmit remaining uplink transmissions of the plurality of uplink transmissions during the slot using one or more of the CCs.

In some examples of the method, apparatus, and non-transitory computer-readable medium described above, the determining may be performed for each symbol of a plurality of symbols of the slot. In some examples of the method, apparatus, and non-transitory computer-readable medium described above, the determining and dropping may be performed when formatting the plurality of uplink transmissions for transmission during the slot.

Some examples of the method, apparatus, and non-transitory computer-readable medium described above may further include processes, features, means, or instructions for identifying a priority associated with two or more overlapping uplink transmissions that may have an aggregate power that exceeds the maximum power threshold. Some examples of the method, apparatus, and non-transitory computer-readable medium described above may further include processes, features, means, or instructions for dropping the first uplink transmission based at least in part on the first uplink transmission having a priority that may be lower than a priority of other of the two or more overlapping uplink transmissions.

Some examples of the method, apparatus, and non-transitory computer-readable medium described above may further include processes, features, means, or instructions for identifying a first subset of uplink transmissions of the plurality of uplink transmissions that may have a first priority that may be lower than at least a second priority of one or more other subsets of the plurality of uplink transmissions, the first subset including the first uplink transmission. Some examples of the method, apparatus, and non-transitory computer-readable medium described above may further include processes, features, means, or instructions for determining that the first uplink transmission may have an associated first uplink transmit power that may be equal to or greater than a difference between the maximum power threshold and an aggregate power of other of the plurality of uplink transmissions that may be overlapping with the first uplink transmission. Some examples of the method, apparatus, and non-transitory computer-readable medium described above may further include processes, features, means, or instructions for dropping the first uplink transmission.

Some examples of the method, apparatus, and non-transitory computer-readable medium described above may further include processes, features, means, or instructions for identifying a first symbol of the slot in which overlapping uplink transmissions may have an aggregate transmit power that exceeds the maximum power threshold for the UE. Some examples of the method, apparatus, and non-transitory computer-readable medium described above may further include processes, features, means, or instructions for identifying one or more uplink transmissions of the overlapping uplink transmissions having a transmission start time that precedes the first symbol and that the first uplink transmission starts at the first symbol. Some examples of the method, apparatus, and non-transitory computer-readable medium described above may further include processes, features, means, or instructions for dropping the first uplink transmission based at least in part on the first uplink transmission starting at the first symbol.

Some examples of the method, apparatus, and non-transitory computer-readable medium described above may further include processes, features, means, or instructions for identifying a first symbol of the slot in which a set of overlapping uplink transmissions may have an aggregate transmit power that exceeds the maximum power threshold for the UE. Some examples of the method, apparatus, and non-transitory computer-readable medium described above may further include processes, features, means, or instructions for identifying a first subset of the set of overlapping uplink transmissions that may have a first priority that may be lower than at least a second priority of one or more other subsets of the set of overlapping uplink transmissions and that may have a transmit power that may be equal to or greater than a difference between the maximum power threshold and the aggregate transmit power. Some examples of the method, apparatus, and non-transitory computer-readable medium described above may further include processes, features, means, or instructions for determining that the first uplink transmission may have a minimum power among the first subset of uplink transmissions. Some examples of the method, apparatus, and non-transitory computer-readable medium described above may further include processes, features, means, or instructions for dropping the first uplink transmission.

Some examples of the method, apparatus, and non-transitory computer-readable medium described above may further include processes, features, means, or instructions for identifying a first symbol of the slot in which a set of overlapping uplink transmissions may have an aggregate transmit power that exceeds the maximum power threshold for the UE. Some examples of the method, apparatus, and non-transitory computer-readable medium described above may further include processes, features, means, or instructions for identifying a first subset of the set of overlapping uplink transmissions that may have a first priority that may be lower than at least a second priority of one or more other subsets of the set of overlapping uplink transmissions. Some examples of the method, apparatus, and non-transitory computer-readable medium described above may further include processes, features, means, or instructions for randomly selecting one or more uplink transmissions of the first subset to be dropped. Some examples of the method, apparatus, and non-transitory computer-readable medium described above may further include processes, features, means, or instructions for dropping the selected one or more uplink transmissions.

Some examples of the method, apparatus, and non-transitory computer-readable medium described above may further include processes, features, means, or instructions for identifying a first symbol of the slot in which a set of overlapping uplink transmissions may have an aggregate transmit power that exceeds the maximum power threshold for the UE. Some examples of the method, apparatus, and non-transitory computer-readable medium described above may further include processes, features, means, or instructions for identifying that at least one uplink transmission of the set of overlapping uplink transmissions may have a first priority that may be higher than at least a second priority of one or more other uplink transmissions of the set of overlapping uplink transmissions. Some examples of the method, apparatus, and non-transitory computer-readable medium described above may further include processes, features, means, or instructions for scaling a transmit power of the at least one uplink transmission such that the transmission power of the UE may be less than or equal to the maximum power threshold.

In some examples of the method, apparatus, and non-transitory computer-readable medium described above, the at least one uplink transmission includes HARQ feedback information, SR information, or combinations thereof.

In some examples of the method, apparatus, and non-transitory computer-readable medium described above, the plurality of uplink transmissions include a first subset of uplink transmissions of a first timing advance group (TAG) and a second subset of uplink transmissions of a second timing advance group, the UE bundles the first subset of uplink transmissions into a first bundled subset of uplink transmissions and the second subset of uplink transmissions into a second bundled subset of uplink transmissions, and the dropping may be performed based on the bundled subsets of uplink transmissions and a priority of the bundled subset may be set to be a highest priority of transmissions in the subset.

Some examples of the method, apparatus, and non-transitory computer-readable medium described above may further include processes, features, means, or instructions for identifying a first symbol of the slot in which a set of overlapping uplink transmissions may have an aggregate transmit power that exceeds the maximum power threshold for the UE. Some examples of the method, apparatus, and non-transitory computer-readable medium described above may further include processes, features, means, or instructions for identifying a first subset of the set of overlapping uplink transmissions having a transmission start time that precedes the first symbol and a second subset of the set of overlapping uplink transmissions that start at the first symbol. Some examples of the method, apparatus, and non-transitory computer-readable medium described above may further include processes, features, means, or instructions for determining an aggregate transmit power for the first subset. Some examples of the method, apparatus, and non-transitory computer-readable medium described above may further include processes, features, means, or instructions for determining a priority associated with each uplink transmission of the second subset. Some examples of the method, apparatus, and non-transitory computer-readable medium described above may further include processes, features, means, or instructions for adding to the first subset a highest priority uplink transmission of the second subset that may have a transmit power that may be less than or equal to a difference between the maximum power threshold and the aggregate transmit power. Some examples of the method, apparatus, and non-transitory computer-readable medium described above may further include processes, features, means, or instructions for updating the aggregate transmit power based on the added highest priority uplink transmission. Some examples of the method, apparatus, and non-transitory computer-readable medium described above may further include processes, features, means, or instructions for repeating the adding and updating until none of the remaining uplink transmissions of the second subset may have a transmit power that may be less than or equal to a difference between the maximum power threshold and the updated aggregate transmit power. Some examples of the method, apparatus, and non-transitory computer-readable medium described above may further include processes, features, means, or instructions for dropping any remaining uplink transmissions of the second subset.

In some examples of the method, apparatus, and non-transitory computer-readable medium described above, the two or more uplink transmissions of the second subset may have the highest priority, and wherein the adding comprises randomly selecting one or all of the uplink transmissions of the two or more uplink transmissions to be added to the first subset. Some examples of the method, apparatus, and non-transitory computer-readable medium described above may further include processes, features, means, or instructions for scaling, subsequent to the repeating, a transmit power of one or more remaining uplink transmission to correspond to the difference between the maximum power threshold and the updated aggregate transmit power.

Some examples of the method, apparatus, and non-transitory computer-readable medium described above may further include processes, features, means, or instructions for dropping one or more transmissions of the first subset so that a transmission in the second subset can be added without exceeding the maximum power threshold. In some examples of the method, apparatus, and non-transitory computer-readable medium described above, the dropping the one or more transmissions of the first subset further comprises dropping all transmissions of the first subset that belong to a same timing advance group.

A method of wireless communication is described. The method may include establishing, at a UE, a connection with a base station, the connection supporting two or more CCs, receiving a plurality of grants of uplink resources for a plurality of uplink transmissions on the two or more CCs during a slot, wherein the plurality of grants are received at least a predetermined time in advance of a start of the slot, determining that a transmit power to transmit the plurality of uplink transmissions exceeds a maximum power threshold for the UE during at least a portion of the slot, scaling a transmit power of at least a subset of the plurality of uplink transmissions to provide that the transmit power is less than or equal to the maximum power threshold, and transmitting the plurality of uplink transmissions during the slot using one or more of the CCs.

An apparatus for wireless communication is described. The apparatus may include means for establishing, at a UE, a connection with a base station, the connection supporting two or more CCs, means for receiving a plurality of grants of uplink resources for a plurality of uplink transmissions on the two or more CCs during a slot, wherein the plurality of grants are received at least a predetermined time in advance of a start of the slot, means for determining that a transmit power to transmit the plurality of uplink transmissions exceeds a maximum power threshold for the UE during at least a portion of the slot, means for scaling a transmit power of at least a subset of the plurality of uplink transmissions to provide that the transmit power is less than or equal to the maximum power threshold, and means for transmitting the plurality of uplink transmissions during the slot using one or more of the CCs.

Another apparatus for wireless communication is described. The apparatus may include a processor, memory in electronic communication with the processor, and instructions stored in the memory. The instructions may be operable to cause the processor to establish, at a UE, a connection with a base station, the connection supporting two or more CCs, receive a plurality of grants of uplink resources for a plurality of uplink transmissions on the two or more CCs during a slot, wherein the plurality of grants are received at least a predetermined time in advance of a start of the slot, determine that a transmit power to transmit the plurality of uplink transmissions exceeds a maximum power threshold for the UE during at least a portion of the slot, scale a transmit power of at least a subset of the plurality of uplink transmissions to provide that the transmit power is less than or equal to the maximum power threshold, and transmit the plurality of uplink transmissions during the slot using one or more of the CCs.

A non-transitory computer-readable medium for wireless communication is described. The non-transitory computer-readable medium may include instructions operable to cause a processor to establish, at a UE, a connection with a base station, the connection supporting two or more CCs, receive a plurality of grants of uplink resources for a plurality of uplink transmissions on the two or more CCs during a slot, wherein the plurality of grants are received at least a predetermined time in advance of a start of the slot, determine that a transmit power to transmit the plurality of uplink transmissions exceeds a maximum power threshold for the UE during at least a portion of the slot, scale a transmit power of at least a subset of the plurality of uplink transmissions to provide that the transmit power is less than or equal to the maximum power threshold, and transmit the plurality of uplink transmissions during the slot using one or more of the CCs.

Some examples of the method, apparatus, and non-transitory computer-readable medium described above may further include processes, features, means, or instructions for receiving an additional grant for an additional uplink transmission after the predetermined time and before the start of the slot. Some examples of the method, apparatus, and non-transitory computer-readable medium described above may further include processes, features, means, or instructions for dropping the additional uplink transmission responsive to determining that the additional uplink transmission would increase an aggregate transmit power of the UE above the maximum power threshold. Some examples of the method, apparatus, and non-transitory computer-readable medium described above may further include processes, features, means, or instructions for transmitting the additional uplink transmission responsive to determining that the additional uplink transmission would not increase an aggregate transmit power of the UE over the maximum power threshold.

In some examples of the method, apparatus, and non-transitory computer-readable medium described above, the predetermined time for receiving the plurality of grants may be preconfigured or signaled between the base station and the UE. In some examples of the method, apparatus, and non-transitory computer-readable medium described above, the predetermined time for receiving the plurality of grants may be based at least in part on a capability of the UE.

In some examples of the method, apparatus, and non-transitory computer-readable medium described above, a first CC of the two or more CCs belongs to a different timing advance group (TAG) than a second CC of the two or more CCs, and a start time of the slot of the first CC precedes an end time of a prior slot of the second CC. Some examples of the method, apparatus, and non-transitory computer-readable medium described above may further include processes, features, means, or instructions for identifying, at the UE, an overlap threshold corresponding to an amount of time that may be exempt from the maximum power threshold for the UE. Some examples of the method, apparatus, and non-transitory computer-readable medium described above may further include processes, features, means, or instructions for determining that an overlap period between the start time of the slot of the first CC and the end time of the prior slot of the second CC exceeds the overlap threshold. Some examples of the method, apparatus, and non-transitory computer-readable medium described above may further include processes, features, means, or instructions for dropping an overlapping uplink transmission of the first CC or the second CC, or performing the scaling the transmit power for uplink transmissions of each of the first CC and the second CC to provide an aggregate transmit power during the overlap period that may be less than or equal to the maximum power threshold.

A method of wireless communication is described. The method may include establishing, at a user equipment (UE), a connection with a base station, the connection supporting two or more component carriers (CCs), receiving a plurality of grants of uplink resources for a plurality of uplink transmissions on the two or more CCs during a slot, wherein the plurality of grants are received at least a predetermined time in advance of a start of the slot, identifying a first uplink transmission of the plurality of uplink transmissions has a first priority that is higher than at least a second priority of a second uplink transmission of the plurality of uplink transmissions that overlaps the first uplink transmission, determining a first transmit power of the first uplink transmission, scaling a second transmit power of the second uplink transmission such that an aggregate transmission power of the UE is less than or equal to a maximum power threshold, and transmitting the plurality of uplink transmissions during the slot using the two or more CCs.

An apparatus for wireless communication is described. The apparatus may include means for establishing, at a user equipment (UE), a connection with a base station, the connection supporting two or more component carriers (CCs), means for receiving a plurality of grants of uplink resources for a plurality of uplink transmissions on the two or more CCs during a slot, wherein the plurality of grants are received at least a predetermined time in advance of a start of the slot, means for identifying a first uplink transmission of the plurality of uplink transmissions has a first priority that is higher than at least a second priority of a second uplink transmission of the plurality of uplink transmissions that overlaps the first uplink transmission, means for determining a first transmit power of the first uplink transmission, means for scaling a second transmit power of the second uplink transmission such that an aggregate transmission power of the UE is less than or equal to a maximum power threshold, and means for transmitting the plurality of uplink transmissions during the slot using the two or more CCs.

Another apparatus for wireless communication is described. The apparatus may include a processor, memory in electronic communication with the processor, and instructions stored in the memory. The instructions may be operable to cause the processor to establish, at a user equipment (UE), a connection with a base station, the connection supporting two or more component carriers (CCs), receive a plurality of grants of uplink resources for a plurality of uplink transmissions on the two or more CCs during a slot, wherein the plurality of grants are received at least a predetermined time in advance of a start of the slot, identify a first uplink transmission of the plurality of uplink transmissions has a first priority that is higher than at least a second priority of a second uplink transmission of the plurality of uplink transmissions that overlaps the first uplink transmission, determine a first transmit power of the first uplink transmission, scale a second transmit power of the second uplink transmission such that an aggregate transmission power of the UE is less than or equal to a maximum power threshold, and transmit the plurality of uplink transmissions during the slot using the two or more CCs.

A non-transitory computer-readable medium for wireless communication is described. The non-transitory computer-readable medium may include instructions operable to cause a processor to establish, at a user equipment (UE), a connection with a base station, the connection supporting two or more component carriers (CCs), receive a plurality of grants of uplink resources for a plurality of uplink transmissions on the two or more CCs during a slot, wherein the plurality of grants are received at least a predetermined time in advance of a start of the slot, identify a first uplink transmission of the plurality of uplink transmissions has a first priority that is higher than at least a second priority of a second uplink transmission of the plurality of uplink transmissions that overlaps the first uplink transmission, determine a first transmit power of the first uplink transmission, scale a second transmit power of the second uplink transmission such that an aggregate transmission power of the UE is less than or equal to a maximum power threshold, and transmit the plurality of uplink transmissions during the slot using the two or more CCs.

Some examples of the method, apparatus, and non-transitory computer-readable medium described above may further include processes, features, means, or instructions for determining a remaining power between the aggregate transmission power of the UE and the maximum power threshold, identifying a third uplink transmission that overlaps with the first uplink transmission and the second uplink transmission, and that may have a lower priority than the first priority and second priority. Some examples of the method, apparatus, and non-transitory computer-readable medium described above may further include processes, features, means, or instructions for allocating the remaining power to the third uplink transmission.

In some examples of the method, apparatus, and non-transitory computer-readable medium described above, the uplink transmissions that may have already started may have a higher priority than other uplink transmissions. In some examples of the method, apparatus, and non-transitory computer-readable medium described above, the plurality of uplink transmissions may be prioritized according to whether the uplink transmission may be an ongoing transmission, a type of uplink transmission, information to be transmitted, or any combination thereof.

In some examples of the method, apparatus, and non-transitory computer-readable medium described above, the UE further scales more than one uplink transmissions having a same priority such that an aggregate transmission power of the UE may be less than or equal to a maximum power threshold. In some examples of the method, apparatus, and non-transitory computer-readable medium described above, each symbol of an uplink transmission during the slot may have a same transmit power.

DETAILED DESCRIPTION

Figure 1:
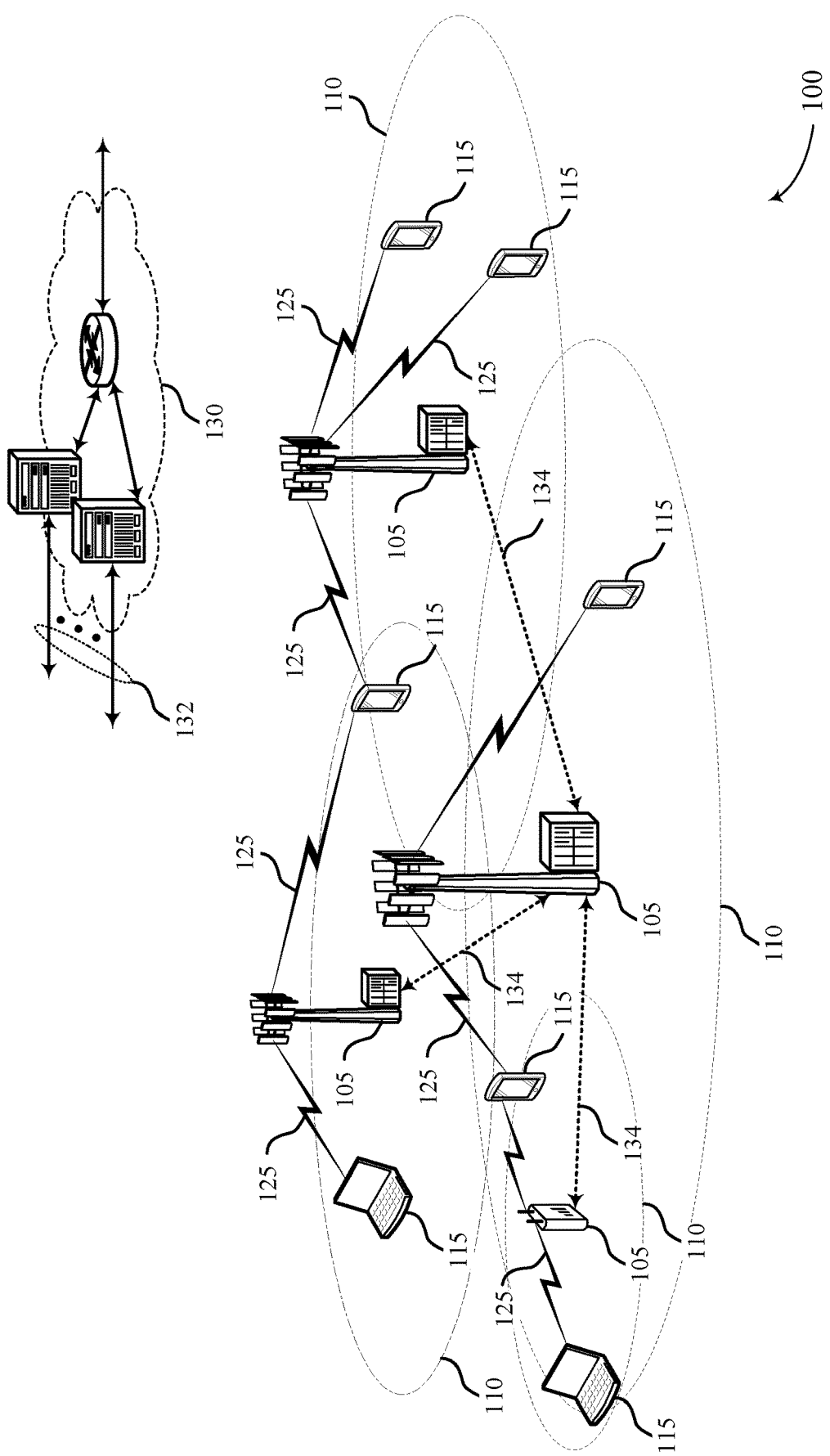
FIG. 1 illustrates an example of a system for wireless communication that supports techniques for power control using carrier aggregation in wireless communications in accordance with aspects of the present disclosure.

Various techniques described herein provide for managing transmissions using multiple component carriers (CCs) in which transmissions using one or more of the CCs may span less than a full transmission time interval (TTI) such as a transmission slot, subframe, or other TTI. In some cases a UE may, signal one or more capabilities related to carrier aggregation that may be used by a base station to allow enhanced scheduling flexibility at the base station. In some cases, a UE may signal a capability indication to a base station of a capability of the UE for supporting transmissions that have different starting times or durations on different CCs. The base station may then schedule transmissions for the UE in which transmissions on different CCs may have different starting times or durations, which may provide enhanced scheduling flexibility, enhanced communications with the UE, and increased network efficiency.

In some cases, a UE may support CCs in which different CCs may belong to different timing advance groups (TAGs) such that starting times of TTIs (e.g., symbols, slots, subframes, of combinations thereof) may be unsynchronized up to a certain threshold. Such synchronization offsets may result in transmit powers at a UE having transient values that may exceed a maximum power threshold, and in some cases a UE may provide an indication to a UE of an overlap threshold that indicates an amount of time that UE transmit power can exceed the maximum power threshold. A base station may use such an overlap threshold and schedule a UE for transmissions using multiple CCs that may be in different TAGs, which may provide additional scheduling flexibility for the base station.

In some cases, a UE may also perform power control for multiple CCs to provide uplink transmit powers that comply with maximum power thresholds where transmissions of different CCs may have different start times, different stop times, different durations, or combinations thereof. In some cases, a UE may receive a number of grants of uplink resources for a plurality of uplink transmissions on two or more CCs during a slot, and determine that a transmit power to transmit the uplink transmissions exceeds the maximum power threshold for the UE during at least a portion of the slot. The UE may, responsive to such a determination drop at least a portion of a first uplink transmission of the number of uplink transmissions, where a resulting transmit power is less than or equal to the maximum power threshold, and transmit remaining uplink transmissions of the number of uplink transmissions during the slot using one or more of the CCs. Additionally or alternatively, the UE may scale a transmit power of one or more of the CCs for at least a portion of the slot such that the UE transmit power is less than or equal to the maximum power threshold. In some cases, the UE may perform look-ahead power scaling for uplink grants received at least a predetermined time in advance of a start of a slot.

Aspects of the disclosure are initially described in the context of a wireless communications system. Aspects of the disclosure are further illustrated by and described with reference to apparatus diagrams, system diagrams, wireless resource illustrations, and flowcharts that relate to techniques for power control using carrier aggregation in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may communicate using multiple CCs, in which one or more of the CCs may be used to transmit transmissions having different durations, different starting times, different end times, or any combination thereof.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, UEs 115 and base stations 105 may communicate using two or more CCs, and various techniques described herein provide for transmissions using one or more of the CCs that may span less than a full TTI (e.g., a slot, subframe, or other TTI). In some cases a UE 115 may, signal capabilities to a base station 105 related to the ability of the UE 115 to transmit uplink transmissions that have different starting times or durations on different CCs and to support different TAGs on different CCs. A serving base station 105 may then schedule transmissions for the UE 115 in which transmissions on different CCs may have different starting times or durations, and in which different CCs may be associated with different TAGs. Such techniques may provide enhanced scheduling flexibility, enhanced communications with the UE 115, and increased network efficiency.

In some cases, a UE 115 may also perform power control for multiple CCs to provide uplink transmit powers that comply with maximum power thresholds where transmissions of different CCs may have different start times, different stop times, different durations, or combinations thereof. In some cases, a UE 115 may receive a number of grants of uplink resources for a plurality of uplink transmissions on two or more CCs during a slot, and determine that a transmit power to transmit the uplink transmissions exceeds the maximum power threshold for the UE 115 during at least a portion of the slot. The UE 115 may, responsive to such a determination drop at least a portion of a first uplink transmission of the number of uplink transmissions to provide that the transmit power is less than or equal to the maximum power threshold, and transmit remaining uplink transmissions of the number of uplink transmissions during the slot using one or more of the CCs. Additionally or alternatively, the UE 115 may scale a transmit power of one or more of the CCs for at least a portion of the slot such that the UE transmit power is less than or equal to the maximum power threshold. In some cases the scaling of transmit power may be performed for uplink grants that are received from the base station 105 before a predetermined time in advance of the slot. In some cases, scaling may be performed for all overlapping uplink transmissions that are transmitted in a period where the uplink power of the UE 115 would otherwise exceed the maximum power threshold. In some cases, uplink transmissions may be prioritized, scaling or dropping of transmissions may be based on priority levels of the transmissions.

Figure 2:
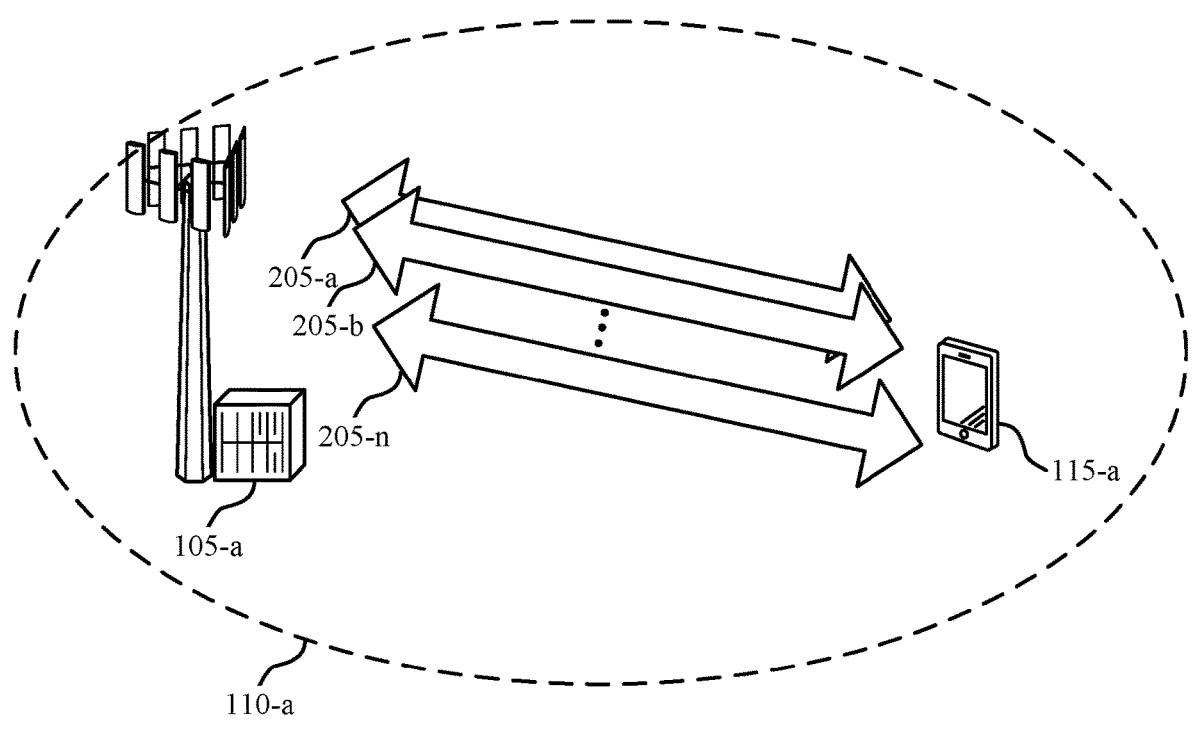
FIG. 2 illustrates an example of a portion of a wireless communication system that supports techniques for power control using carrier aggregation in wireless communications in accordance with aspects of the present disclosure.

FIG. 2 illustrates an example of a portion of a wireless communication system 200 that supports techniques for power control using carrier aggregation in wireless communications in accordance with various aspects of the present disclosure. Wireless communication system 200 may include base station 105-a and UE 115-a, which may be examples of a base station 105 and a UE 115 described with reference to FIG. 1. In some examples, base station 105-a may be in communication with one or more UEs 115 within geographic coverage area 110-a. Wireless communication system 200 may implement aspects of wireless communications system 100. For example, wireless communication system 200 may support carrier aggregation, and base station 105-a may communicate with UE 115-a on resources of multiple component carriers 205, including a first component carrier 205-a, a second component carrier 205-b, through an n-th component carrier 205-n. In some cases, durations of transmissions, starting times of transmissions, end times of transmissions, or combinations thereof, may be different for different component carriers 205.

When using multiple CCs 205 in carrier aggregation communications between the UE 115-a and base station 105-a it may be beneficial, in some cases, for the base station 105-a to schedule transmissions on one or more CCs 205 that do not span an entire slot or other TTI. The UE 115-a in such cases, however, may not be able to change power settings at a power amplifier (PA) that is in a transmit/receive chain during a transmission on a CC 205. Thus, once the UE 115-a starts transmitting on a CC 205, the PA settings remain the same until the next slot or TTI boundary, in order to maintain phase continuity of the transmission and allow proper decoding of the transmission. Thus, if a first transmission is ongoing in a slot and a second transmission starts at some symbol during the slot, the transmit power of the first transmission remains the same in such cases, and the transmit power of the second transmission is added to the transmit power of the first transmission to determine the total transmit power of the UE 115-a. Additionally, certain types of transmissions, such as sounding reference signal (SRS) and physical random channel (PRACH) transmissions, may not go through an inverse fast Fourier transform (IFFT) at the UE 115-a, and thus frequency division multiplexing of such transmissions with other uplink channels may not be allowed.

In order to prepare and transmit using multiple CCs 205 in a particular slot, the UE 115-a may take a certain amount of time during which it can calculate the power settings for the different transmissions. In some cases, certain timeline requirements may be provided for the UE 115-a to perform such calculations for different duration transmissions on different CCs 205 during a slot, and thus in some cases scheduling information and power control commands for a slot may be provided to the UE 115-a by a predetermined time in advance of a start of a slot. Such timeline requirements may also provide the UE 115-a with sufficient time to generate digital data for the associated transmissions.

The UE 115-a may also have certain transmitter architecture features that may impact transmissions on multiple CCs 205. In some cases, the UE 115-a may have a single FFT/IFFT engine and shared RF chain(s) for transmissions on multiple CCs 205. In such cases, the UE 115-a may be capable of transmitting intra-band contiguous carriers with a single TAG, assuming the CCs 205 have a same numerology (i.e., a same tone spacing, symbol duration, etc.). In other cases, the UE 115-a may have multiple FFT/IFFT engines and RF chains, and thus have a capability for transmitting intra-band noncontiguous carriers as well as inter-band carriers, and may support have multiple TAGs.

Figure 3:
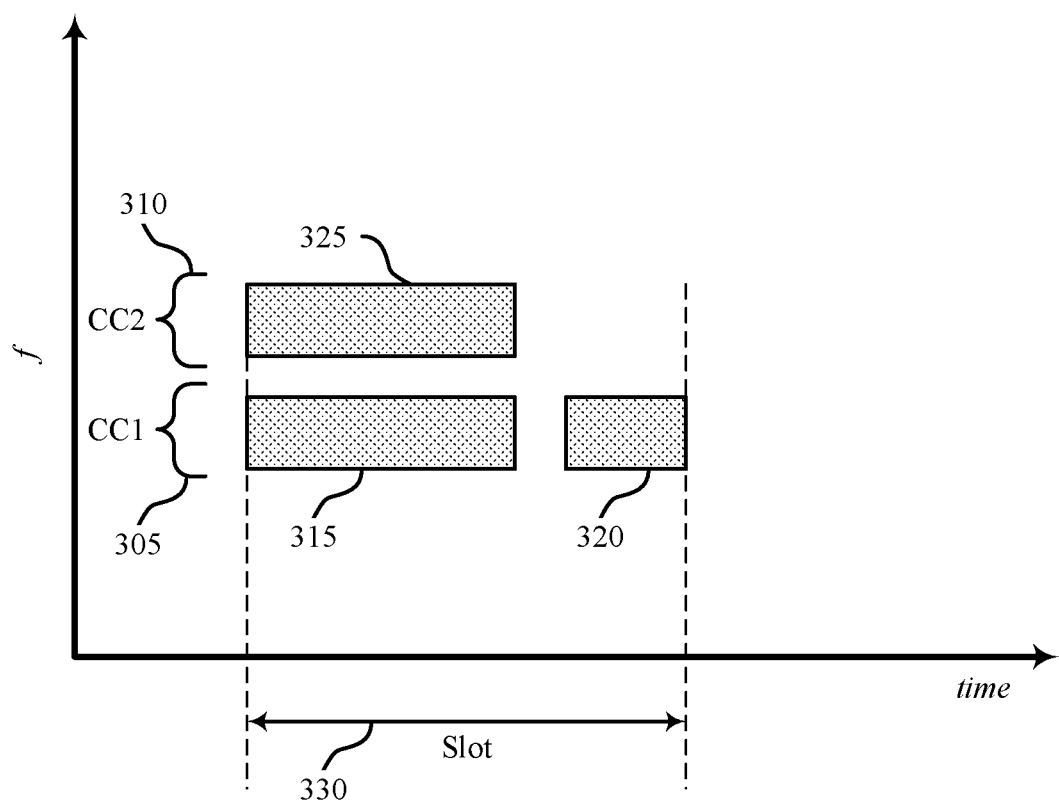
FIG. 3 illustrates an example of wireless resources for multiple component carriers that support techniques for power control using carrier aggregation in wireless communications in accordance with aspects of the present disclosure.

FIG. 3 illustrates an example of wireless resources for multiple component carriers 300 that supports techniques for power control using carrier aggregation in wireless communications in accordance with various aspects of the present disclosure. In some examples, wireless resources for multiple component carriers 300 may be implemented in aspects of wireless communication system 100 or 200.

As discussed above, UEs (e.g., UEs 115 of FIG. 1 or 2) and base stations (e.g., base stations 105 of FIG. 1 or 2) may use multiple CCs in a CA mode, in which transmissions on one or more of the CCs may have different start times, different stop times, different durations, or combinations thereof, within a particular slot or other TTI. In the example of FIG. 3, a first CC 305 and a second CC 310 may be configured for transmissions during a slot 330. In this case, a first transmission 315 may start at the beginning of the slot 330 on the first CC 305, and may stop at some point prior to the end of the slot 330. In this example, a second transmission 320 may start on the first CC 305 after the first transmission 315 ends, and may end at the end of the slot 330. A third transmission 325 may start at the beginning of the slot 330 on the second CC 310, and may end prior to the end of the slot 330. In this example, the transmit power of the UE would be the transmit power of the first transmission 315 and the third transmission 325 for the first portion of the slot 330, and just the transmit power of the second transmission 320 for the last portion of the slot 330. Thus, unless simultaneous transmissions completely overlap each other, (i.e., have a same starting time and duration), power changes may happen at the middle of a transmission.

In some cases, a UE may not be able to support such changes of total power within a transmission. According to some techniques provided herein, a UE may provide a base station with an indication of whether the UE supports overlapping transmissions within a TAG that do not start at the same time, or have different durations. In some cases, the UE may provide such an indication in a capability report that is transmitted to the base station when establishing a connection that supports multiple CCs. In some cases, the UE capability may be reported per band, per band combination, or combinations thereof. A base station may receive such a UE capability report and schedule transmissions for the UE based on the capability of the UE to support overlapping transmissions that have different start times, different stop times, different durations, or combinations thereof.

Figure 4:
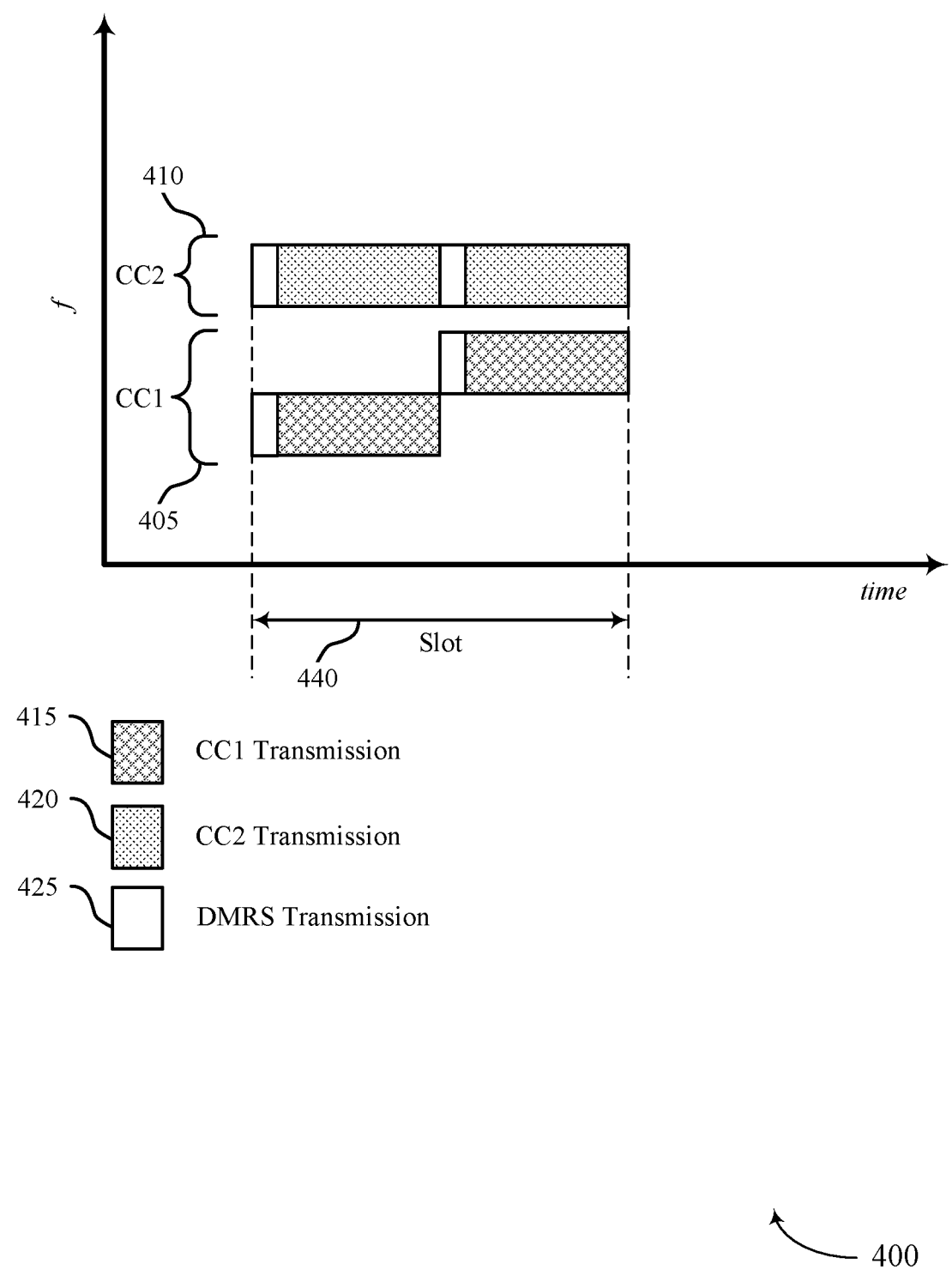
FIG. 4 illustrates an example of frequency hopping in one or more component carriers that supports techniques for power control using carrier aggregation in wireless communications in accordance with aspects of the present disclosure.

FIG. 4 illustrates an example of frequency hopping in one or more component carriers 400 that supports techniques for power control using carrier aggregation in wireless communications in accordance with various aspects of the present disclosure. In some examples, frequency hopping in one or more component carriers 400 may be implemented in aspects of wireless communication system 100 or 200.

In this example, a first CC 405 and a second CC 410 may be scheduled for transmissions within a slot 440. First CC transmissions 415, in this example, may employ frequency hopping between different frequencies within the slot 440, and second CC transmissions 420 may have no hopping. In this example, DMRS transmissions 425 may be provided in first CC transmissions 415 and in second CC transmissions 420. When performing frequency hopping, in some cases a UE may consider a PUSCH/PUCCH transmissions with intra-slot frequency hopping as two transmissions. In other cases, a UE may consider a PUSCH/PUCCH with intra-slot frequency hopping as two transmissions unless all other simultaneous transmissions have DMRS symbols in both of the time segments (e.g., as illustrated in FIG. 4), which may mean that a receiver will not assume the same power levels of the two segments. In other cases, the UE may consider a PUSCH/PUCCH with frequency hopping as one transmission, in which cases the UE may consider the impact on transmit power, if there is any, of the frequency hopping, before the start of the transmission.

Figure 5:
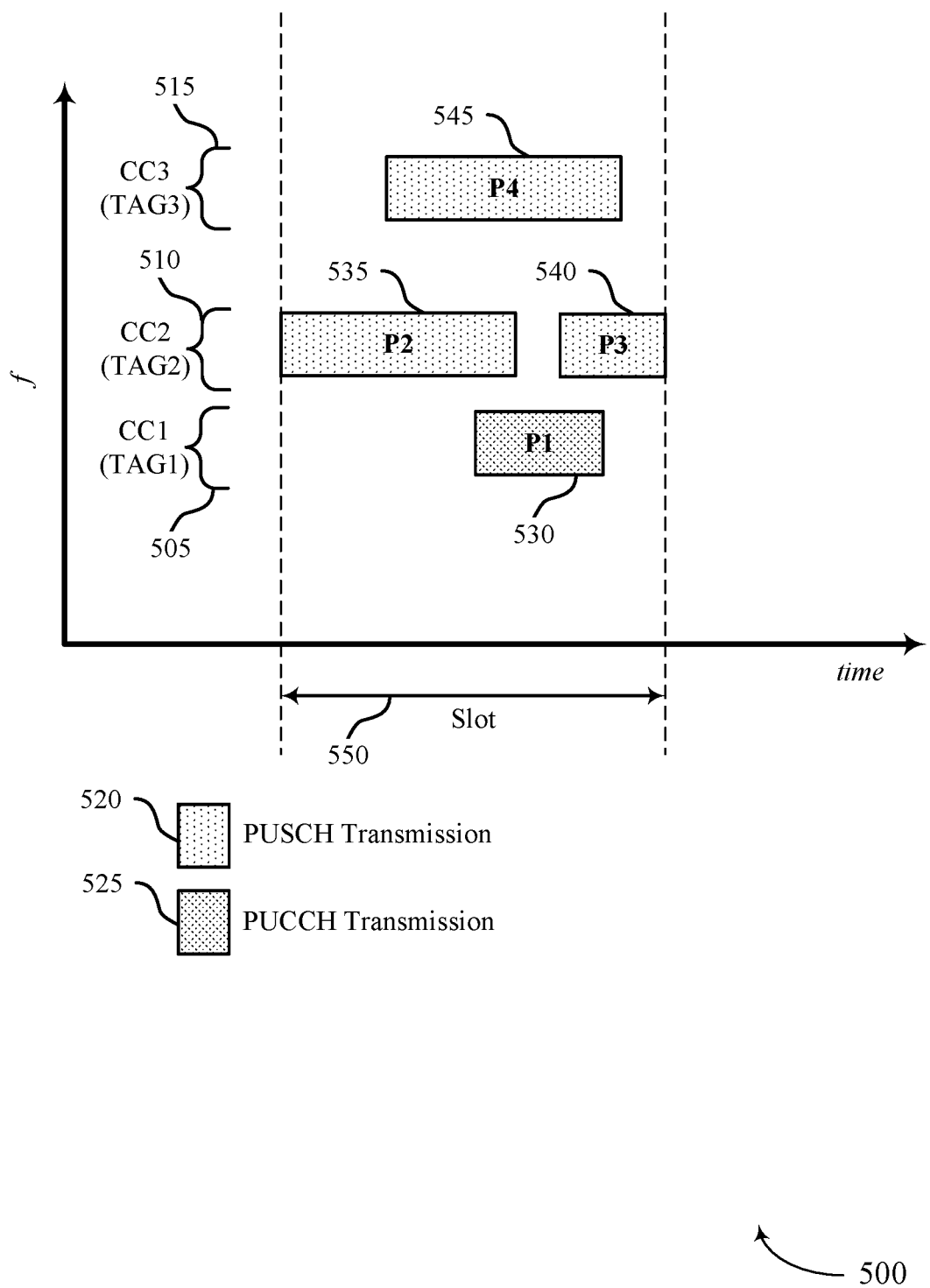
FIG. 5 illustrates an example of overlapping wireless resources for multiple component carriers that support techniques for power control using carrier aggregation in wireless communications in accordance with aspects of the present disclosure.

FIG. 5 illustrates an example of wireless resources and transmissions for multiple component carriers 500 using carrier aggregation in wireless communications in accordance with various aspects of the present disclosure. In some examples, wireless resources and transmissions for multiple component carriers 500 may be implemented in aspects of wireless communication system 100 or 200.

In this example, a UE may be configured with a first CC 505, a second CC 510, and a third CC 515 and may be scheduled with a first transmission 530 on the first CC 505 that is to be transmitted only during a portion of slot 550. The UE may also be scheduled with a second transmission 535 and a third transmission 540 on the second CC 510. The UE may also be scheduled with a fourth transmission 545 on the third CC 515. In this example, the second transmission 535, third transmission 540, and fourth transmission 545 may be PUSCH transmissions 520, and the first transmission 530 may be a PUCCH transmission 525. As indicated above, a transmit power of the UE may thus change during the slot 550. In this example, the first transmission 530 may have a first transmit power P1, the second transmission 535 may have a second transmit power P2, the third transmission 540 may have a third transmit power P3, and the fourth transmission 545 may have a fourth transmit power P4. Thus, in this case, a first transmit power corresponding to P2 of the second transmission 535 may be present at the start of the slot 550, which may increase to a transmit power of P2+P4 when the fourth transmission 545 starts, and again increases to P1+P2+P4 when the first transmission 530 starts. The total transmit power may drop to just P1+P4 during the gap between the second transmission 535 and the third transmission 540, and may increase to P1+P3+P4 once the third transmission does start. Finally, the total transmit power will drop to just P3 in this example, after the first transmission 530 and fourth transmission 545 stop. In some cases, the total transmit power may exceed the maximum transmit power (e.g., $P_{cmax}$), such as if P1+P2+P4 or P1+P3+P4 are greater than $P_{cmax}$. In such cases, according to various techniques provided herein, all or some of the uplink transmissions may be scaled in order to provide the UE with a highest maximum power during the slot that complies with $P_{cmax}$. In other cases, all or part of a transmission may be dropped such that remaining transmissions do not exceed the maximum transmit power.

In some cases, dropping or scaling of transmit powers may be performed based at least in part on a priority associated with the transmission. In some examples, different transmissions or channels may be assigned a priority level depending on the channel types (e.g., PUCCH, PUSCH) and/or type of uplink control information (UCI) it carries. In some cases, priority levels for different transmissions or channels, or type of UCI, may be signaled to the UE by the base station, or may be preconfigured. For example, PUCCH transmissions 525 may be assigned a higher priority than PUSCH transmissions 520. In such cases, if the aggregate power of P2+P1+P4>$P_{cmax}$, then the UE may scale down P2 and P4, and leave P1 unchanged due to it being the transmit power for the higher priority transmission. Similarly, if P4+P3+P1>$P_{cmax}$, the UE may scale down P3 and P4. The scaled down powers may be scaled sufficiently to provide a total transmit power that is at or below $P_{cmax}$. Further, in some cases, the fourth transmission 545 may be assigned a lower priority than the third transmission 540 (e.g., based on a service supported or data transmitted by the third transmission 540). In such cases, the transmit power P4 would be scaled more than P3.

Figure 6:
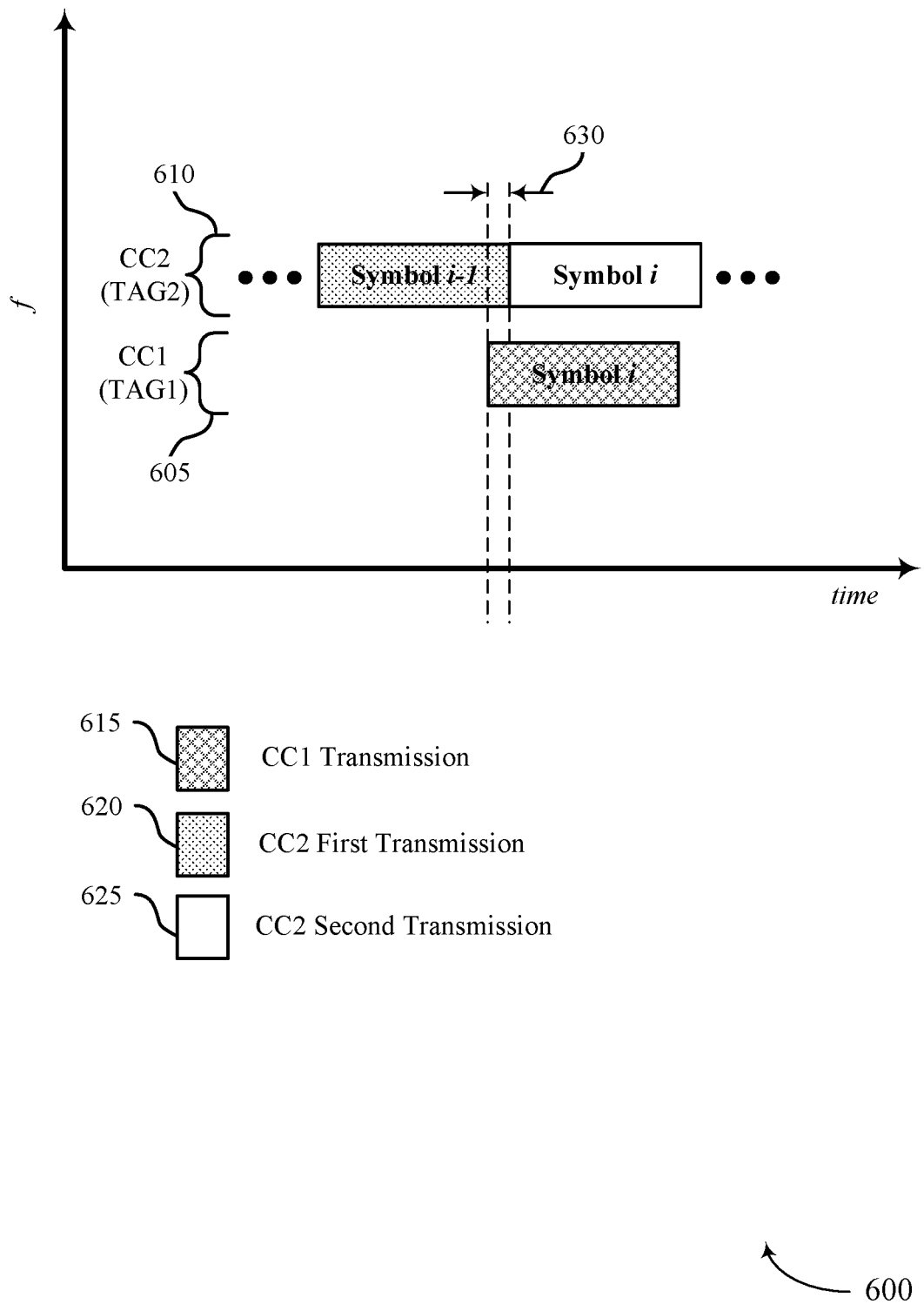
FIG. 6 illustrates an example of an overlap threshold for transmissions of multiple timing advance groups that supports techniques for power control using carrier aggregation in wireless communications in accordance with aspects of the present disclosure.

FIG. 6 illustrates an example of an overlap threshold for transmissions of multiple timing advance groups 600 that supports techniques for power control using carrier aggregation in wireless communications in accordance with various aspects of the present disclosure. In some examples, overlap threshold for transmissions of multiple timing advance groups 600 may be implemented in aspects of wireless communication system 100 or 200. As indicated above, in some cases a UE may have a capability of transmissions on multiple CCs that are in different TAGs, which may result in slot boundaries being misaligned by up to a certain time (e.g., 30 μs), depending upon a distance between the UE and the particular base station.

Thus, in the case of multiple TAGs being present for different CCs, certain parts of uplink transmissions may be overlapped due to symbol misalignment. In the example of FIG. 6, a first CC 605 may be in a first TAG that uses a first timing advance (TA), and a second CC 610 may be in a second TAG that uses a second timing advance. In this case, the second CC 610 may have a first transmission 620 that ends in symbol i−1, and may have a second transmission 625 that starts at symbol i. The first CC 605 may have a transmission that starts at symbol i, and due to different TAs of the first TAG and the second TAG, the starting boundary of symbol i is not aligned, resulting in an overlap period 630 during which the first CC transmission 615 overlaps with the first transmission 620 of the second CC 610.

When performing power control for symbol i, the UE may take into account the second transmission 625 of the second CC 610 and the transmission 615 of the first CC 605, and may set transmit powers accordingly such that, during symbol i, UE transmit power does not exceed a maximum transmit power threshold ($P_{cmax}$). However, because the UE does not account for the symbol i transmission when the first transmission 620 of the second CC 610 ends at symbol i−1, the transmit power during the overlap period 630 may exceed $P_{cmax}$. In such cases, increased colliding transmissions may be considered and, in some cases, the transmission 615 of the first CC 605 may be dropped. In some cases, the UE may be able to ignore the overlap period 630 for power control due to timing differences between different TAGs if the overlapped portion is smaller than a threshold value Y. In some cases, the UE may report such a threshold value Y to the base station, which may be used to help perform network scheduling. In some cases, the value of the threshold value Y may be dependent upon UE capabilities, hardware that is present at the UE, or combinations thereof.

Figure 7:
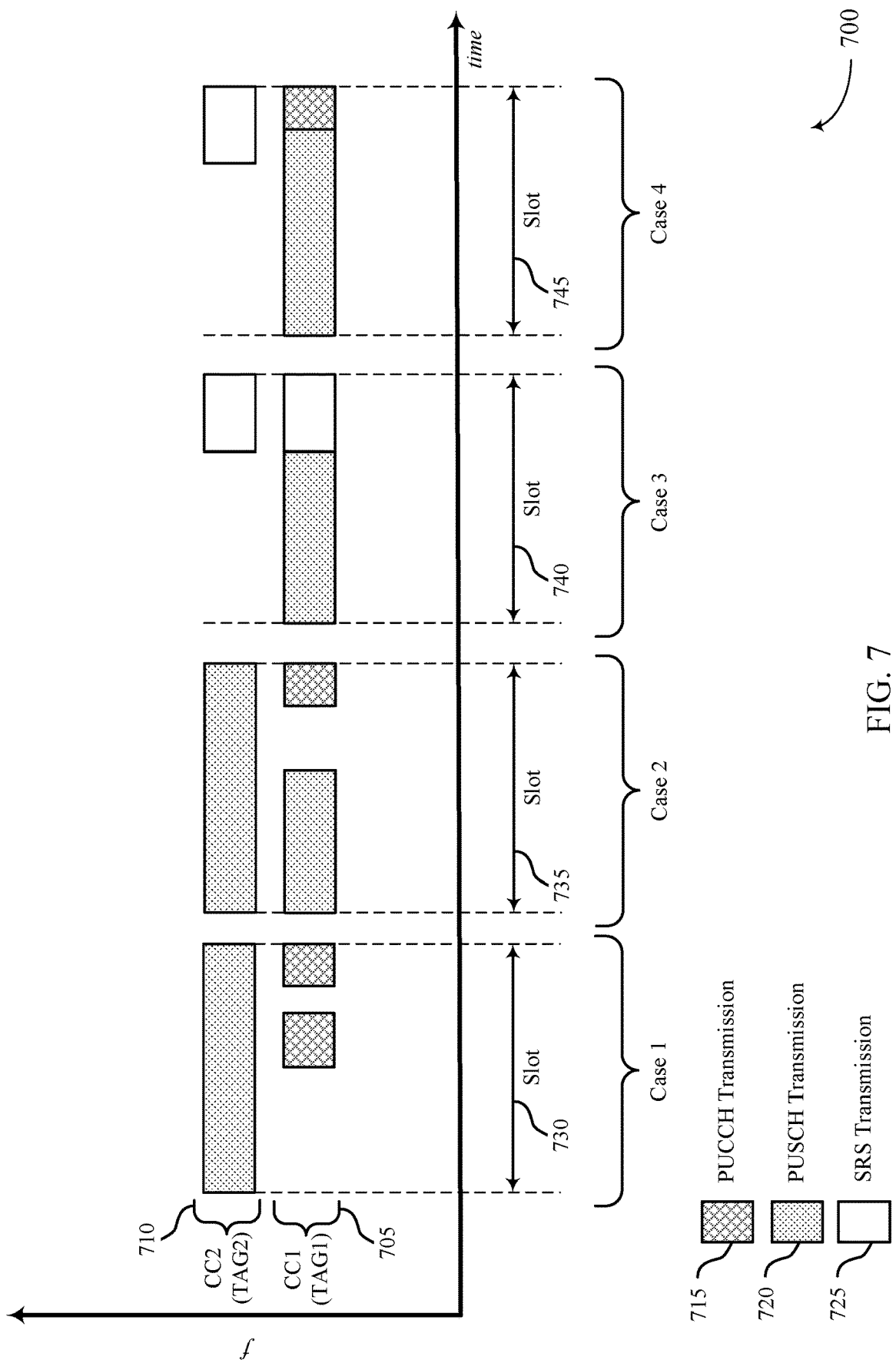
FIG. 7 illustrates an example of different types of transmission on different component carriers that support techniques for power control using carrier aggregation in wireless communications in accordance with aspects of the present disclosure.

FIG. 7 illustrates an example of a different types of transmission on different component carriers 700 that support techniques for power control using carrier aggregation in wireless communications in accordance with various aspects of the present disclosure. In some examples, different types of transmission on different component carriers 700 may be implemented in aspects of wireless communication system 100 or 200.

In the example of FIG. 7, various different transmissions, such as PUCCH transmissions 715, PUSCH transmissions 720, and SRS transmissions 725 may have varying durations, resulting in partially overlapped transmissions for a first CC 705 and a second CC 710. Transmit power setting of a symbol may require knowledge of all transmissions in a slot unless some of the transmissions are dropped, in order to provide overlapping transmissions that do not exceed $P_{cmax}$. For example, in case 1 a UE may transmit different PUCCH transmissions 715 on the first CC 705 while transmitting a single PUSCH transmission 720 on the second CC 710 that spans the entire slot 730. The UE in such a case may consider the PUCCH transmissions 715 in conjunction with the PUSCH transmissions 720 when performing transmit power calculations for the slot 730.

In case 2, the UE may transmit PUSCH transmission 720 during a first portion of slot 735 using the first CC 705 and a PUCCH transmission 715 during a last portion of the slot 735 using the first CC 705, while transmitting PUSCH transmission 720 using the second CC 710 that spans the entire slot 735. In case 3, the UE may transmit, in slot 740, PUSCH transmission 720 during a first portion of the slot 740 and an SRS transmission 725 during a last portion of the slot 740 on the first CC 705, and may transmit SRS transmission 725 on the second CC 710 that overlaps with the SRS transmission 725 of the first CC 705. In case 4, the UE may transmit PUSCH transmission 720 and PUCCH transmission 715 on the first CC 705 during slot 745, and may transmit SRS transmission 725 on the second CC 710 during a last portion of the slot 745. While several examples of different overlapping transmissions are illustrated, numerous other examples of overlapping transmissions are possible, and techniques provided herein may apply to various different examples of differently overlapping transmissions. Further, while only two CCs are illustrated in FIG. 7, techniques provided herein may be used for any number of configured CCs.

Figure 8:
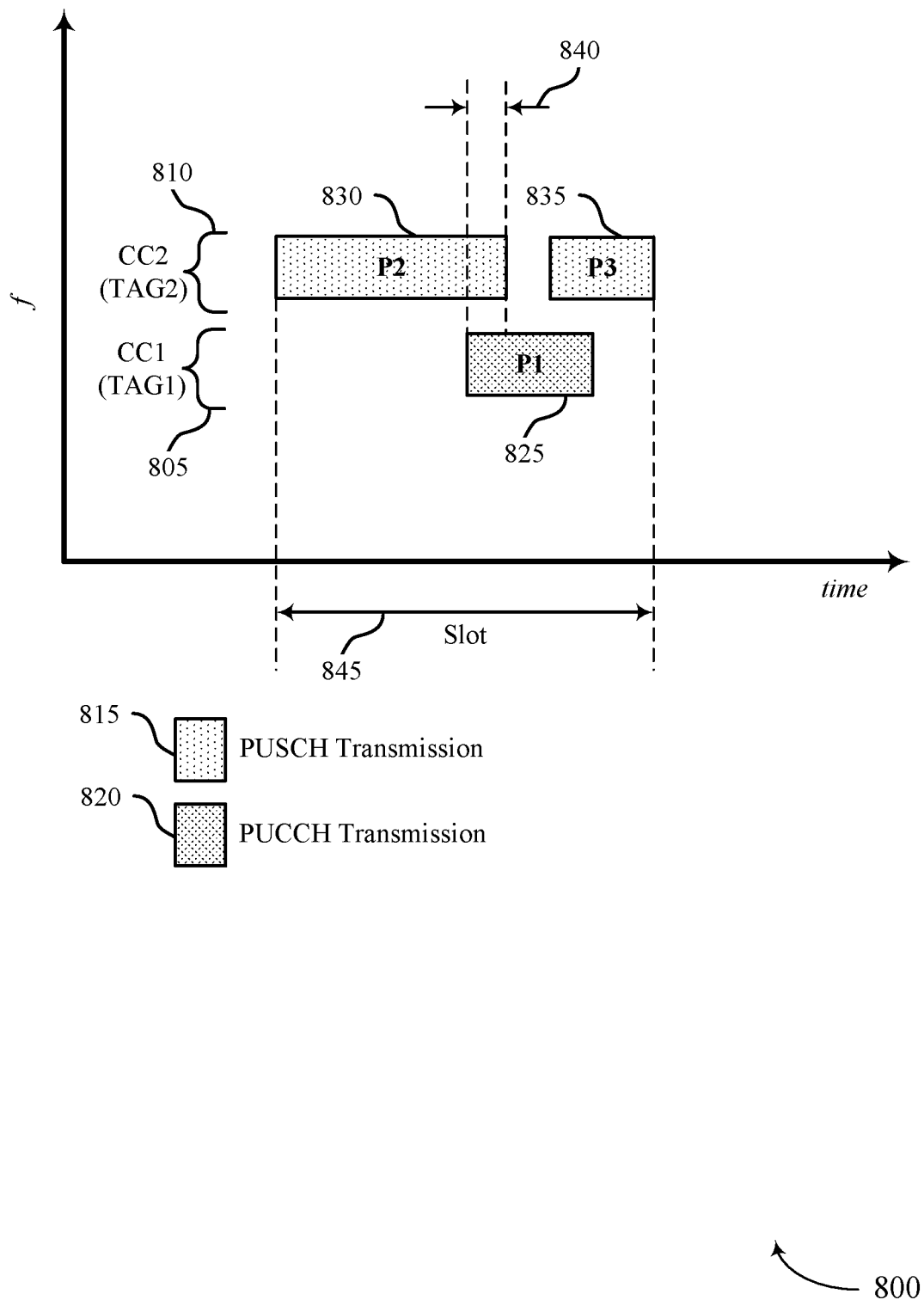
FIG. 8 illustrates an example of power control through dropping of transmissions using carrier aggregation in wireless communications in accordance with aspects of the present disclosure.

FIG. 8 illustrates an example of power control through dropping of transmissions 800 using carrier aggregation in wireless communications in accordance with various aspects of the present disclosure. In some examples, power control through dropping of transmissions 800 may be implemented in aspects of wireless communication system 100 or 200.

In this example, a UE may be configured with a first CC 805 and a second CC 810, and may be scheduled with a first transmission 825 on the first CC 805 that is to be transmitted only during a portion of slot 845. The UE may also be scheduled with a second transmission 830 and a third transmission 835 on the second CC 810. In this example, the second transmission 830 and third transmission 835 may be PUSCH transmissions 815, and the first transmission 825 may be a PUCCH transmission 820. As indicated above, a transmit power of the UE may thus change during the slot 845. In this example, the first transmission 825 may have a first transmit power P1, the second transmission 830 may have a second transmit power P2, and the third transmission may have a third transmit power P3. Thus, in this case, a first transmit power corresponding to P2 of the second transmission 830 may be present at the start of the slot 845, which may increase to a transmit power of P1+P2 when the first transmission 825 starts, may drop to just P1 when the second transmission 830 stops, and increase up to P1+P3 when the third transmission 835 starts. In some cases, the total transmit power may exceed $P_{cmax}$, such as if P1+P2 or P1+P3 are greater than $P_{cmax}$. In such cases, according to various techniques provided herein, all or a portion of some transmissions may be dropped if the UE total transmit power exceeds $P_{cmax}$.

In some cases, different transmissions may be prioritized, and lower priority transmissions may be dropped in the event that a total transmit power of the UE exceeds the maximum transmit power threshold (e.g., $P_{cmax}$). In some cases, a total transmit power determination may be made on a symbol-by-symbol basis within a slot, and no additional timeline requirements may be required. In some cases, a UE may drop just a portion of a transmission. In the example of FIG. 8, if P2+P1>$P_{cmax}$, the UE may drop a portion 840 of the second transmission 830 that overlaps with the first transmission 825. Similarly, if P3+P1>$P_{cmax}$, the UE may drop the third transmission 835. In some cases, when the UE drops a symbol of a transmission, it may drop all subsequent symbols of that transmission for the slot. Thus, even though the first transmission 825 stops before the end of the slot 845, the UE will not start transmitting the third transmission 835 once the determination to drop the first symbol of the third transmission 835 has been made. In some cases, different iterative methods may be used to identify whether overlapping transmissions exceed the maximum transmit power threshold and to determine transmissions to drop or transmit during a slot, such as discussed in more detail below with respect to FIGS. 10 and 11.

Figure 9:
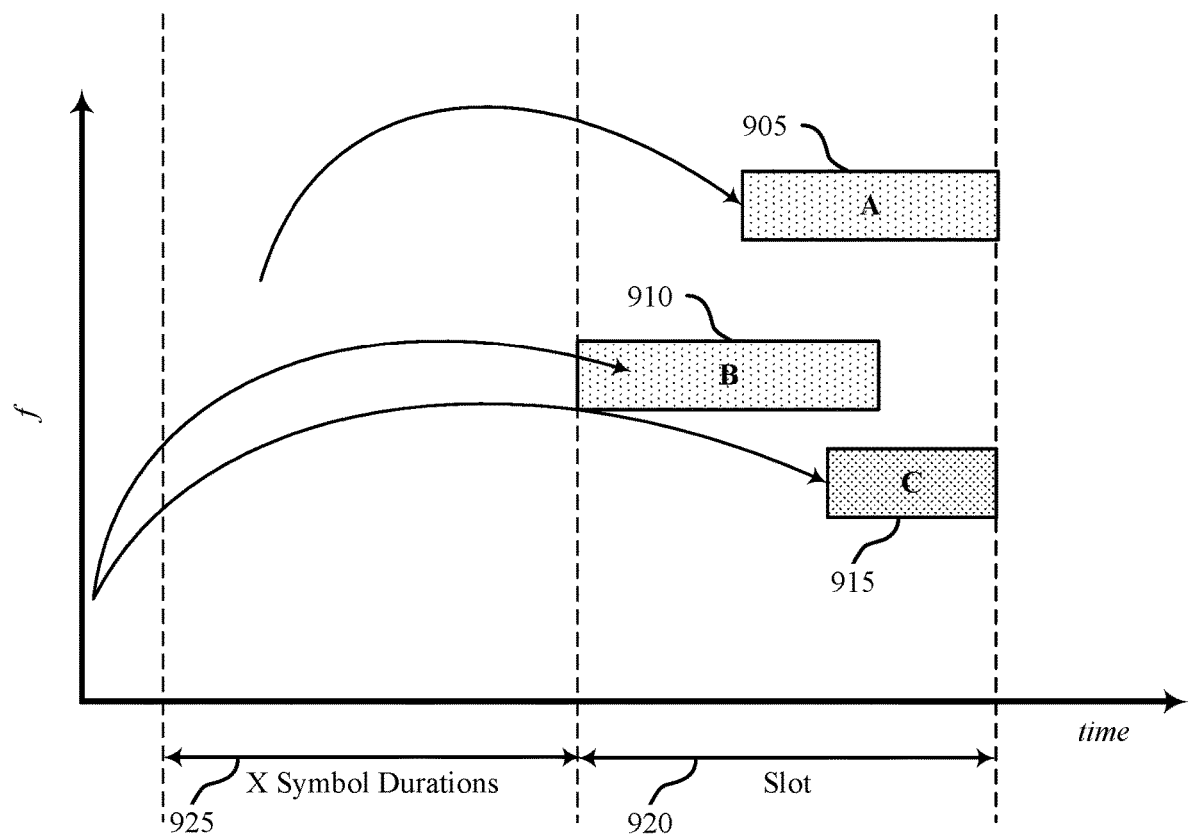
FIG. 9 illustrates an example of a timeline of resource grants that supports techniques for power control using carrier aggregation in wireless communications in accordance with aspects of the present disclosure.
Figure 9:
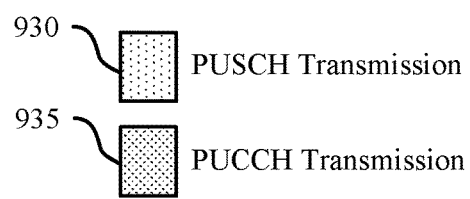

FIG. 9 illustrates an example of a timeline of resource grants 900 that supports techniques for power control using carrier aggregation in wireless communications in accordance with various aspects of the present disclosure. In some examples, the timeline of resource grants 900 may be implemented in aspects of wireless communication system 100 or 200.

In the example of FIG. 9, a first transmission 905, a second transmission 910, and a third transmission 915 may be allocated in resource grants received at a UE from a base station, for transmission in slot 920. In this example, the first transmission 905 and second transmission 910 may be PUSCH transmissions 930, and the third transmission may be a PUCCH transmission 935. As discussed above, in cases where uplink transmissions may have different durations, start times, stop times, or combinations thereof, a UE may determine whether power scaling or dropping is to be used to maintain a transmit power of the UE at or below a maximum transmit power threshold (e.g., $P_{cmax}$). In some cases, in order to perform such power scaling, the UE may need to receive the grants for uplink transmissions for the slot 920 at or before a predetermined time period 925 in advance of when the slot 920 starts. In the example of FIG. 9, the predetermined time period 925 may have a duration of X symbols before the start of the slot 920.

In the example of FIG. 9, the UE may receive grants for the resource allocation for the second transmission 910 and the third transmission 915 prior to the predetermined time period 925. However, the grant for the first transmission 905 may be received after the start of the predetermined time period 925. In such a case, the UE may not be able to perform power scaling for the first transmission 905 and, in cases where adding the first transmission 905 to the already scheduled second transmission 910 and third transmission 915 would exceed the maximum transmit power threshold, the UE may drop the first transmission 905. In cases where the added transmit powers of the second transmission 910 and third transmission 915 exceed the maximum transmit power threshold, the UE may perform power scaling to scale the transmit power of one or both of the second transmission 910 and the third transmission 915 (e.g., scaling may be applied to lower priority transmissions).

In some cases, the UE may perform power scaling for transmissions by adding transmissions to a slot 920 one-by-one based on priority order, with the highest priority transmission being added first. In some cases, transmissions that have higher timeline based priority level are allocated first, and thus ongoing transmissions that started in a prior slot or symbol may be continued with a higher priority than transmissions that are newly added. In some cases, transmissions with a same timeline based priority level may be further divided into several priority levels based on transmission types/UCI contents. For example, priority may be provided, from highest to lowest, to PRACH transmissions, PUCCH/PUSCH transmission with UCI, PUSCH transmissions, and SRS transmissions. In other examples, priority may be provided, from highest to lowest, to PRACH transmissions, PUCCH transmissions including HARQ ACK/SR or PUSCH with UCI including HACK/ACK, PUCCH transmissions that do not include HARQ ACK/SR and PUSCH with UCI that does not include HARQ ACK, PUSCH transmissions, and SRS transmissions.

When scaling transmissions according to such a priority order, every remaining transmission is scaled to fit in available leftover power. Available leftover power is a function of symbol index, but all symbols of one transmission have the same power after scaling. In the event that there are multiple transmissions with a same priority and with non-identical transmission durations, the UE may select (e.g., randomly) one of the transmissions ahead of another for power scaling or dropping. In some cases, the UE may signal the predetermined time period 925 to the base station. In other cases, the base station may signal the predetermined time period 925 to the UE, in order to have uniformity across multiple UEs for scheduling purposes at the network. In other cases, the predetermined time period 925 may be a preconfigured value.

Figure 10:
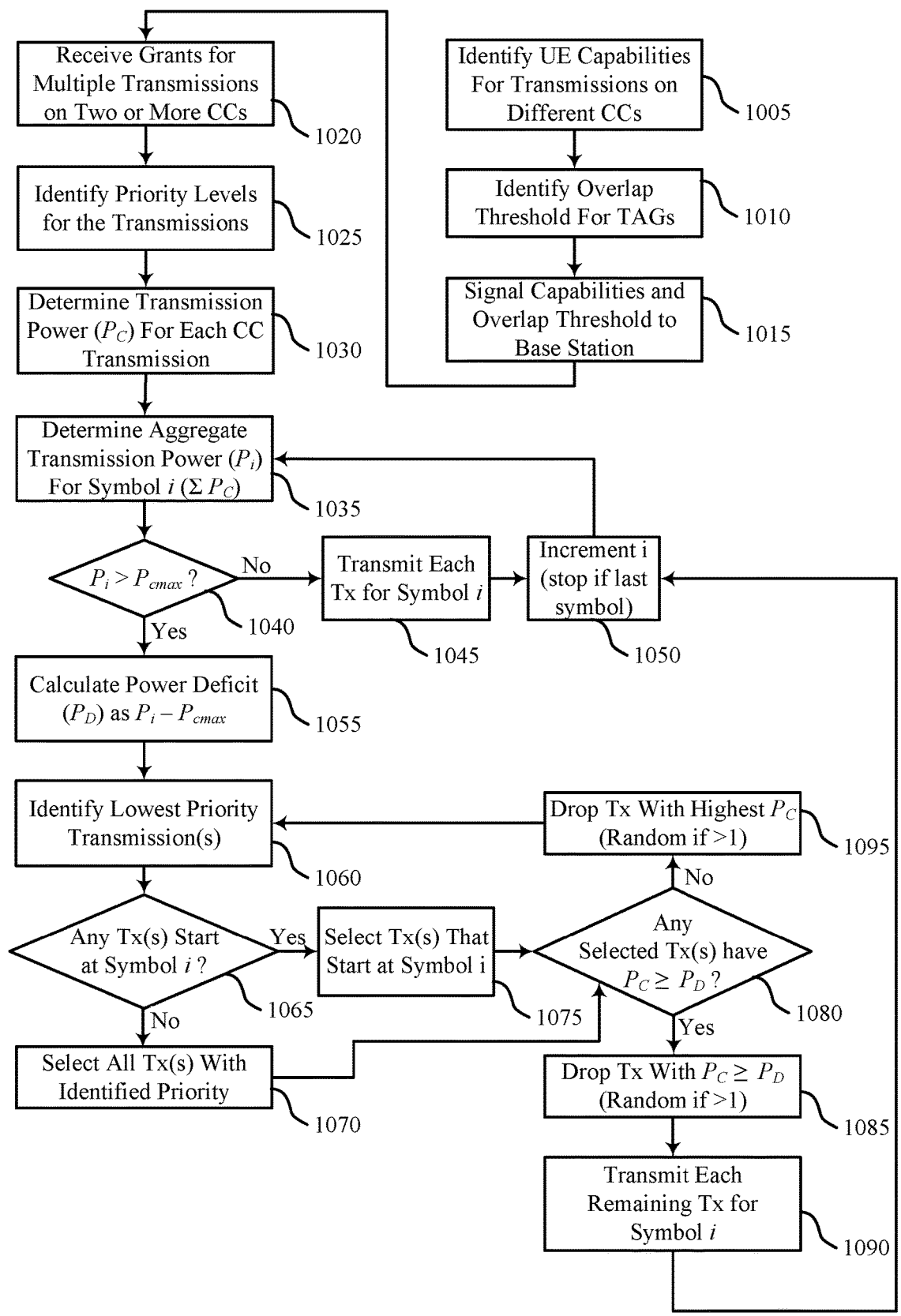
FIG. 10 illustrates an example of a method that supports techniques for power control using carrier aggregation in wireless communications in accordance with aspects of the present disclosure.

FIG. 10 illustrates an example of a method 1000 that supports techniques for power control using carrier aggregation in wireless communications in accordance with various aspects of the present disclosure. In some examples, method 1000 may be implemented in aspects of wireless communication system 100 or 200. As indicated above, in some cases dropping rules may be implemented at a UE in which a transmission (or channel) is assigned a priority level depending on the channel types (e.g., PUCCH, PUSCH) and/or type of uplink control information (UCI) it carries (e.g., HARQ feedback information, SR information, etc., may have higher priority) and lower priority transmissions may be dropped in the event that a total transmit power of overlapping transmissions exceeds a maximum transmit power threshold.

In this example, at 1005, the UE may identify UE capabilities for transmissions on different CCs. Such capabilities may include, for example, whether the UE is capable of transmitting overlapping transmissions on different CCs that have different start times, different stop times, different durations, or combinations thereof. Capabilities may also include whether the UE is capable of supporting inter-band CCs, intra-band non-contiguous CCs, or intra-band contiguous CCs. In some cases, the capabilities of the UE may be preconfigured at the UE. In other cases, the capabilities of the UE may depend upon conditions at the UE, such as thermal conditions that may limit a number of transmit/receive chains that may be active/processed at a particular time, a battery level or power-save mode at the UE, or other conditions at the UE.

At 1010, the UE may identify an overlap threshold for TAGs. As discussed above, in some cases a UE may support multiple different TAGs on different CCs, and the overlap threshold may be an amount of time during which the UE may transmit as powers that exceed the maximum transmit power threshold. In some cases, the value of the overlap threshold may be preconfigured at the UE or determined based on conditions at the UE.

At 1015, the UE may signal its capabilities and overlap threshold to the base station. Such signaling may be transmitted via radio resource control (RRC) signaling, for example. In some cases, such signaling may be provided as part of a connection establishment procedure when the UE and base station establish a connection that supports multiple CCs. In some cases, the UE may determine that capabilities or conditions have changed that result in a different UE capability or overlap threshold, and in some cases such a change may be indicated to the base station after the initial capabilities and overlap threshold are signaled.

At 1020, the UE may receive grants for multiple transmissions on two or more CCs. In some cases, the base station may schedule transmissions at the UE based on the UE capabilities and overlap threshold, and provide the grants to the UE via downlink control information (DCI) that is transmitted to the UE.

At 1025, the UE may identify priority levels for the multiple transmissions. As discussed above, different transmissions or channels may be assigned a priority level depending on the channel types (e.g., PUCCH, PUSCH) and/or type of uplink control information (UCI) it carries. In some cases, priority levels for different transmissions or channels, or type of UCI, may be signaled to the UE by the base station, or may be preconfigured. For example, a priority order may be, from highest priority to lowest priority, PRACH of CC for a primary cell (PCell), PUCCH/PUSCH with ACK/NACK and/or SR, PUCCH/PUSCH with other UCI, PUSCH without UCI, SRS/PRACH of a CC of a secondary cell (SCell). In some cases, within a same priority level, PCell is prioritized over SCell. Numerous other examples of prioritization may be used in various cases, and the above exemplary priority order is provided for purposes of illustration and discussion only.

At 1030, the UE may determine a transmission power for each CC transmission. Such a determination may be made according to power control information provided to the UE as part of the grants, and available power at the UE, in accordance with established power control techniques.

At 1035, the UE may determine an aggregate transmission power for a first symbol of a slot (symbol i). The UE may determine the aggregate transmission power as a sum of the transmit power for each CC that has a transmission scheduled for the symbol.

At 1040, the UE may determine whether the aggregate transmission power for the symbol exceeds the maximum transmit power threshold ($P_{cmax}$). Such a determination may be made based on a comparison between the calculated aggregate transmission power and a value for $P_{cmax}$ (e.g., 23 dBm).

In the event that the aggregate transmission power for the symbol does not exceed $P_{cmax}$ the UE, at 1045, may transmit each transmission for the symbol. In such cases, the overlapping transmissions of the symbol have an aggregate power that is less than the maximum transmit power threshold and thus none of the transmissions need to be dropped.

At 1050, the UE may increment the symbol within the slot, and the operations starting at 1035 may be performed. In the event that the symbol was the last symbol of the slot, the UE may stop and operations for a subsequent slot may be performed.

In the event that the aggregate transmission power for the symbol does exceed $P_{cmax}$ the UE, at 1055, may calculate a power deficit. Such a power deficit may be calculated as the difference between the calculated aggregate power for the symbol and $P_{cmax}$.

At 1060, the UE may identify a lowest priority transmission or transmissions that are scheduled for the symbol. As discussed above, different transmissions or channels may be assigned a priority level depending on the channel types (e.g., PUCCH, PUSCH) and/or type of uplink control information (UCI) it carries. Based on the assigned priority levels, the UE may determine which of the one or more of the transmissions of one or more CCs have a lowest priority.

At 1065, the UE may determine whether any of the identified lowest priority transmissions start at the current symbol. In some cases, transmissions that are ongoing may have a higher priority than transmissions that are starting at the particular symbol, and identifying which transmissions start at the current symbol may allow such prioritization.

If none of the transmissions start in the current symbol, the UE may, at 1070, select all of the transmissions with the identified priority. If one or more of the transmissions do start at the current symbol, the UE may, at 1075, select those transmissions that start at the current symbol.

At 1080, the UE may determine whether any of the selected transmissions have a transmit power that is greater than or equal to the calculated power deficit. The UE may make such a determination, for example, by comparing the transmit power of each of the selected transmissions to the power deficit.

If one or more of the selected transmissions do have a transmit power that is greater than or equal to the calculated power deficit, the UE may, at 1085, drop such a transmission. In the event that two or more of the selected transmissions meet such criteria, the UE may randomly select one of the transmissions to drop. Because the transmit power of the dropped transmission is greater than or equal to the calculated power deficit, the remaining transmissions of the symbol will have an aggregate transmit power that is at or below $P_{cmax}$, and can each thus be transmitted.

At 1090, the UE may transmit each of the remaining transmissions for the current symbol. The transmissions may be transmitted using one or more CCs in accordance with the scheduled transmission grants of the remaining transmissions. The UE may then perform operations at starting at 1050.

If one or more of the selected transmissions do not have a transmit power that is greater than or equal to the calculated power deficit, the UE may, at 1095, drop a transmission with the highest transmit power. In the event that two or more of the selected transmissions have a same transmit power that is the highest transmit power, the UE may randomly select one of the transmissions to drop. Such an action will reduce the aggregate transmission power for the symbol, but because the transmit power of the dropped transmission is less than the power deficit, the aggregate transmission power for the symbol will still exceed $P_{cmax}$, and the UE may perform operations starting at 1060 to select one or more other transmissions that should be dropped.

Using such techniques, a UE may iteratively drop transmissions until a power threshold for a symbol is met. In some cases, for certain priority levels such as transmissions carrying HARQ-ACK/SR, the UE may perform scaling instead of dropping at the first symbol of the transmission. The scaled power remains unchanged for the whole transmission unless it is dropped.

In some cases, as discussed above, a UE may be incapable of partially-overlapped transmissions within a TAG. In such cases, all overlapped transmissions that start and end at the same time within a TAG may be bundled together as a bundled transmission, and a priority of the bundled transmission maybe set as a highest priority of any transmission of the bundle. In such cases, power allocation is performed by two steps, in which, first, the UE may ensure the transmit power of each bundled transmission does not exceed $P_{cmax}$ and a remaining power (as will be discussed below) when the bundle starts, and second, the UE may perform power allocation among bundled transmissions in a manner as described for individual transmissions. Since all transmissions in a bundle start and end at the same time, power allocation is performed for only one symbol.

Figure 11:
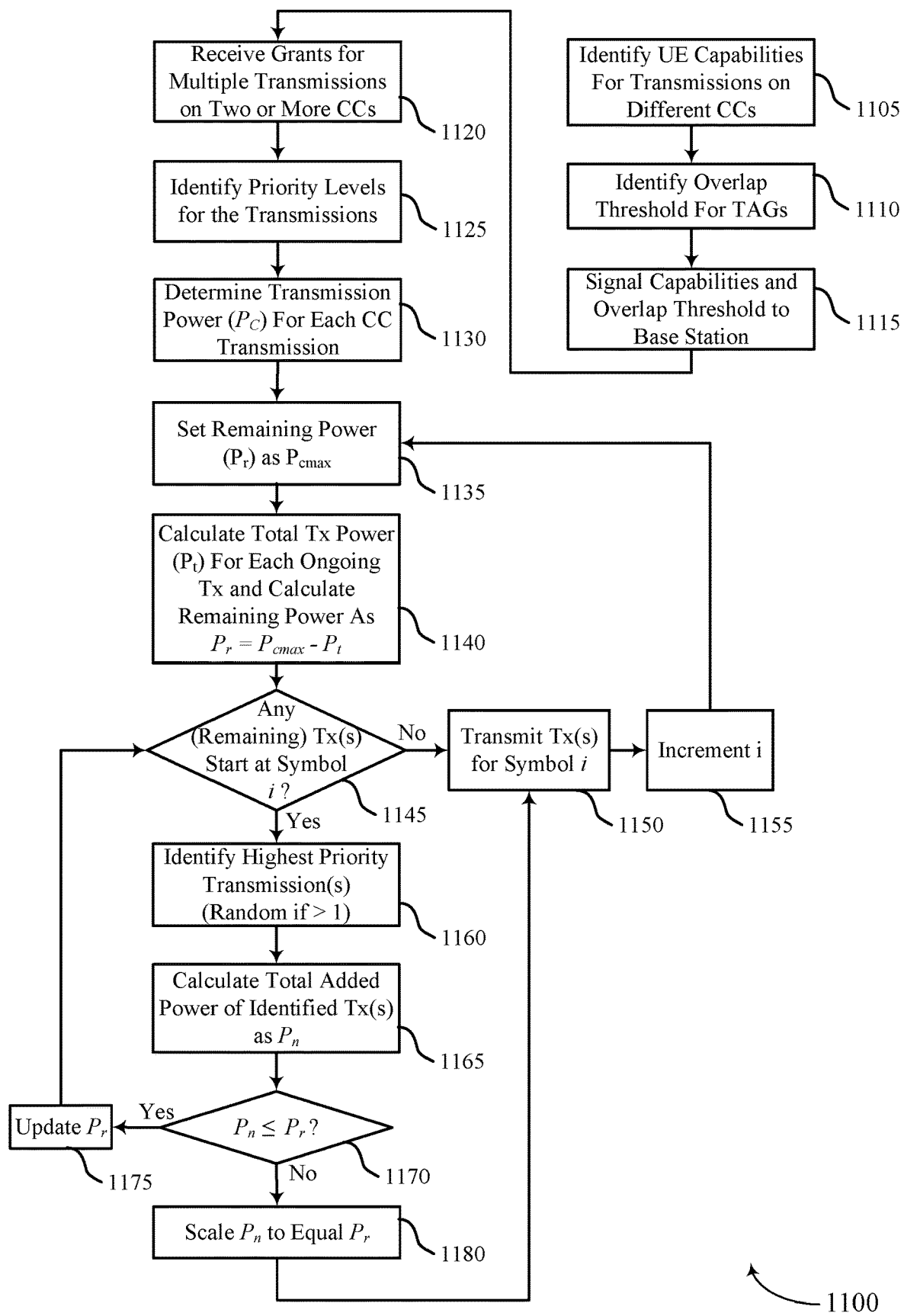
FIG. 11 illustrates an example of another method that supports techniques for power control using carrier aggregation in wireless communications in accordance with aspects of the present disclosure.

FIG. 11 illustrates an example of a another method 1100 that supports techniques for power control using carrier aggregation in wireless communications in accordance with various aspects of the present disclosure. In some examples, another method 1100 may be implemented in aspects of wireless communication system 100 or 200. As indicated above, in some cases dropping rules may be implemented at a UE in which a transmission (or channel) is assigned a priority level depending on the channel types (e.g., PUCCH, PUSCH) and/or type of uplink control information (UCI) it carries, and lower priority transmissions may be dropped in the event that a total transmit power of overlapping transmissions exceeds a maximum transmit power threshold.

In this example, at 1105, similarly as discussed above with respect to FIG. 10, the UE may identify UE capabilities for transmissions on different CCs. Such capabilities may include, for example, whether the UE is capable of transmitting overlapping transmissions on different CCs that have different start times, different stop times, different durations, or combinations thereof. Capabilities may also include whether the UE is capable of supporting inter-band CCs, intra-band non-contiguous CCs, or intra-band contiguous CCs. In some cases, the capabilities of the UE may be preconfigured at the UE. In other cases, the capabilities of the UE may depend upon conditions at the UE, such as thermal conditions that may limit a number of transmit/receive chains that may be active/processed at a particular time, a battery level or power-save mode at the UE, or other conditions at the UE.

At 1110, the UE may identify an overlap threshold for TAGs. As discussed above, in some cases a UE may support multiple different TAGs on different CCs, and the overlap threshold may be an amount of time during which the UE may transmit at powers that exceed the maximum transmit power threshold. In some cases, the value of the overlap threshold may be preconfigured at the UE or determined based on conditions at the UE.

At 1115, the UE may signal its capabilities and overlap threshold to the base station. Such signaling may be transmitted via radio resource control (RRC) signaling, for example. In some cases, such signaling may be provided as part of a connection establishment procedure when the UE and base station establish a connection that supports multiple CCs. In some cases, the UE may determine that capabilities or conditions have changed that result in a different UE capability or overlap threshold, and in some cases such a change may be indicated to the base station after the initial capabilities and overlap threshold are signaled.

At 1120, the UE may receive grants for multiple transmissions on two or more CCs. In some cases, the base station may schedule transmissions at the UE based on the UE capabilities and overlap threshold, and provide the grants to the UE via downlink control information (DCI) that is transmitted to the UE.

At 1125, the UE may identify priority levels for the multiple transmissions. As discussed above, different transmissions or channels may be assigned a priority level depending on the channel types (e.g., PUCCH, PUSCH) and/or type of uplink control information (UCI) it carries. In some cases, priority levels for different transmissions or channels, or type of UCI, may be signaled to the UE by the base station, or may be preconfigured.

At 1130, the UE may determine a transmission power for each CC transmission. Such a determination may be made according to power control information provided to the UE as part of the grants, and available power at the UE, in accordance with established power control techniques.

At 1135, the UE may set a remaining power for the symbol as $P_{cmax}$. By setting the remaining power, the UE may add transmissions scheduled during a symbol until remaining power is no longer available, and any remaining transmissions that are not added may be the dropped transmissions.

At 1140, the UE may calculate the total transmission power for each ongoing transmission. In some cases, as discussed above, ongoing transmissions that have started in a prior symbol may have priority over transmissions that are just starting at the current symbol. To calculate the total transmission power for ongoing transmissions, the UE may sum the transmit powers of each transmission from the preceding symbol that is continuing transmission at the current symbol. The UE may then calculate the remaining power for the current symbol as $P_{cmax}$ minus the total transmission power for each ongoing transmission.

At 1145, the UE may determine if any transmissions start at the current symbol. In the event that the determination at 1145 is made following an iteration of the method, the UE may determine if any remaining transmission start at the current symbol. Such a determination may be made based on any transmissions of any CC that are scheduled to start at the particular current symbol, which may be provided in the grants for the uplink transmissions.

In the event that no additional transmissions start at the current symbol, the UE, at 1150, may transmit the transmissions for the symbol. In such cases, the overlapping transmissions of the symbol have an aggregate power that is less than the maximum transmit power threshold and may be transmitted.

At 1155, the UE may increment the symbol within the slot, and the operations starting at 1135 may be performed. In the event that the symbol was the last symbol of the slot, the UE may stop and operations for a subsequent slot may be performed.

In the event that a transmission does start at the current symbol, the UE may at block 1160 identify a highest priority transmission. In the event that more than one transmission has a same highest priority, the UE may randomly select one such transmission.

At 1165, the UE may calculate the total added power of the identified transmission. The total added power may be calculated based on a transmit power of the identified transmission.

At 1170, the UE may determine whether the total added power of the identified transmission is less than or equal to the calculated remaining power. Such a determination may be made by comparing the transmit power of the identified uplink transmission with the calculated value of the remaining power.

If the total added power of the identified transmission is less than or equal to the calculated remaining power, the UE may, at 1175, update the remaining power value and repeat the operations starting at 1145. The UE may update the remaining power value by subtracting the total added power from the value of the remaining power, thus providing an updated value of the remaining power that is left after adding the identified transmission.

If the total added power of the identified transmission greater than the calculated remaining power, the UE may, at 1180, scale the power of the identified transmission to be equal to the remaining power. For example, the UE may apply a scaling factor as a ratio between the remaining power and the total added power, and apply the scaled power to the newly added transmission. The UE may then perform operations starting at 1150. Alternatively, the UE may decide to drop one or more of the ongoing transmissions of lower priority. In such cases, ongoing transmissions that share an RF chain at the UE may be dropped together. Such dropping may provide additional remaining power that may be used by a higher priority transmission that starts at symbol i.

In examples that use the method 1100, power control may be performed symbol by symbol, and at each symbol the UE may decide to include transmissions based on a power budget. In this example, ongoing transmissions are always included with the same power levels as in the previous symbol, and new transmissions that start at a current symbol are added according to a priority order. In order to use all available power, power scaling may be applied to newly included transmissions to fit the power budget.

Figure 12:
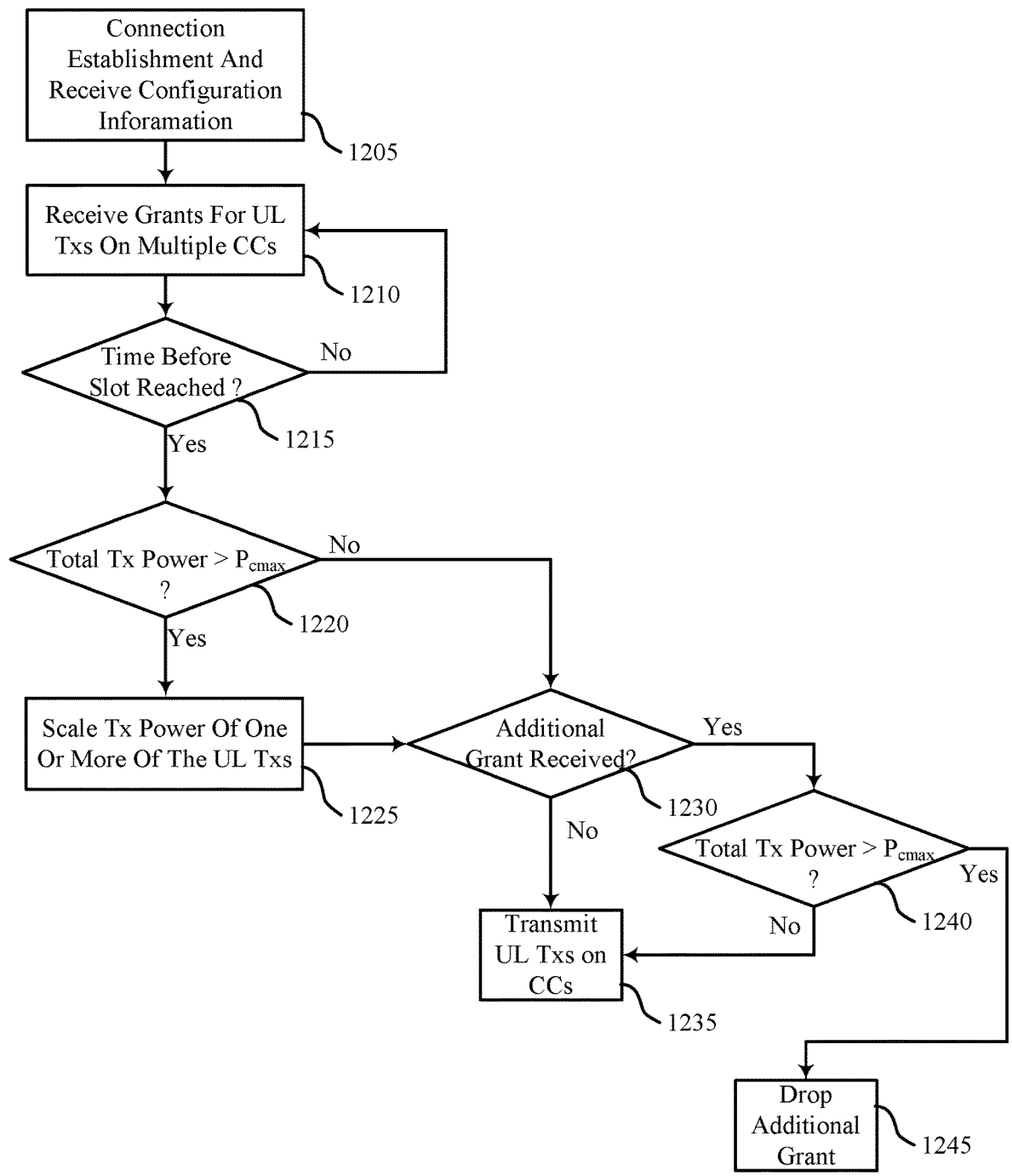
FIG. 12 illustrates an example of another method that supports techniques for power control using carrier aggregation in wireless communications in accordance with aspects of the present disclosure.

FIG. 12 illustrates an example of a method 1200 that supports techniques for power control using carrier aggregation in wireless communications in accordance with various aspects of the present disclosure. In some examples, method 1200 may implement aspects of wireless communication system 100 or 200. As indicated above, in some cases timeline-based rules for selecting transmissions and priorities for power scaling may be implemented at a UE in which a transmission (or channel) is assigned a priority level depending on the channel types (e.g., PUCCH, PUSCH), type of uplink control information (UCI) it carries (e.g., HARQ feedback information, SR information, etc., may have higher priority), whether a transmission is an ongoing or new transmission, or combinations thereof. In some cases, lower priority transmissions may be power scaled in the event that a total transmit power of overlapping transmissions exceeds a maximum transmit power threshold.

In this example, at 1205, the UE and base station may perform connection establishment and the UE may receive configuration information. In some cases, the configuration information may include information for two or more CCs that may be used for uplink transmissions from the UE. In some cases, the UE may identify UE capabilities for transmissions on different CCs. Such capabilities may include, for example, whether the UE is capable of transmitting overlapping transmissions on different CCs that have different start times, different stop times, different durations, or combinations thereof. Capabilities may also include whether the UE is capable of supporting inter-band CCs, intra-band non-contiguous CCs, or intra-band contiguous CCs. In some cases, the capabilities of the UE may be preconfigured at the UE. In other cases, the capabilities of the UE may depend upon conditions at the UE, such as thermal conditions that may limit a number of transmit/receive chains that may be active/processed at a particular time, a battery level or power-save mode at the UE, or other conditions at the UE. The base station may configure one or more of the CCs, and may perform scheduling of transmissions, based at least in part on the capabilities of the UE.

At 1210, the UE may receive grants for uplink transmissions on multiple CCs. In some cases, the base station may schedule transmissions at the UE based on the UE capabilities, and provide the grants to the UE via downlink control information (DCI) that is transmitted to the UE.

At 1215, the UE may determine if the time before the slot has been reached such that the UE may perform power scaling for uplink transmissions. The UE may make such a determination based on a timeline configuration at the UE, such as discussed above with respect to FIG. 9. If the time before the slot has not yet been reached, the operations at 1210 may be continued.

If the time before the slot has been reached, at 1220, the UE may determine whether a total transmit power for the slot exceeds a maximum transmit power threshold ($P_{cmax}$). In some cases, the UE may aggregate transmit powers for overlapping transmissions indicated in the received uplink grants to calculate the total transmit power for the slot, and may compare the total transmit power to the maximum transmit power threshold.

If the total transmit power is greater than the maximum transmit power threshold the UE, at 1225, may scale the transmit power of one or more of the uplink transmissions. In some cases, the UE may scale the transmit power based on a priority order of the uplink transmissions, with higher priority uplink transmissions having less or no power scaling, and lower priority uplink transmissions having more power scaling, such as discussed above with respect to FIG. 9.

After the power scaling, or in the event that it is determined at 1220 that the total transmit power is not greater than the maximum transmit power threshold, the UE at 1230 may determine if any additional grant has been received. In some cases, a base station may provide an uplink grant after the time identified at 1215. In such cases, the UE may not be able to use such uplink transmissions in power scaling computations. If no additional grant is received, the UE may transmit the uplink transmissions on the CCs, as indicated at 1235.

If an additional grant has been received, at 1240 the UE may determine whether the total transmit power including a transmit power of the additional grant is greater than the maximum transmit power threshold. In some cases, the UE may add a transmit power associated with the additional grant to the total transmit power or the scaled transmit power, and compare the updated total transmit power to the maximum transmit power threshold.

If it is determined at 1240 that the total transmit power including a transmit power of the additional grant is greater than the maximum transmit power threshold, the UE may, at 1245, drop the additional grant.

If it is determined at 1240 that the total transmit power including a transmit power of the additional grant is not greater than the maximum transmit power threshold, or in the case that no additional grants were received at 1230, the UE may transmit the uplink transmissions on the CCs, as indicated at 1235. The uplink transmissions may be transmitted using uplink resources of the CCs as indicated in the uplink grants, and may use a transmit power that may be scaled in accordance with techniques such as discussed herein.

Figure 13:
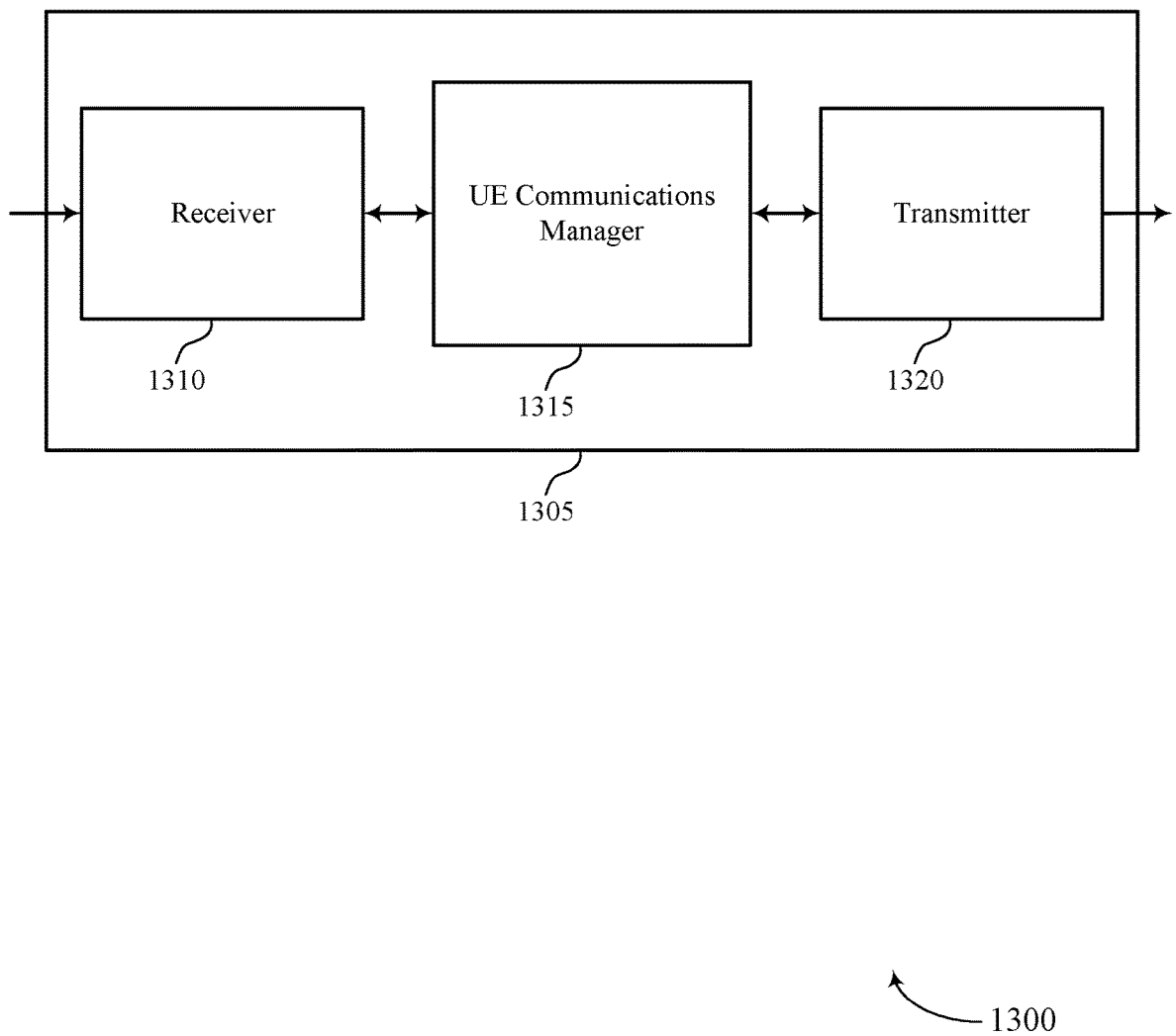
FIGS. 13 through 15 show block diagrams of a device that supports techniques for power control using carrier aggregation in wireless communications in accordance with aspects of the present disclosure.

FIG. 13 shows a block diagram 1300 of a wireless device 1305 that supports techniques for power control using carrier aggregation in wireless communications in accordance with aspects of the present disclosure. Wireless device 1305 may be an example of aspects of a user equipment (UE) 115 as described herein. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for power control using carrier aggregation in wireless communications, etc.). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, UE communications manager 1315 may establish a connection with a base station, the connection supporting two or more CCs within a TAG, identify, at the UE, a capability for supporting transmissions that have different starting times or durations on different CCs, and transmit an indication of the capability to the base station.

Additionally or alternatively, the UE communications manager 1315 may, additionally or alternatively, establish a connection with a base station, the connection supporting two or more CCs within different TAGs, identify, at the UE, an overlap threshold corresponding to an amount of time that is exempt from a power control limit in which a new transmission on a first CC of a first TAG can overlap with a last portion of an existing transmission on a second CC of a second TAG, and transmit an indication of the overlap threshold to the base station.

Additionally or alternatively, the UE communications manager 1315 may establish a connection with a base station, the connection supporting two or more CCs, receive a set of grants of uplink resources for a set of uplink transmissions on the two or more CCs during a slot, determine that a transmit power to transmit the set of uplink transmissions exceeds a maximum power threshold for the UE during at least a portion of the slot, drop at least a portion of a first uplink transmission of the set of uplink transmissions, where a resulting transmit power is less than or equal to the maximum power threshold, and transmit remaining uplink transmissions of the set of uplink transmissions during the slot using one or more of the CCs.

Additionally or alternatively, the UE communications manager 1315 may establish a connection with a base station, the connection supporting two or more CCs, receive a set of grants of uplink resources for a set of uplink transmissions on the two or more CCs during a slot, where the set of grants are received at least a predetermined time in advance of a start of the slot, determine that a transmit power to transmit the set of uplink transmissions exceeds a maximum power threshold for the UE during at least a portion of the slot, scale a transmit power of at least a subset of the set of uplink transmissions to provide that the transmit power is less than or equal to the maximum power threshold, and transmit the set of uplink transmissions during the slot using one or more of the CCs.

Additionally or alternatively, the UE communications manager 1315 may establish a connection with a base station, the connection supporting two or more component carriers (CCs), receive a set of grants of uplink resources for a set of uplink transmissions on the two or more CCs during a slot, where the set of grants are received at least a predetermined time in advance of a start of the slot, identify a first uplink transmission of the set of uplink transmissions has a first priority that is higher than at least a second priority of a second uplink transmission of the set of uplink transmissions that overlaps the first uplink transmission, determine a first transmit power of the first uplink transmission, scale a second transmit power of the second uplink transmission such that an aggregate transmission power of the UE is less than or equal to a maximum power threshold, and transmit the set of uplink transmissions during the slot using the two or more CCs.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
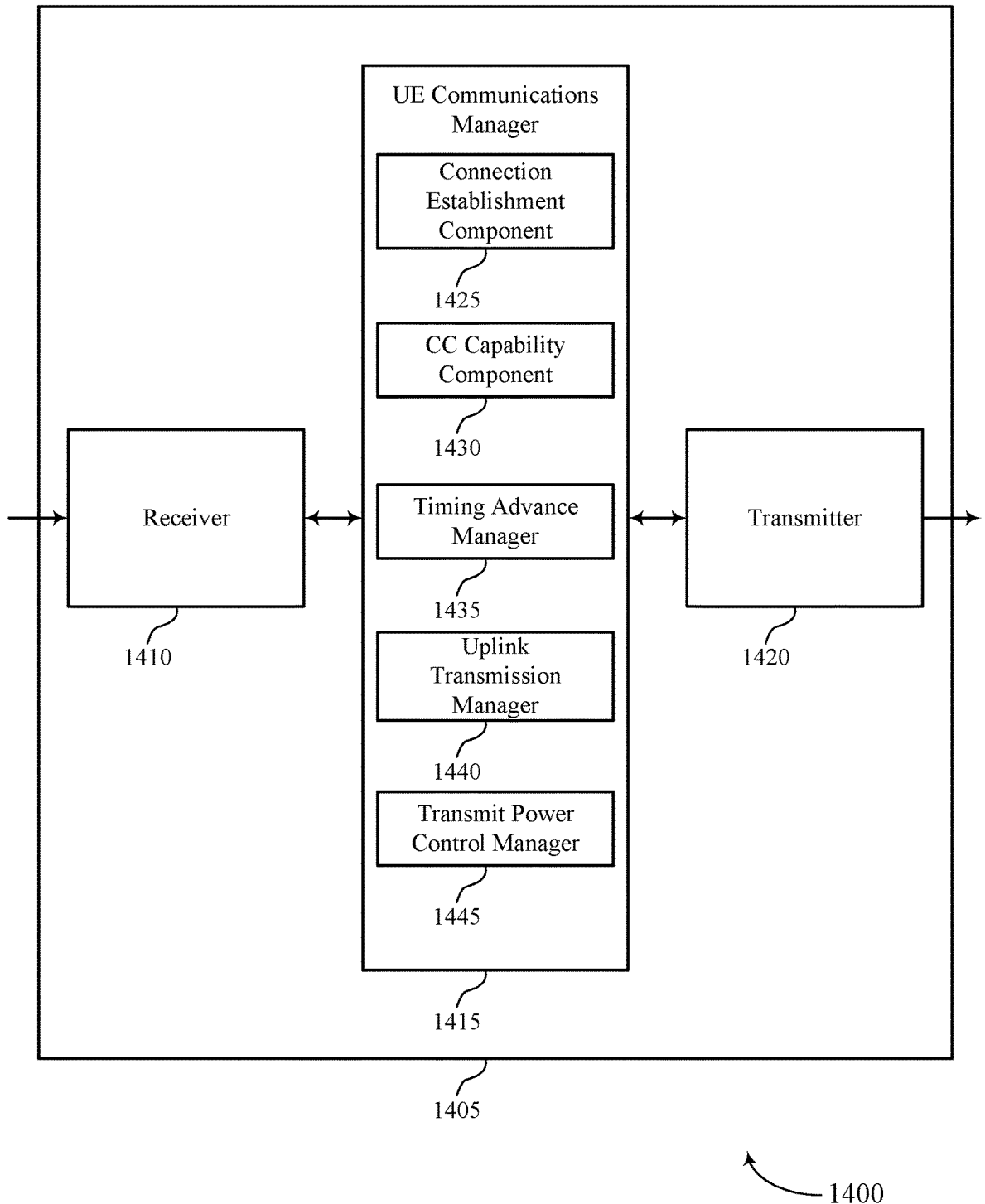

FIG. 14 shows a block diagram 1400 of a wireless device 1405 that supports techniques for power control using carrier aggregation in wireless communications in accordance with aspects of the present disclosure. Wireless device 1405 may be an example of aspects of a wireless device 1305 or a UE 115 as described with reference to FIG. 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for power control using carrier aggregation in wireless communications, etc.). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16. UE communications manager 1415 may also include connection establishment component 1425, CC capability component 1430, timing advance manager 1435, uplink transmission manager 1440, and transmit power control manager 1445.

Connection establishment component 1425 may establish a connection with a base station, the connection supporting two or more CCs within a TAG. In some cases, connection establishment component 1425 may establish a connection with a base station, the connection supporting two or more CCs within different TAGs.

CC capability component 1430 may identify a capability for supporting transmissions that have different starting times or durations on different CCs and transmit an indication of the capability to the base station. In some cases, the identifying includes identifying the capability for supporting transmissions that have different starting times or durations for each of a set of different frequency bands or combinations of different frequency bands. In some cases, the capability for supporting different starting times or durations for each of the set of different frequency bands or combinations of different frequency bands is determined based on a number of RF chains available for transmissions at the UE. In some cases, the set of different frequency bands or combinations of different frequency bands include intra-band contiguous carrier frequencies per RF chain at the UE. In some cases, the set of different frequency bands or combinations of different frequency bands include intra-band noncontiguous or inter-band carrier frequencies for multiple RF chains at the UE.

Timing advance manager 1435 may identify an overlap threshold corresponding to an amount of time that is exempt from a power control limit in which a new transmission on a first CC of a first TAG can overlap with a last portion of an existing transmission on a second CC of a second TAG, transmit an indication of the overlap threshold to the base station, and determine whether a timing difference between the first CC and the second CC exceeds the overlap threshold. In some cases, the overlap threshold applies to a start or an end of a transmission on one or more of the CCs. In some cases, if the timing difference exceeds the overlap threshold, one or more transmissions of one or more CCs may be dropped in accordance with techniques provided herein.

Uplink transmission manager 1440 may receive grants of uplink resources for uplink transmissions on the first CC and the second CC. In some cases, uplink transmission manager 1440 may receive a set of grants of uplink resources for a set of uplink transmissions on the two or more CCs during a slot. In some cases, uplink transmission manager 1440 may transmit uplink transmissions of the set of uplink transmissions during the slot using one or more of the CCs based on transmission dropping techniques as discussed herein. In some cases, uplink transmission manager 1440 may identify a first subset of a set of overlapping uplink transmissions having a transmission start time that precedes the first symbol and a second subset of the set of overlapping uplink transmissions that start at the first symbol, such uplink transmissions being given higher priority in some cases.

In some cases, uplink transmission manager 1440 may receive a set of grants of uplink resources for a set of uplink transmissions on the two or more CCs during a slot, where the set of grants are received at least a predetermined time in advance of a start of the slot. In some cases, uplink transmission manager 1440 may receive an additional grant for an additional uplink transmission after the predetermined time and before the start of the slot, and transmit the additional uplink transmission responsive to determining that the additional uplink transmission would not increase an aggregate transmit power of the UE over the maximum power threshold. In some cases, a time gap between the last control information transmission and the start of the slot is based on uplink information to be transmitted using one or more of the set of uplink transmissions. In some cases, a first CC of the two or more CCs has a different symbol duration than at least a second CC of the two or more CCs, and the last control information transmission that includes at least one of the set of grants is signaled separately for the first CC and the second CC.

Transmit power control manager 1445 may determine transmission power and transmissions to be dropped in accordance with techniques provided herein. In some cases, transmit power control manager 1445 may determine that a transmit power to transmit a set of uplink transmissions exceeds a maximum power threshold for the UE during at least a portion of the slot, and drop at least a first uplink transmission of the set of uplink transmissions, where a resulting transmit power is less than or equal to the maximum power threshold. In some cases, transmit power control manager 1445 may drop the first uplink transmission based on the first uplink transmission having a priority that is lower than a priority of other of the two or more overlapping uplink transmissions.

In some cases, transmit power control manager 1445 may determine that the first uplink transmission has an associated first uplink transmit power that is equal to or greater than a difference between the maximum power threshold and an aggregate power of other of the set of uplink transmissions that are overlapping with the first uplink transmission, and drop the first uplink transmission based on such a determination. In some cases, transmit power control manager 1445 may identify a first symbol of the slot in which overlapping uplink transmissions have an aggregate transmit power that exceeds the maximum power threshold for the UE, identify one or more uplink transmissions of the overlapping uplink transmissions that are ongoing transmissions and set the ongoing transmissions to have a higher priority.

In some cases, transmit power control manager 1445 may determine that a first CC and second CC have timing advances (TAs) that result in an overlapped portion of transmissions, and may modify an uplink transmission of one or both of the first CC or second CC based on a timing difference of the TAs. In some cases, the modifying includes one of dropping a first CC transmission that ends at a slot boundary between the consecutive slots, dropping a second CC transmission that starts at the slot boundary, reducing a transmit power of the first CC transmission, the second CC transmission, or both, dropping a last symbol of a the first CC transmission, or dropping a first symbol of the second CC transmission.

In some cases, transmit power control manager 1445 may iteratively identify transmissions to be dropped from a symbol having a number of overlapping transmissions that exceed a maximum power threshold, and determine that the first uplink transmission has a minimum power among a subset of uplink transmissions that may be dropped, and may drop the first uplink transmission. In some cases, if two or more uplink transmissions are identified that may be dropped, the transmit power control manager 1445 may randomly select one of uplink transmissions to be dropped. In some cases, the determining and dropping are performed on a symbol-by-symbol basis when formatting the set of uplink transmissions for transmission during the slot.

In some cases, transmit power control manager 1445 may, scale transmit powers of one or more overlapping uplink transmissions responsive to determining that the set of uplink transmissions exceeds the maximum power threshold. In some cases, transmit power control manager 1445 may identify an additional uplink grant is received after power control functions, and drop the additional uplink transmission responsive to determining that the additional uplink transmission would increase an aggregate transmit power of the UE above the maximum power threshold.

In some cases, transmit power control manager 1445 may determine a first transmit power of a first uplink transmission and a second transmit power of a second uplink transmission, determine a remaining power between the aggregate transmission power of the UE and the maximum power threshold, identify a third uplink transmission that overlaps with the first uplink transmission and the second uplink transmission, and that has a lower priority than the first priority and second priority, and allocate the remaining power to the third uplink transmission. In some cases, the predetermined time for receiving the set of grants is preconfigured or signaled between the base station and the UE. In some cases, the predetermined time for receiving the set of grants is based on a capability of the UE. In some cases, each symbol of an uplink transmission during the slot has a same transmit power.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
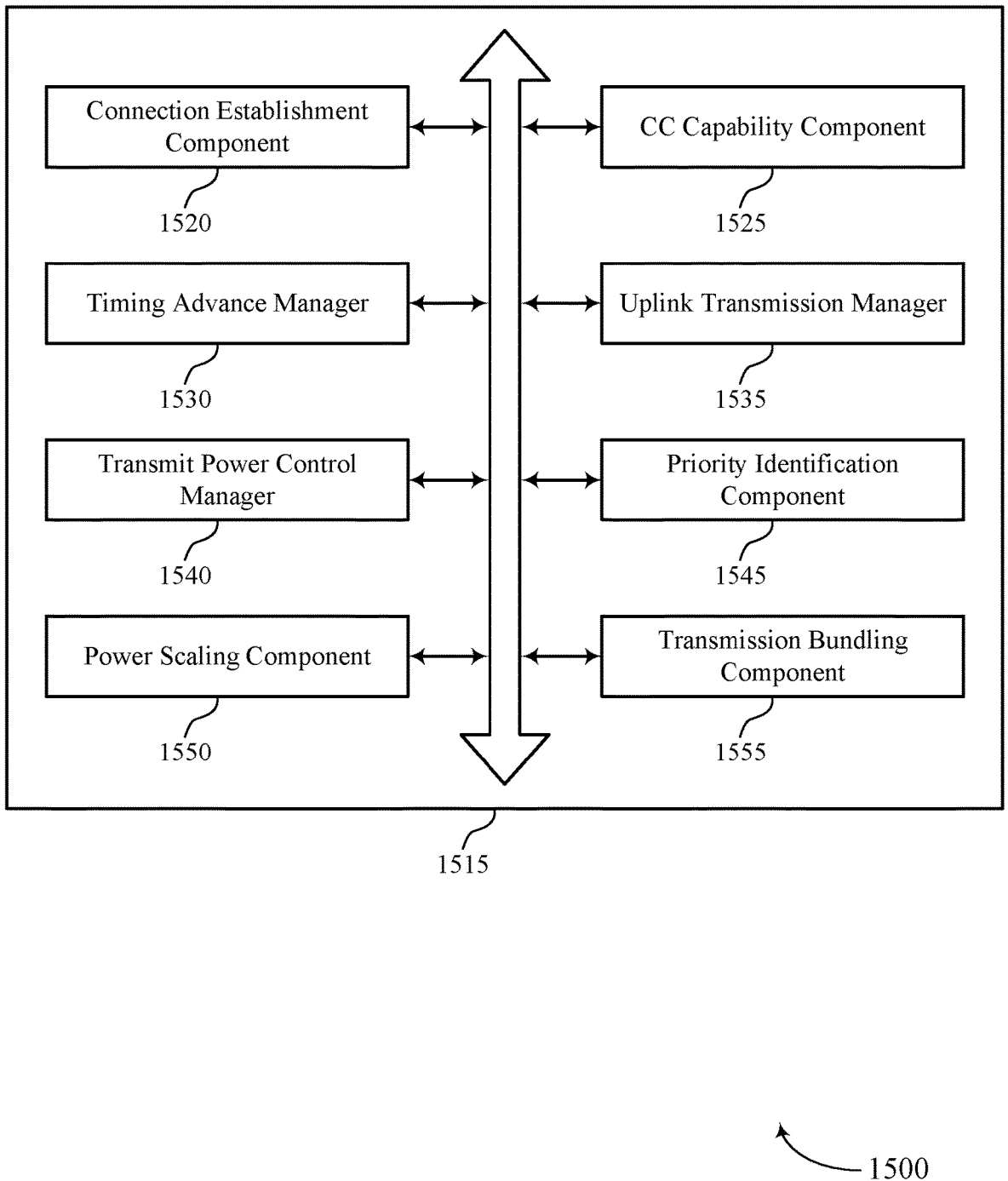

FIG. 15 shows a block diagram 1500 of a UE communications manager 1515 that supports techniques for power control using carrier aggregation in wireless communications in accordance with aspects of the present disclosure. The UE communications manager 1515 may be an example of aspects of a UE communications manager 1315, a UE communications manager 1415, or a UE communications manager 1615 described with reference to FIGS. 13, 14, and 16. The UE communications manager 1515 may include connection establishment component 1520, CC capability component 1525, timing advance manager 1530, uplink transmission manager 1535, transmit power control manager 1540, priority identification component 1545, power scaling component 1550, and transmission bundling component 1555. Each of these modules may communicate, directly or indirectly, with one another (e.g., via one or more buses).

Connection establishment component 1520 may establish a connection with a base station, the connection supporting two or more CCs within a TAG. In some cases, connection establishment component 1520 may establish a connection with a base station, the connection supporting two or more CCs within different TAGs.

CC capability component 1525 may identify a capability for supporting transmissions that have different starting times or durations on different CCs and transmit an indication of the capability to the base station. In some cases, the identifying includes identifying the capability for supporting transmissions that have different starting times or durations for each of a set of different frequency bands or combinations of different frequency bands. In some cases, the capability for supporting different starting times or durations for each of the set of different frequency bands or combinations of different frequency bands is determined based on a number of RF chains available for transmissions at the UE. In some cases, the set of different frequency bands or combinations of different frequency bands include intra-band contiguous carrier frequencies per RF chain at the UE. In some cases, the set of different frequency bands or combinations of different frequency bands include intra-band noncontiguous or inter-band carrier frequencies for multiple RF chains at the UE.

Timing advance manager 1530 may identify an overlap threshold corresponding to an amount of time that is exempt from a power control limit in which a new transmission on a first CC of a first TAG can overlap with a last portion of an existing transmission on a second CC of a second TAG, transmit an indication of the overlap threshold to the base station, and determine whether a timing difference between the first CC and the second CC exceeds the overlap threshold. In some cases, the overlap threshold applies to a start or an end of a transmission on one or more of the CCs. In some cases, if the timing difference exceeds the overlap threshold, one or more transmissions of one or more CCs may be dropped in accordance with techniques provided herein.

Uplink transmission manager 1535 may receive grants of uplink resources for uplink transmissions on the first CC and the second CC. In some cases, uplink transmission manager 1535 may receive a set of grants of uplink resources for a set of uplink transmissions on the two or more CCs during a slot. In some cases, uplink transmission manager 1535 may transmit uplink transmissions of the set of uplink transmissions during the slot using one or more of the CCs based on transmission dropping techniques as discussed herein. In some cases, uplink transmission manager 1535 may identify a first subset of a set of overlapping uplink transmissions having a transmission start time that precedes the first symbol and a second subset of the set of overlapping uplink transmissions that start at the first symbol, such uplink transmissions being given higher priority in some cases.

Transmit power control manager 1540 may determine transmission power and transmissions to be dropped in accordance with techniques provided herein. In some cases, transmit power control manager 1540 may determine that a transmit power to transmit a set of uplink transmissions exceeds a maximum power threshold for the UE during at least a portion of the slot, and drop at least a first uplink transmission of the set of uplink transmissions, where a resulting transmit power is less than or equal to the maximum power threshold. In some cases, transmit power control manager 1540 may drop the first uplink transmission based on the first uplink transmission having a priority that is lower than a priority of other of the two or more overlapping uplink transmissions.

In some cases, transmit power control manager 1540 may determine that the first uplink transmission has an associated first uplink transmit power that is equal to or greater than a difference between the maximum power threshold and an aggregate power of other of the set of uplink transmissions that are overlapping with the first uplink transmission, and drop the first uplink transmission based on such a determination. In some cases, transmit power control manager 1540 may identify a first symbol of the slot in which overlapping uplink transmissions have an aggregate transmit power that exceeds the maximum power threshold for the UE, identify one or more uplink transmissions of the overlapping uplink transmissions that are ongoing transmissions and set the ongoing transmissions to have a higher priority.

In some cases, transmit power control manager 1540 may determine that a first CC and second CC have timing advances (TAs) that result in an overlapped portion of transmissions, and may modify an uplink transmission of one or both of the first CC or second CC based on a timing difference of the TAs. In some cases, the modifying includes one of dropping a first CC transmission that ends at a slot boundary between the consecutive slots, dropping a second CC transmission that starts at the slot boundary, reducing a transmit power of the first CC transmission, the second CC transmission, or both, dropping a last symbol of a the first CC transmission, or dropping a first symbol of the second CC transmission.

In some cases, transmit power control manager 1540 may iteratively identify transmissions to be dropped from a symbol having a number of overlapping transmissions that exceed a maximum power threshold, and determine that the first uplink transmission has a minimum power among a subset of uplink transmissions that may be dropped, and may drop the first uplink transmission. In some cases, if two or more uplink transmissions are identified that may be dropped, the transmit power control manager 1540 may randomly select one of uplink transmissions to be dropped. In some cases, the determining and dropping are performed on a symbol-by-symbol basis when formatting the set of uplink transmissions for transmission during the slot.

In some cases, transmit power control manager 1540 may, scale transmit powers of one or more overlapping uplink transmissions responsive to determining that the set of uplink transmissions exceeds the maximum power threshold. In some cases, transmit power control manager 1540 may identify an additional uplink grant is received after power control functions, and drop the additional uplink transmission responsive to determining that the additional uplink transmission would increase an aggregate transmit power of the UE above the maximum power threshold.

In some cases, transmit power control manager 1540 may determine a first transmit power of a first uplink transmission and a second transmit power of a second uplink transmission, determine a remaining power between the aggregate transmission power of the UE and the maximum power threshold, identify a third uplink transmission that overlaps with the first uplink transmission and the second uplink transmission, and that has a lower priority than the first priority and second priority, and allocate the remaining power to the third uplink transmission. In some cases, the predetermined time for receiving the set of grants is preconfigured or signaled between the base station and the UE. In some cases, the predetermined time for receiving the set of grants is based on a capability of the UE. In some cases, each symbol of an uplink transmission during the slot has a same transmit power.

Priority identification component 1545 may select a first CC transmission or second CC transmission to be dropped or transmitted with reduced power based on a priority associated with each of the first CC transmission and the second CC transmission. In some cases, the selection may be based on one or more of an identified priority associated with two or more overlapping uplink transmissions that have an aggregate power that exceeds the maximum power threshold, or an identified first subset of bundled uplink transmissions of the set of uplink transmissions that have a first priority that is lower than at least a second priority of one or more other subsets of the set of uplink transmissions.

Power scaling component 1550 may scale a transmit power of the at least one uplink transmission such that the transmission power of the UE is less than or equal to the maximum power threshold. In some cases, a transmit power of one or more uplink transmissions may be scaled to correspond to a difference between the maximum power threshold and an aggregate transmit power.

In some cases, power scaling component 1550 may scale a transmit power of at least a subset of the set of uplink transmissions to provide that the transmit power is less than or equal to the maximum power threshold. In some cases, the scaling the transmit power is performed during a time period that has a start time after a last control information transmission associated with the slot and an end time at a boundary of the start of the slot. In some cases, the UE further scales more than one uplink transmissions having a same priority such that an aggregate transmission power of the UE is less than or equal to a maximum power threshold.

Transmission bundling component 1555 may bundle one or more transmissions of different TAGs. In some cases, the set of uplink transmissions include a first subset of uplink transmissions of a first TAG and a second subset of uplink transmissions of a second TAG, the UE bundles the first subset of uplink transmissions into a first bundled subset of uplink transmissions and the second subset of uplink transmissions into a second bundled subset of uplink transmissions. Power control techniques, such as the dropping of transmissions, may be performed based on the bundled subsets of uplink transmissions and a priority of the bundled subset may be set to be a highest priority of transmissions in the subset.

Figure 16:
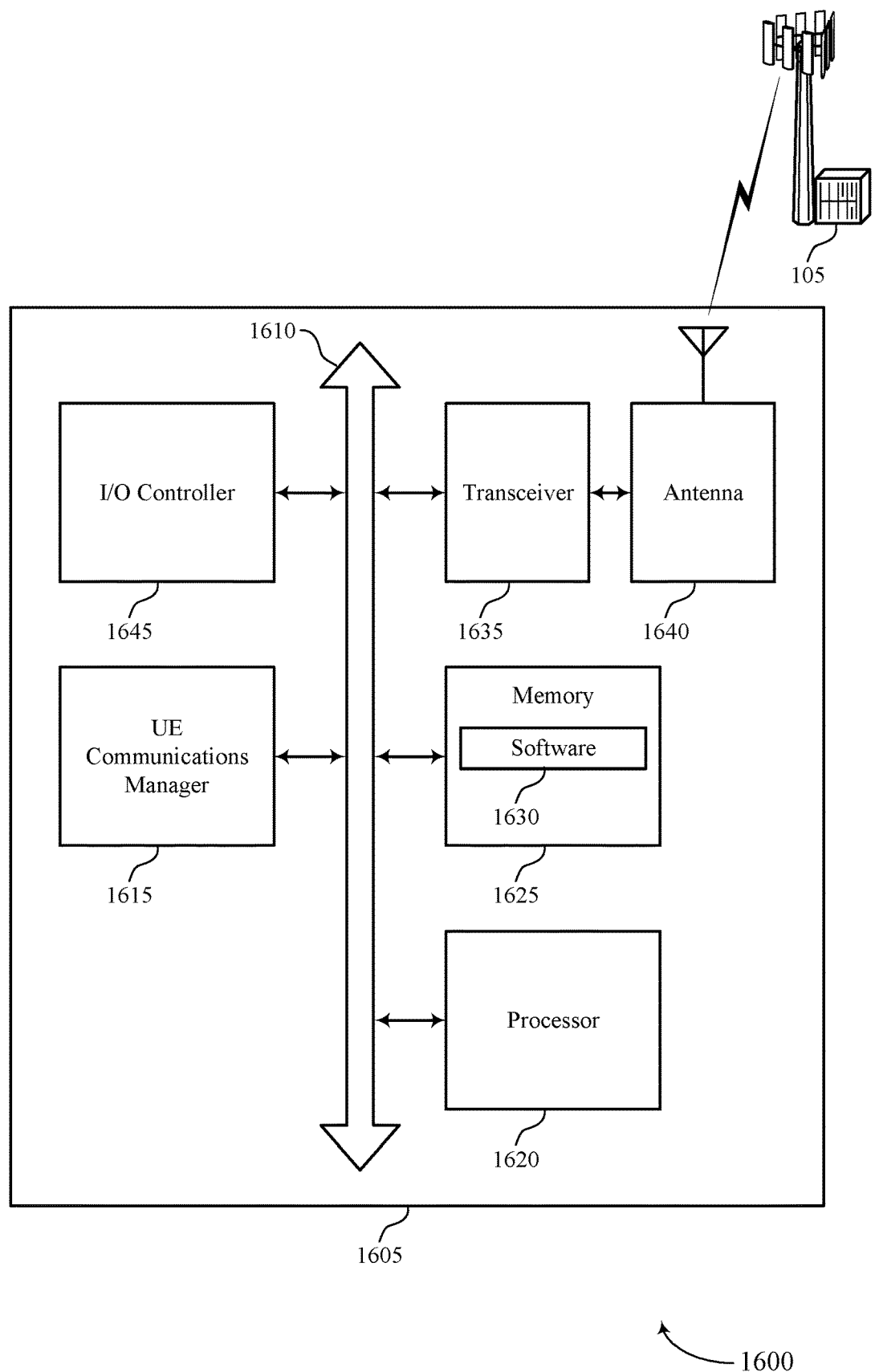
FIG. 16 illustrates a block diagram of a system including a UE that supports techniques for power control using carrier aggregation in wireless communications in accordance with aspects of the present disclosure.

FIG. 16 shows a diagram of a system 1600 including a device 1605 that supports techniques for power control using carrier aggregation in wireless communications in accordance with aspects of the present disclosure. Device 1605 may be an example of or include the components of wireless device 1305, wireless device 1405, or a UE 115 as described above, e.g., with reference to FIGS. 13 and 14. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques for power control using carrier aggregation in wireless communications).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support techniques for power control using carrier aggregation in wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
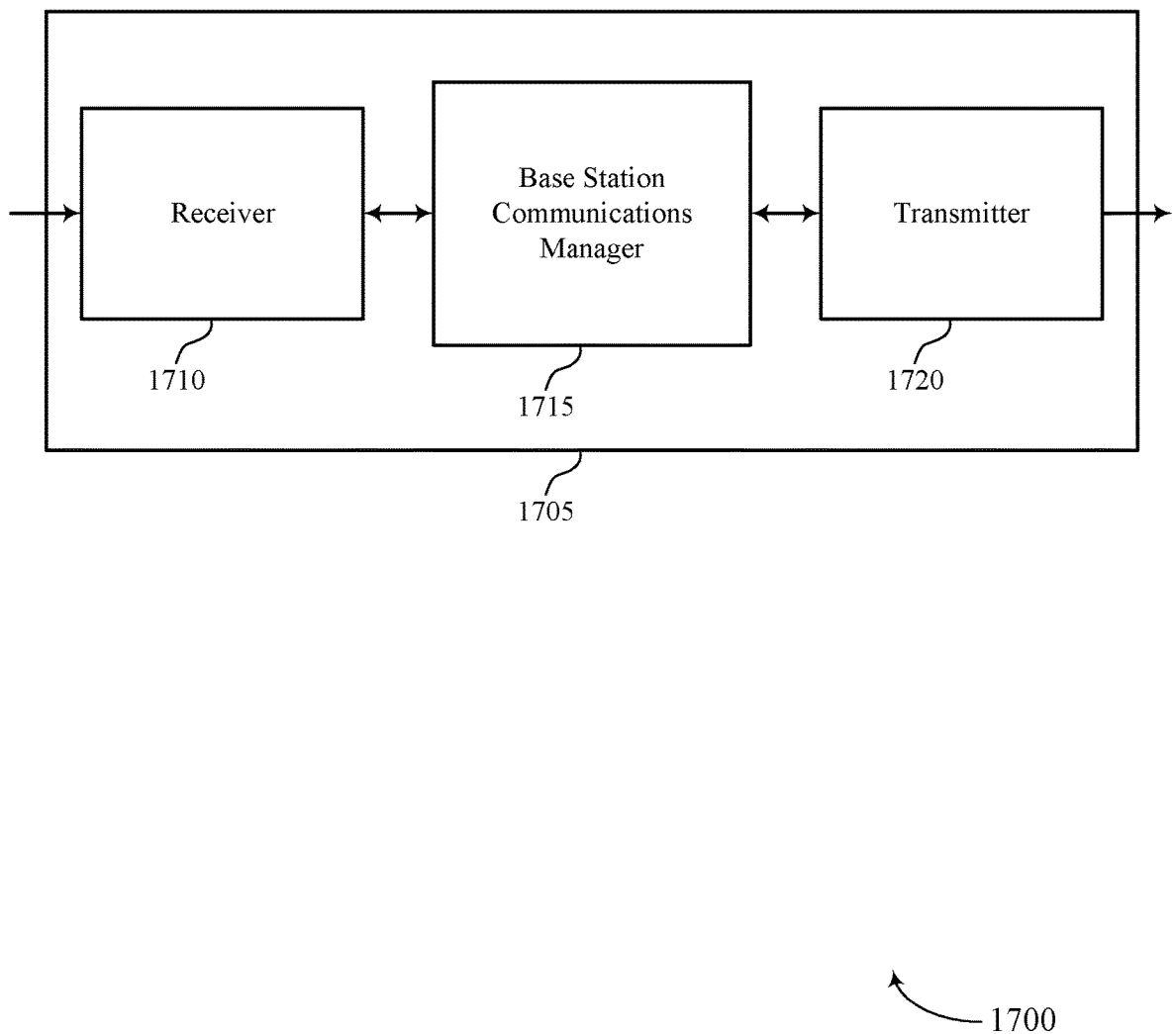
FIGS. 17 through 19 show block diagrams of a device that supports techniques for power control using carrier aggregation in wireless communications in accordance with aspects of the present disclosure.

FIG. 17 shows a block diagram 1700 of a wireless device 1705 that supports techniques for power control using carrier aggregation in wireless communications in accordance with aspects of the present disclosure. Wireless device 1705 may be an example of aspects of a base station 105 as described herein. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to techniques for power control using carrier aggregation in wireless communications, etc.). Information may be passed on to other components of the device. The receiver 1710 may be an example of aspects of the transceiver 2035 described with reference to FIG. 20. The receiver 1710 may utilize a single antenna or a set of antennas.

Base station communications manager 1715 may be an example of aspects of the base station communications manager 2015 described with reference to FIG. 20.

Base station communications manager 1715 and/or at least some of its various sub-components may be implemented in hardware, software executed by a processor, firmware, or any combination thereof. If implemented in software executed by a processor, the functions of the base station communications manager 1715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1715 and/or at least some of its various sub-components may be physically located at various positions, including being distributed such that portions of functions are implemented at different physical locations by one or more physical devices. In some examples, base station communications manager 1715 and/or at least some of its various sub-components may be a separate and distinct component in accordance with various aspects of the present disclosure. In other examples, base station communications manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1715 may establish a connection with a UE having two or more CCs within a TAG or in different TAGs, receive an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG, schedule a set uplink transmissions for the UE using the two or more CCs based on the indication and overlap threshold, and transmit a set of uplink grants to the UE that include resource grants for the set of uplink transmissions.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas.

Figure 18:
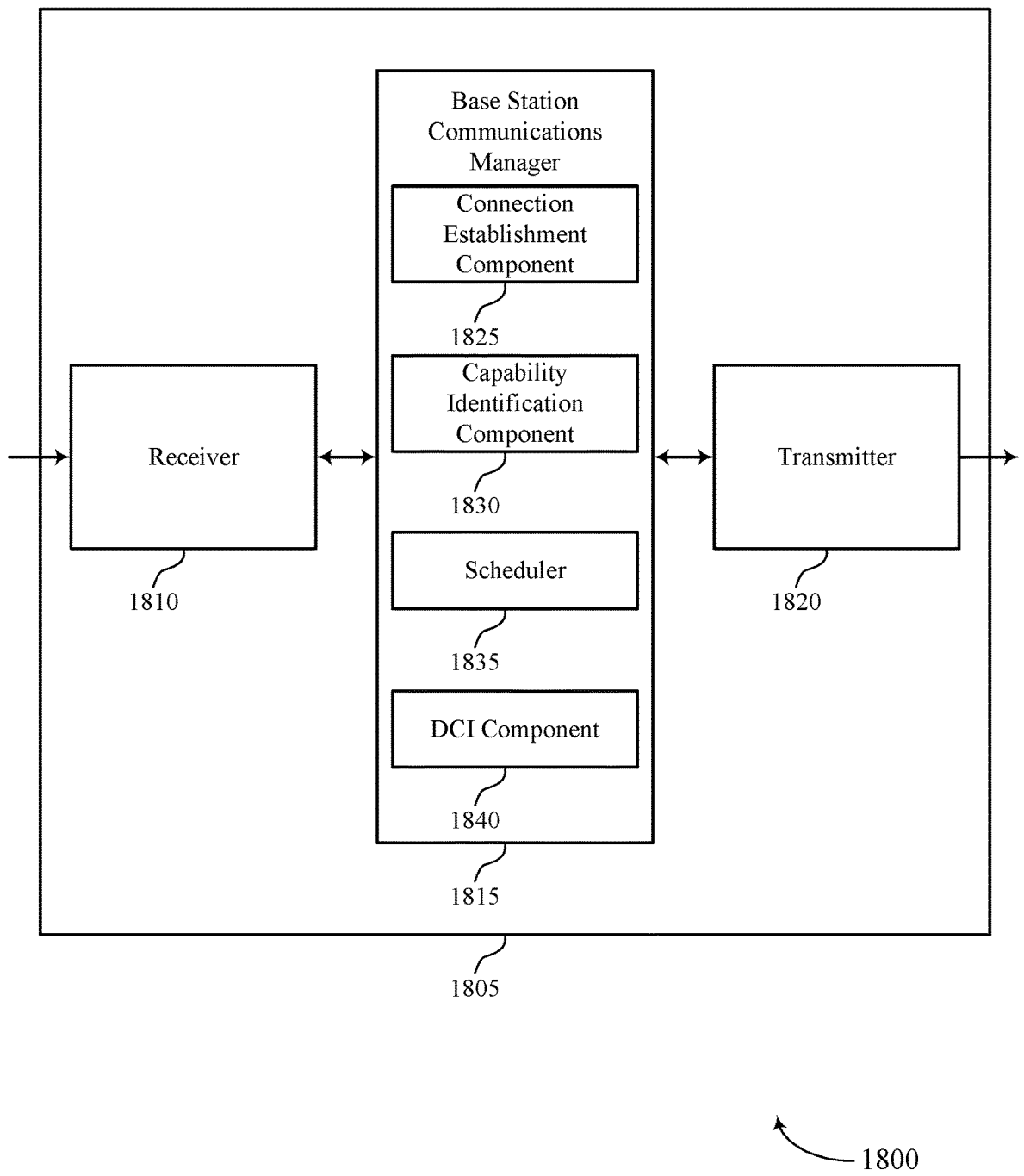

FIG. 18 shows a block diagram 1800 of a wireless device 1805 that supports techniques for power control using carrier aggregation in wireless communications in accordance with aspects of the present disclosure. Wireless device 1805 may be an example of aspects of a wireless device 1705 or a base station 105 as described with reference to FIG. 17. Wireless device 1805 may include receiver 1810, base station communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to techniques for power control using carrier aggregation in wireless communications, etc.). Information may be passed on to other components of the device. The receiver 1810 may be an example of aspects of the transceiver 2035 described with reference to FIG. 20. The receiver 1810 may utilize a single antenna or a set of antennas.

Base station communications manager 1815 may be an example of aspects of the base station communications manager 2015 described with reference to FIG. 20. Base station communications manager 1815 may also include connection establishment component 1825, capability identification component 1830, scheduler 1835, and downlink control information (DCI) component 1840.

Connection establishment component 1825 may establish a connection with a UE having two or more CCs within a TAG or in different TAGs.

Capability identification component 1830 may receive an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG.

Scheduler 1835 may schedule a set uplink transmissions for the UE using the two or more CCs based on the indication and overlap threshold. DCI component 1840 may transmit a set of uplink grants to the UE that include resource grants for the set of uplink transmissions.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
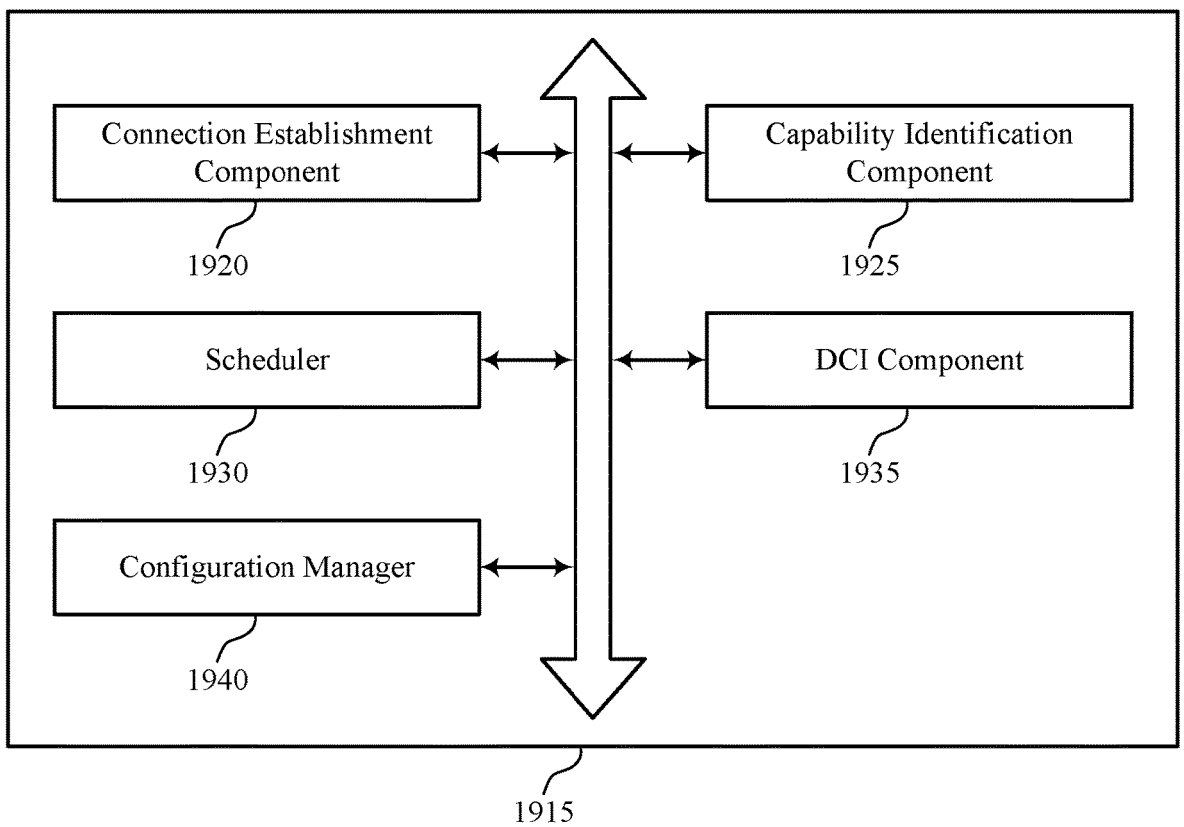

FIG. 19 shows a block diagram 1900 of a base station communications manager 1915 that supports techniques for power control using carrier aggregation in wireless communications in accordance with aspects of the present disclosure. The base station communications manager 1915 may be an example of aspects of a base station communications manager 2015 described with reference to FIGS. 17, 18, and 20. The base station communications manager 1915 may include connection establishment component 1920, capability identification component 1925, scheduler 1930, DCI component 1935, and configuration manager 1940. Each of these modules may communicate, directly or indirectly, with one another (e.g., via one or more buses).

Connection establishment component 1920 may establish a connection with a UE having two or more CCs within a TAG or in different TAGs.

Capability identification component 1925 may receive an indication from the UE that indicates whether the UE is capable of supporting transmissions that have different starting times or durations on different CCs and an overlap threshold corresponding to an amount of time that is exempt from a power control limit in which a new transmission on a first CC of a first TAG can overlap with a last portion of an existing transmission on a second CC of a second TAG.

Scheduler 1930 may schedule a set uplink transmissions for the UE using the two or more CCs based on the indication and overlap threshold. DCI component 1935 may transmit a set of uplink grants to the UE that include resource grants for the set of uplink transmissions.

Configuration manager 1940 may configure the UE with one or more power control parameters based on the indication, the one or more power control parameters providing power control priorities and ordering for performing power control for uplink transmissions on the two or more CCs.

Figure 20:
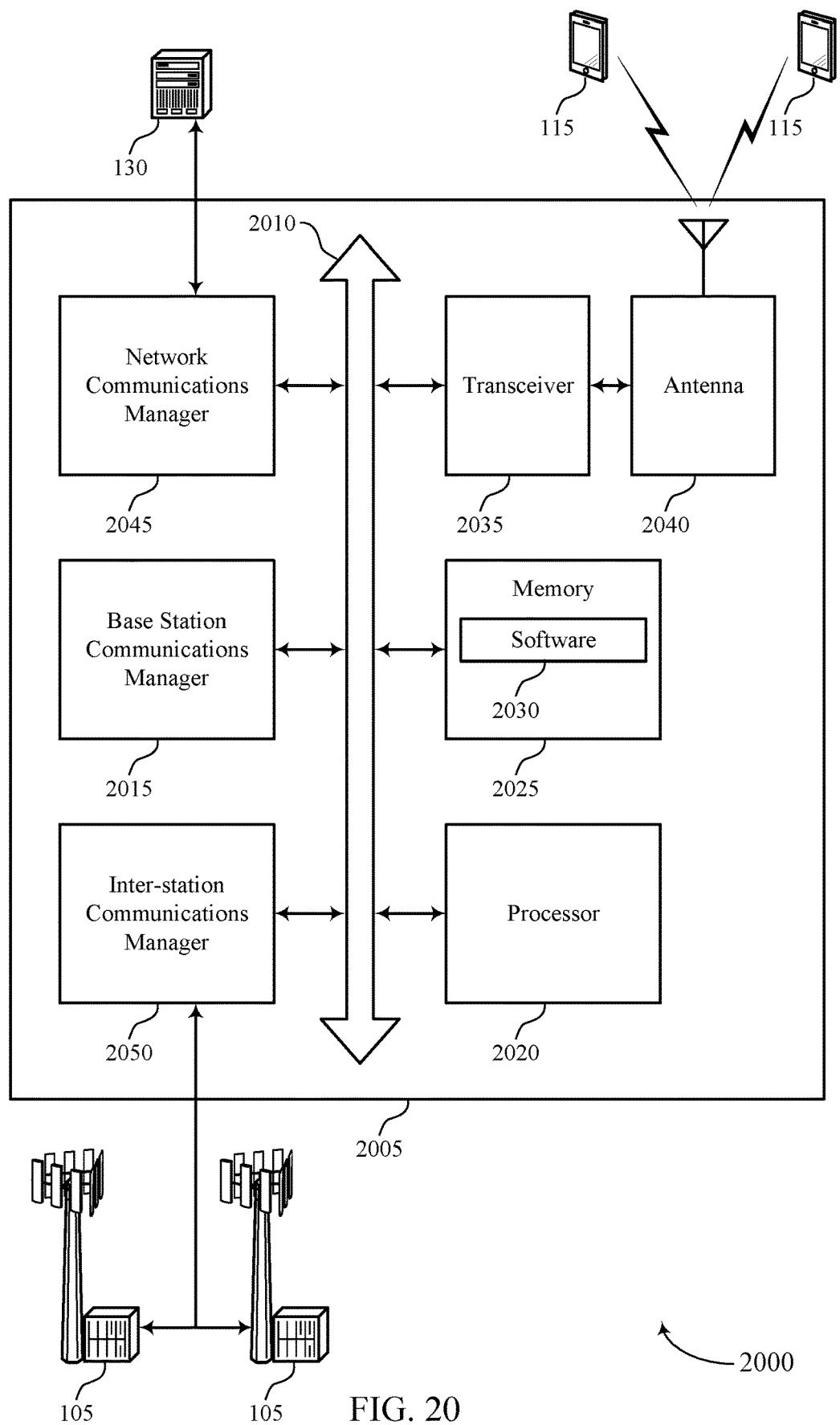
FIG. 20 illustrates a block diagram of a system including a base station that supports techniques for power control using carrier aggregation in wireless communications in accordance with aspects of the present disclosure.

FIG. 20 shows a diagram of a system 2000 including a device 2005 that supports techniques for power control using carrier aggregation in wireless communications in accordance with aspects of the present disclosure. Device 2005 may be an example of or include the components of base station 105 as described above, e.g., with reference to FIG. 1. Device 2005 may include components for bi-directional voice and data communications including components for transmitting and receiving communications, including base station communications manager 2015, processor 2020, memory 2025, software 2030, transceiver 2035, antenna 2040, network communications manager 2045, and inter-station communications manager 2050. These components may be in electronic communication via one or more buses (e.g., bus 2010). Device 2005 may communicate wirelessly with one or more UEs 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting techniques for power control using carrier aggregation in wireless communications).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware or software operation such as the interaction with peripheral components or devices.

Software 2030 may include code to implement aspects of the present disclosure, including code to support techniques for power control using carrier aggregation in wireless communications. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base station 105, and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within an Long Term Evolution (LTE)/LTE-A wireless communication network technology to provide communication between base stations 105.

Figure 21:
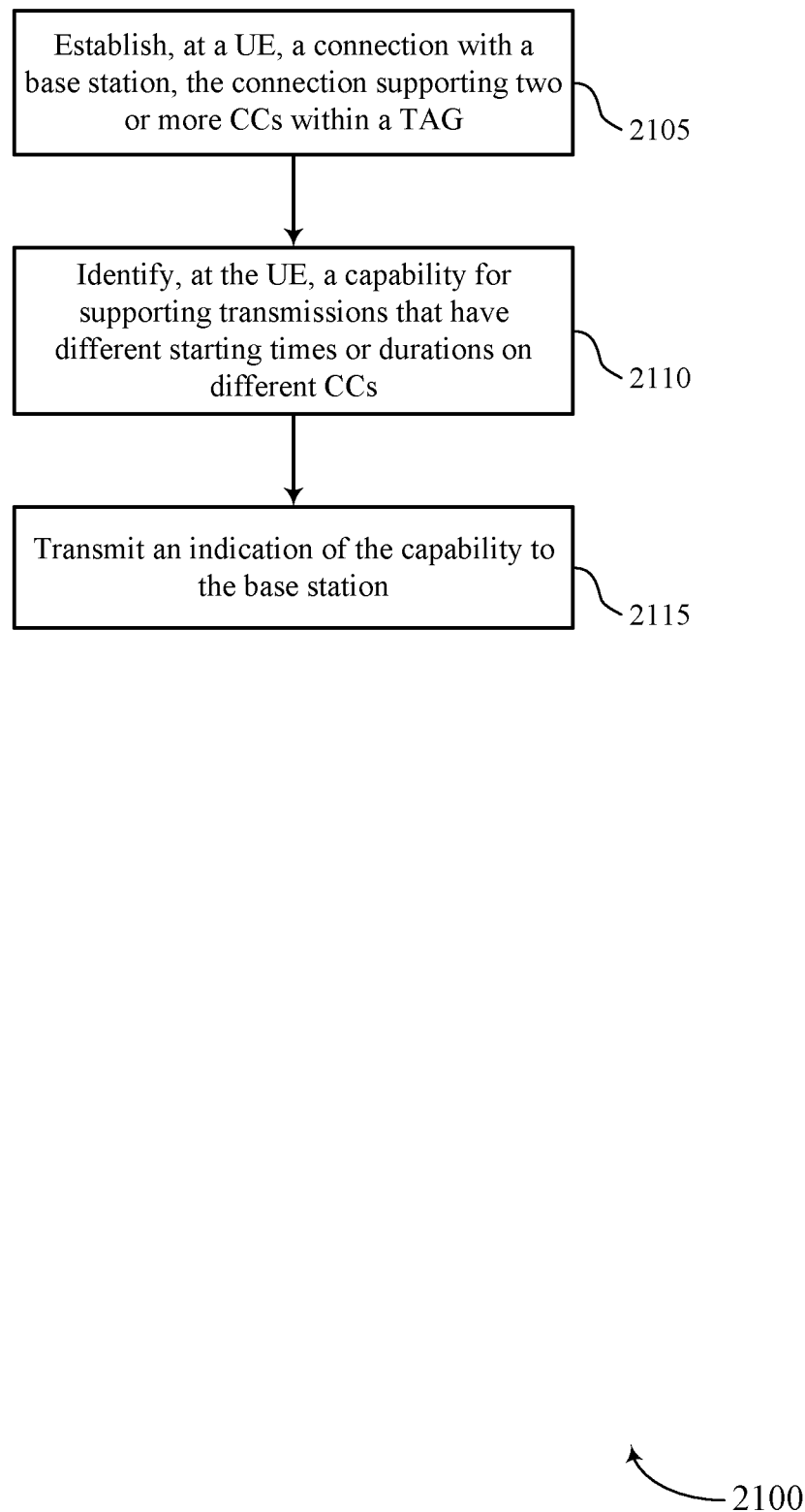
FIGS. 21 through 25 illustrate methods for techniques for power control using carrier aggregation in wireless communications in accordance with aspects of the present disclosure.

FIG. 21 shows a flowchart illustrating a method 2100 for techniques for power control using carrier aggregation in wireless communications in accordance with aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may establish a connection with a base station, the connection supporting two or more CCs within a TAG. The operations of 2105 may be performed according to the methods described herein. In certain examples, aspects of the operations of 2105 may be performed by a connection establishment component as described with reference to FIGS. 13 through 16. In some cases, the connection may be established according to connection establishment techniques in which a UE may request a connection (e.g., via a random access request) with the base station. In some cases, the UE during the connection establishment procedure may indicate that the UE is capable of supporting two or more CCs, and the connection may be established that supports the two or more CCs.

At 2110 the UE 115 may identify a capability for supporting transmissions that have different starting times or durations on different CCs. The operations of 2110 may be performed according to the methods described herein. In certain examples, aspects of the operations of 2110 may be performed by a CC capability component as described with reference to FIGS. 13 through 16. In some cases, the capability for supporting transmissions that have different starting times or durations may be preconfigured at the UE and provided to the base station as part of the connection establishment procedure. In some cases, the UE may determine the capability for supporting transmissions that have different starting times or durations based on conditions at the UE.

At 2115 the UE 115 may transmit an indication of the capability to the base station. The operations of 2115 may be performed according to the methods described herein. In certain examples, aspects of the operations of 2115 may be performed by a CC capability component as described with reference to FIGS. 13 through 16. In some cases, the indication may be provided via RRC signaling as part of the connection establishment procedure.

Figure 22:
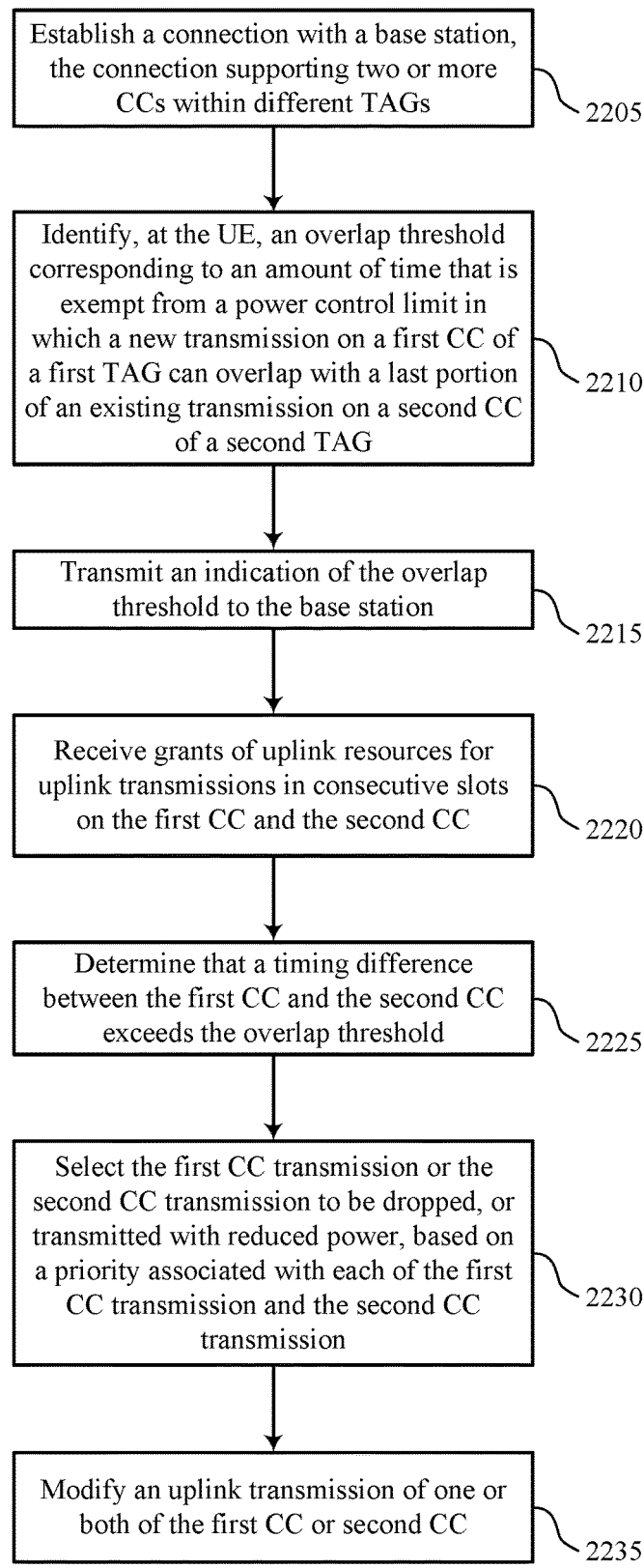

FIG. 22 shows a flowchart illustrating a method 2200 for techniques for power control using carrier aggregation in wireless communications in accordance with aspects of the present disclosure. The operations of method 2200 may be implemented by a UE 115 or its components as described herein. For example, the operations of method 2200 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may establish a connection with a base station, the connection supporting two or more CCs within different TAGs. The operations of 2205 may be performed according to the methods described herein. In certain examples, aspects of the operations of 2205 may be performed by a connection establishment component as described with reference to FIGS. 13 through 16. In some cases, the connection may be established according to connection establishment techniques in which a UE may request a connection (e.g., via a random access request) with the base station. In some cases, the UE during the connection establishment procedure may indicate that the UE is capable of supporting two or more CCs, and the connection may be established that supports the two or more CCs.

At 2210 the UE 115 may identify an overlap threshold corresponding to an amount of time that is exempt from a power control limit in which a new transmission on a first CC of a first TAG can overlap with a last portion of an existing transmission on a second CC of a second TAG. The operations of 2210 may be performed according to the methods described herein. In certain examples, aspects of the operations of 2210 may be performed by a timing advance manager as described with reference to FIGS. 13 through 16. In some cases, the overlap threshold may be preconfigured at the UE and provided to the base station as part of the connection establishment procedure. In some cases, the UE may determine the overlap threshold based on conditions at the UE and signal the overlap threshold to the base station.

At 2215 the UE 115 may transmit an indication of the overlap threshold to the base station. The operations of 2215 may be performed according to the methods described herein. In certain examples, aspects of the operations of 2215 may be performed by a timing advance manager as described with reference to FIGS. 13 through 16. In some cases, the indication may be provided via RRC signaling as part of the connection establishment procedure.

At 2220 the UE 115 may receive grants of uplink resources for uplink transmissions in consecutive slots on the first CC and the second CC. The operations of 2220 may be performed according to the methods described herein. In certain examples, aspects of the operations of 2220 may be performed by a uplink transmission manager as described with reference to FIGS. 13 through 16. In some cases, such grants may be received in DCI from the base station.

At 2225 the UE 115 may determine that a timing difference between the first CC and the second CC exceeds the overlap threshold. The operations of 2225 may be performed according to the methods described herein. In certain examples, aspects of the operations of 2225 may be performed by a timing advance manager as described with reference to FIGS. 13 through 16. In some cases, the UE may make such a determination based on a current value of TAs for each CC, and a timing difference between the TAs in comparison to the overlap threshold.

At 2230 the UE 115 may select the first CC transmission or the second CC transmission to be dropped, or transmitted with reduced power, based at least in part on a priority associated with each of the first CC transmission and the second CC transmission. The operations of 2230 may be performed according to the methods described herein. In certain examples, aspects of the operations of 2230 may be performed by a priority identification component as described with reference to FIGS. 13 through 16. In some cases, the priority of the first CC transmission and second CC transmission may be determined according to a configured priority order for transmissions, and a lower priority transmission may be selected in order to have the higher priority transmission transmitted.

At 2235 the UE 115 may modify an uplink transmission of one or both of the first CC or second CC based at least in part on the timing difference. The operations of 2235 may be performed according to the methods described herein. In certain examples, aspects of the operations of 2235 may be performed by a transmit power control manager as described with reference to FIGS. 13 through 16. In some cases, the modifying may include dropping a first CC transmission that ends at a slot boundary between the consecutive slots, dropping a second CC transmission that starts at the slot boundary, reducing a transmit power of the first CC transmission, the second CC transmission, or both, dropping a last symbol of a the first CC transmission, or dropping a first symbol of the second CC transmission.

Figure 23:
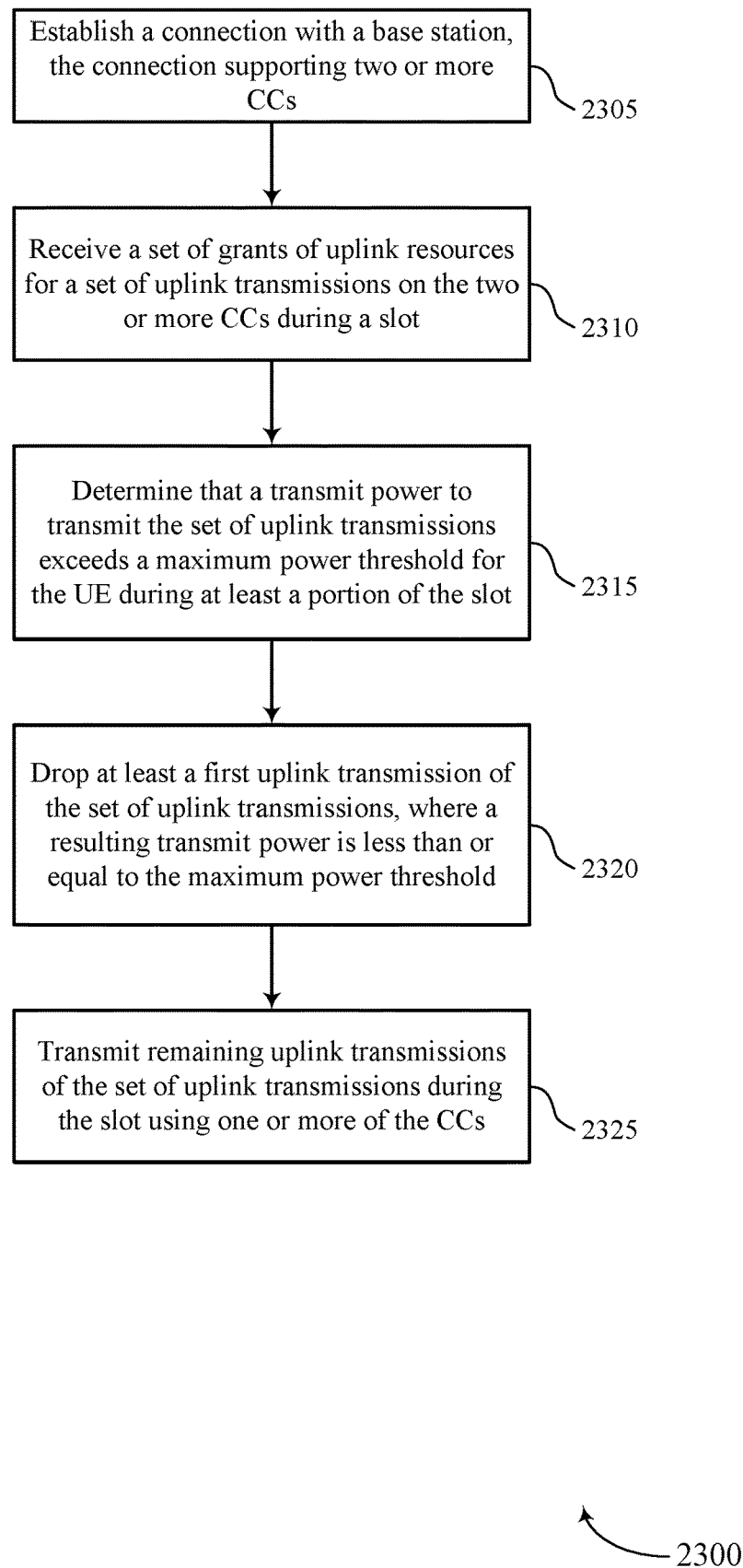

FIG. 23 shows a flowchart illustrating a method 2300 for techniques for power control using carrier aggregation in wireless communications in accordance with aspects of the present disclosure. The operations of method 2300 may be implemented by a UE 115 or its components as described herein. For example, the operations of method 2300 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may establish a connection with a base station, the connection supporting two or more CCs. The operations of 2305 may be performed according to the methods described herein. In certain examples, aspects of the operations of 2305 may be performed by a connection establishment component as described with reference to FIGS. 13 through 16. In some cases, the connection may be established according to connection establishment techniques in which a UE may request a connection (e.g., via a random access request) with the base station. In some cases, the UE during the connection establishment procedure may indicate that the UE is capable of supporting two or more CCs, and the connection may be established that supports the two or more CCs.

At 2310 the UE 115 may receive a plurality of grants of uplink resources for a plurality of uplink transmissions on the two or more CCs during a slot. The operations of 2310 may be performed according to the methods described herein. In certain examples, aspects of the operations of 2310 may be performed by a uplink transmission manager as described with reference to FIGS. 13 through 16. In some cases, the plurality of grants may be received in DCI from the base station.

At 2315 the UE 115 may determine that a transmit power to transmit the plurality of uplink transmissions exceeds a maximum power threshold for the UE during at least a portion of the slot. The operations of 2315 may be performed according to the methods described herein. In certain examples, aspects of the operations of 2315 may be performed by a transmit power control manager as described with reference to FIGS. 13 through 16. In some cases, the determination may be made by summing the transmit power of each overlapping transmission of a symbol to determine a total transmit power for the symbol and comparing the total transmit power to the maximum power threshold.

At 2320 the UE 115 may drop at least a first uplink transmission of the plurality of uplink transmissions, where a resulting transmit power is less than or equal to the maximum power threshold. The operations of 2320 may be performed according to the methods described herein. In certain examples, aspects of the operations of 2320 may be performed by a transmit power control manager as described with reference to FIGS. 13 through 16. In some cases, the UE may drop the first uplink transmission based on a priority associated with the first uplink transmission in comparison to priorities of one or more other uplink transmissions, which may have a higher priority that the priority of the first uplink transmission.

At 2325 the UE 115 may transmit remaining uplink transmissions of the plurality of uplink transmissions during the slot using one or more of the CCs. The operations of 2325 may be performed according to the methods described herein. In certain examples, aspects of the operations of 2325 may be performed by a uplink transmission manager as described with reference to FIGS. 13 through 16. The remaining uplink transmissions may have an aggregate transmit power that is less than the maximum transmit power.

Figure 24:
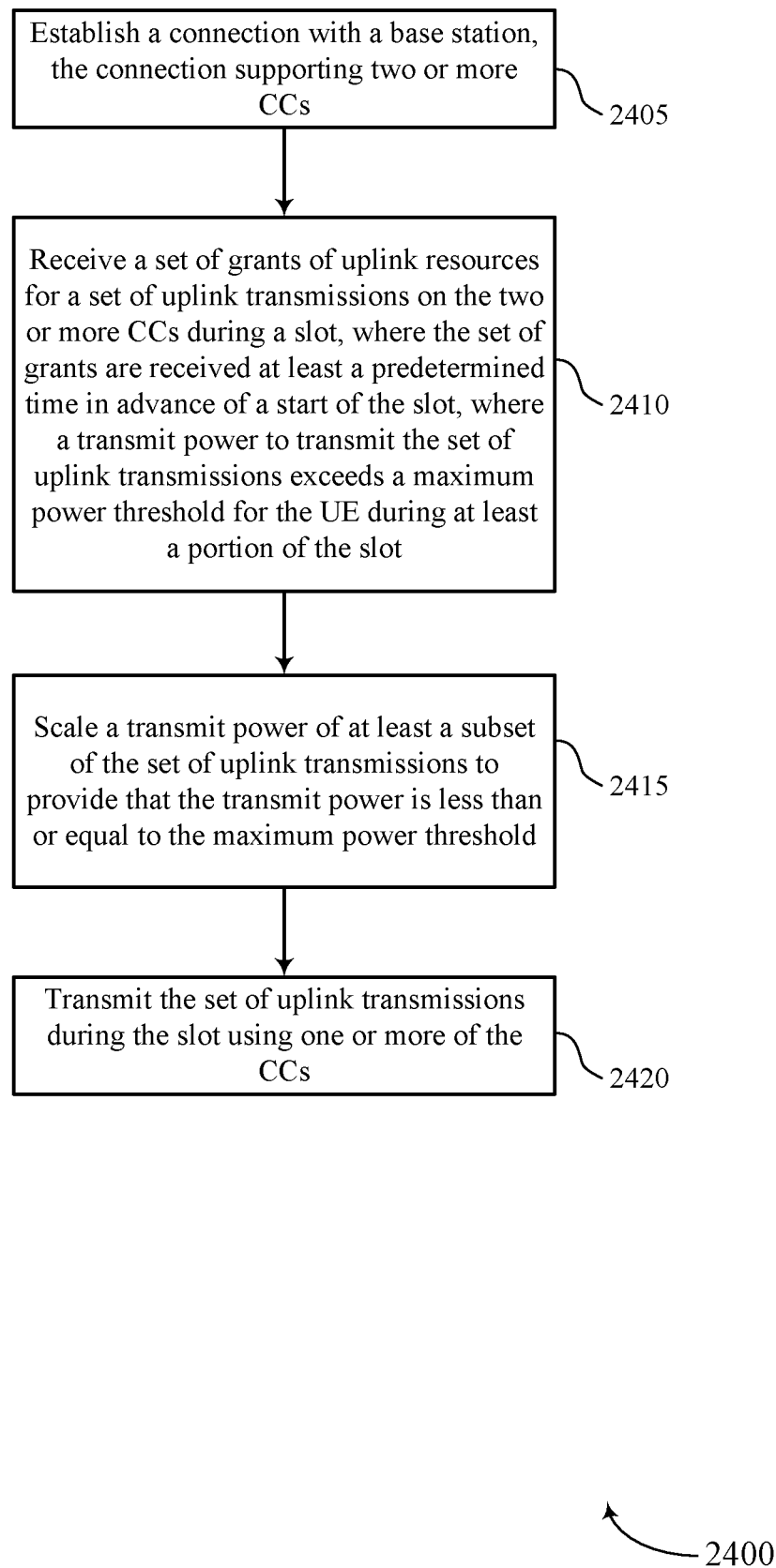

FIG. 24 shows a flowchart illustrating a method 2400 for techniques for power control using carrier aggregation in wireless communications in accordance with aspects of the present disclosure. The operations of method 2400 may be implemented by a UE 115 or its components as described herein. For example, the operations of method 2400 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2405 the UE 115 may establish a connection with a base station, the connection supporting two or more CCs. The operations of 2405 may be performed according to the methods described herein. In certain examples, aspects of the operations of 2405 may be performed by a connection establishment component as described with reference to FIGS. 13 through 16. In some cases, the connection may be established according to connection establishment techniques in which a UE may request a connection (e.g., via a random access request) with the base station. In some cases, the UE during the connection establishment procedure may indicate that the UE is capable of supporting two or more CCs, and the connection may be established that supports the two or more CCs.

At 2410 the UE 115 may receive a plurality of grants of uplink resources for a plurality of uplink transmissions on the two or more CCs during a slot, where a transmit power to transmit the set of uplink transmissions exceeds a maximum power threshold for the UE during at least a portion of the slot. The operations of 2410 may be performed according to the methods described herein. In certain examples, aspects of the operations of 2410 may be performed by a uplink transmission manager as described with reference to FIGS. 13 through 16. In some cases, the plurality of grants are received at least a predetermined time in advance of a start of the slot, such that the UE may perform power control calculations based on uplink transmit powers for uplink transmissions provided by the grants. In some cases, the plurality of grants may be received in DCI from the base station.

At 2415 the UE 115 may scale a transmit power of at least a subset of the plurality of uplink transmissions to provide that the transmit power is less than or equal to the maximum power threshold. The operations of 2415 may be performed according to the methods described herein. In certain examples, aspects of the operations of 2415 may be performed by a power scaling component as described with reference to FIGS. 13 through 16. The UE may scale transmit power, in some cases, based on a priority order of uplink transmissions. In some cases, higher priority transmissions may have little or no power scaling, and lower priority transmissions may have greater power scaling than higher priority transmissions.

At 2420 the UE 115 may transmit the plurality of uplink transmissions during the slot using one or more of the CCs. The operations of 2420 may be performed according to the methods described herein. In certain examples, aspects of the operations of 2420 may be performed by a uplink transmission manager as described with reference to FIGS. 13 through 16. The uplink transmissions may have an aggregate transmit power that is less than or equal to the maximum transmit power.

Figure 25:
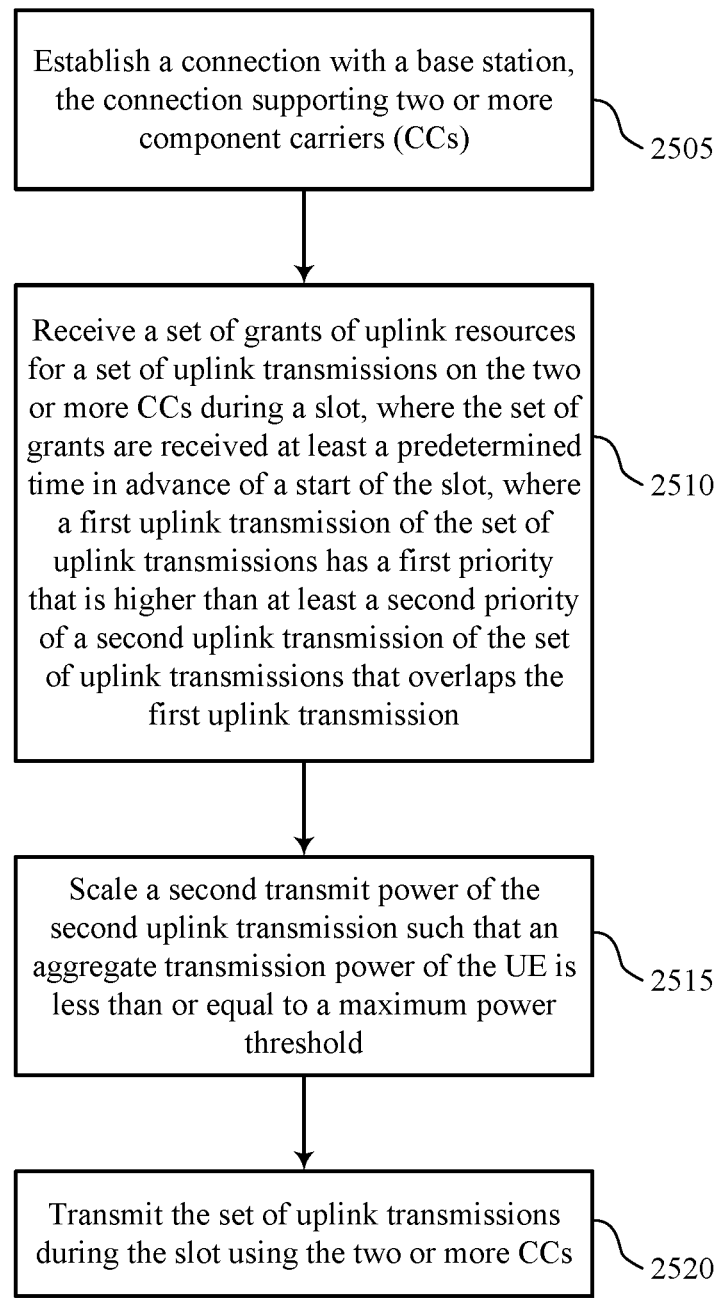

FIG. 25 shows a flowchart illustrating a method 2500 for techniques for power control using carrier aggregation in wireless communications in accordance with aspects of the present disclosure. The operations of method 2500 may be implemented by a UE 115 or its components as described herein. For example, the operations of method 2500 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2505 the UE 115 may establish a connection with a base station, the connection supporting two or more component carriers (CCs). The operations of 2505 may be performed according to the methods described herein. In certain examples, aspects of the operations of 2505 may be performed by a connection establishment component as described with reference to FIGS. 13 through 16. In some cases, the connection may be established according to connection establishment techniques in which a UE may request a connection (e.g., via a random access request) with the base station. In some cases, the UE during the connection establishment procedure may indicate that the UE is capable of supporting two or more CCs, and the connection may be established that supports the two or more CCs.

At 2510 the UE 115 may receive a plurality of grants of uplink resources for a plurality of uplink transmissions on the two or more CCs during a slot, where a first uplink transmission of the set of uplink transmissions has a first priority that is higher than at least a second priority of a second uplink transmission of the set of uplink transmissions that overlaps the first uplink transmission. The operations of 2510 may be performed according to the methods described herein. In certain examples, aspects of the operations of 2510 may be performed by a uplink transmission manager as described with reference to FIGS. 13 through 16. In some cases, the plurality of grants are received at least a predetermined time in advance of a start of the slot, such that the UE may perform power control calculations based on uplink transmit powers for uplink transmissions provided by the grants. In some cases, the plurality of grants may be received in DCI from the base station.

At 2515 the UE 115 may scale a second transmit power of the second uplink transmission such that an aggregate transmission power of the UE is less than or equal to a maximum power threshold. The operations of 2515 may be performed according to the methods described herein. In certain examples, aspects of the operations of 2515 may be performed by a power scaling component as described with reference to FIGS. 13 through 16. In some cases, the second transmit power may be scaled by a ratio that provides that the scaled second transmit power plus the first transmit power is at or below the maximum transmit power threshold.

At 2520 the UE 115 may transmit the plurality of uplink transmissions during the slot using the two or more CCs. The operations of 2520 may be performed according to the methods described herein. In certain examples, aspects of the operations of 2520 may be performed by a uplink transmission manager as described with reference to FIGS. 13 through 16. The uplink transmissions may have an aggregate transmit power that is less than or equal to the maximum transmit power.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    establishing, at a user equipment (UE), a connection with a single network device, the connection supporting two or more component carriers (CCs);
    identifying a plurality of uplink transmissions to transmit on the two or more CCs during a slot, the plurality of uplink transmissions including at least one of a physical random access channel (PRACH) transmission, a physical uplink control channel (PUCCH) transmission, a physical uplink shared channel (PUSCH) transmission, or a sounding reference signal (SRS) transmission; and
    allocating, based on a priority order that is based at least in part on a respective channel type of the plurality of uplink transmissions, a transmit power to the two or more CCs to transmit at least a subset of the plurality of uplink transmissions such that the transmit power does not exceed a maximum power threshold for the UE during at least a portion of the slot that includes the at least one of the PRACH transmission, the PUCCH transmission, the PUSCH transmission, or the SRS transmission.

2. The method of claim 1, wherein the allocating is performed, based on the priority order, by allocating the transmit power to one or more PRACH transmissions before allocating the transmit power to the PUCCH transmission.

3. The method of claim 1, wherein the allocating is performed, based on the priority order, by allocating the transmit power to one or more PRACH transmissions before allocating the transmit power to the PUSCH transmission.

4. The method of claim 1, wherein the allocating is performed, based on the priority order, by allocating the transmit power to one or more PRACH transmissions before allocating the transmit power to the SRS transmission.

5. The method of claim 1, wherein the allocating is performed, based on the priority order, by allocating the transmit power to one or more PUCCH transmissions based at least in part on information included in the PUCCH transmission.

6. The method of claim 5, wherein the allocating is performed, based on the priority order, by allocating the transmit power to one or more PUCCH transmissions including hybrid automatic repeat request (HARQ) information before allocating the transmit power to a PUCCH transmission without HARQ information.

7. The method of claim 5, wherein the allocating is performed, based on the priority order, by allocating the transmit power to one or more PUCCH transmissions including a scheduling request (SR) before allocating the transmit power to a PUCCH transmission without the SR.

8. The method of claim 1, wherein the allocating is performed, based on the priority order, by allocating the transmit power to one or more PUCCH transmissions before allocating the transmit power to the SRS transmission.

9. The method of claim 1, wherein the allocating is performed, based on the priority order, by allocating the transmit power to one or more PUSCH transmissions based at least in part on information included in the one or more PUSCH transmissions.

10. The method of claim 9, wherein the allocating is performed, based on the priority order, by allocating the transmit power to one or more first PUSCH transmissions including hybrid automatic repeat request (HARQ) information before allocating the transmit power to a second PUSCH transmission without HARQ information.

11. The method of claim 9, wherein the allocating is performed, based on the priority order, by allocating the transmit power to one or more first PUSCH transmissions including a scheduling request (SR) before allocating the transmit power to a second PUSCH transmission without the SR.

12. The method of claim 1, wherein the allocating is performed, based on the priority order, by allocating the transmit power to one or more PUSCH transmissions before allocating the transmit power to the SRS transmission.

13. The method of claim 1, wherein the allocating is performed, based on the priority order, by allocating the transmit power to one or more PUCCH transmissions including a first information type and one or more PUSCH transmissions including the first information type with a same priority.

14. The method of claim 13, wherein the allocating is performed, based on the priority order, by allocating the transmit power to one or more PUCCH transmissions including hybrid automatic repeat request (HARQ) information and one or more PUSCH transmissions including HARQ information with the same priority.

15. The method of claim 13, wherein the allocating is performed, based on the priority order, by allocating the transmit power to one or more PUCCH transmissions including a scheduling request and one or more PUSCH transmissions including a scheduling request with the same priority.

16. The method of claim 1, further comprising:
scaling a second transmit power of at least one uplink transmission of the subset of the plurality of uplink transmissions to fit in an amount of transmit power remaining after allocating the transmit power to the two or more CCs.

17. The method of claim 1, further comprising:
dropping at least one transmission of the subset of the plurality of uplink transmissions so that other transmissions of the subset of the plurality of uplink transmissions are fully allocated the transmit power.

18. An apparatus for wireless communication, comprising:
a processor;
memory in electronic communication with the processor; and instructions stored in the memory and executable by the processor to cause the apparatus to:
establish a connection with a single network device, the connection supporting two or more component carriers (CCs);
identify a plurality of uplink transmissions to transmit on the two or more CCs during a slot, the plurality of uplink transmissions including at least one of a physical random access channel (PRACH) transmission, a physical uplink control channel (PUCCH) transmission, a physical uplink shared channel (PUSCH) transmission, or a sounding reference signal (SRS) transmission; and
allocate, based on a priority order that is based at least in part on a respective channel type of the plurality of uplink transmissions, a transmit power to the two or more CCs to transmit at least a subset of the plurality of uplink transmissions such that the transmit power does not exceed a maximum power threshold for the UE during at least a portion of the slot that includes the at least one of the PRACH transmission, the PUCCH transmission, the PUSCH transmission, or the SRS transmission.

19. The apparatus of claim 18, wherein the instructions are further executable by the processor to cause the apparatus to:
allocate, based on the priority order, the transmit power to one or more PRACH transmissions before allocating the transmit power to the PUCCH transmission.

20. The apparatus of claim 18, wherein the instructions are further executable by the processor to cause the apparatus to:
allocate, based on the priority order, the transmit power to one or more PRACH transmissions before allocating the transmit power to the PUSCH transmission.

21. The apparatus of claim 18, wherein the instructions are further executable by the processor to cause the apparatus to:
allocate, based on the priority order, the transmit power to one or more PRACH transmissions before allocating the transmit power to the SRS transmission.

22. The apparatus of claim 18, wherein the instructions are further executable by the processor to cause the apparatus to:
allocate, based on the priority order, the transmit power to one or more PUCCH transmissions based at least in part on information included in the one or more PUCCH transmission.

23. The apparatus of claim 22, wherein the instructions are further executable by the processor to cause the apparatus to:
allocate, based on the priority order, the transmit power to one or more first PUCCH transmissions including hybrid automatic repeat request (HARQ) information before allocating the transmit power to a second PUCCH transmission without HARQ information.

24. The apparatus of claim 22, wherein the instructions are further executable by the processor to cause the apparatus to:
allocate, based on the priority order, the transmit power to one or more first PUCCH transmissions including a scheduling request (SR) before allocating transmit power to a second PUCCH transmission without the SR.

25. The apparatus of claim 18, wherein the instructions are further executable by the processor to cause the apparatus to:
allocate, based on the priority order, the transmit power to one or more PUCCH transmissions before allocating the transmit power to the SRS transmission.

26. The apparatus of claim 18, wherein the instructions are further executable by the processor to cause the apparatus to:
allocate, based on the priority order, the transmit power to one or more PUSCH transmissions based at least in part on information included in the one or more PUSCH transmissions.

27. The apparatus of claim 26, wherein the instructions are further executable by the processor to cause the apparatus to:
allocate, based on the priority order, the transmit power to one or more first PUSCH transmissions including hybrid automatic repeat request (HARQ) information before allocating the transmit power to a second PUSCH transmission without HARQ information.

28. The apparatus of claim 26, wherein the instructions are further executable by the processor to cause the apparatus to:
allocate, based on the priority order, the transmit power transmit power to one or more first PUSCH transmissions including a scheduling request (SR) before allocating the transmit power to a second PUSCH transmission without the SR.

29. The apparatus of claim 18, wherein the instructions are further executable by the processor to cause the apparatus to:
allocate, based on the priority order, the transmit power to one or more PUSCH transmissions before allocating the transmit power to the SRS transmission.

30. The apparatus of claim 18, wherein the instructions are further executable by the processor to cause the apparatus to:
allocate, based on the priority order, the transmit power to one or more PUCCH transmissions including a first information type and one or more PUSCH transmissions including the first information type with a same priority.

31. The apparatus of claim 30, wherein the instructions are further executable by the processor to cause the apparatus to:
allocate, based on the priority order, the transmit power to one or more PUCCH transmissions including hybrid automatic repeat request (HARQ) information and one or more PUSCH transmissions including HARQ information with the same priority.

32. The apparatus of claim 30, wherein the instructions are further executable by the processor to cause the apparatus to:
allocate, based on the priority order, the transmit power to one or more PUCCH transmissions including a scheduling request and one or more PUSCH transmissions including a scheduling request with the same priority.

33. The apparatus of claim 18, wherein the instructions are further executable by the processor to cause the apparatus to:
scale a second transmit power of at least one uplink transmission of the subset of the plurality of uplink transmissions to fit in an amount of transmit power remaining after allocating the transmit power to the two or more CCs.

34. The apparatus of claim 18, wherein the instructions are further executable by the processor to cause the apparatus to:
drop at least one transmission of the subset of the plurality of uplink transmissions so that other transmissions of the subset of the plurality of uplink transmissions are fully allocated the transmit power.

35. An apparatus for wireless communication, comprising:
means for establishing a connection with a n single network device, the connection supporting two or more component carriers (CCs);
means for identifying a plurality of uplink transmissions to transmit on the two or more CCs during a slot, the plurality of uplink transmissions including at least one of a physical random access channel (PRACH) transmission, a physical uplink control channel (PUCCH) transmission, a physical uplink shared channel (PUSCH) transmission, or a sounding reference signal (SRS) transmission; and
means for allocating, based on a priority order that is based at least in part on a respective channel type of the plurality of uplink transmissions, a transmit power to the two or more CCs to transmit at least a subset of the plurality of uplink transmissions such that the transmit power does not exceed a maximum power threshold for the UE during at least a portion of the slot that includes the at least one of the PRACH transmission, the PUCCH transmission, the PUSCH transmission, or the SRS transmission.

36. A non-transitory computer-readable medium storing code for wireless communication, the code comprising instructions executable by a processor to:
establish, at a user equipment (UE), a connection with a single network device, the connection supporting two or more component carriers (CCs);
identify a plurality of uplink transmissions to transmit on the two or more CCs during a slot, the plurality of uplink transmissions including at least one of a physical random access channel (PRACH) transmission, a physical uplink control channel (PUCCH) transmission, a physical uplink shared channel (PUSCH) transmission, or a sounding reference signal (SRS) transmission; and
allocate, based on a priority order that is based at least in part on a respective channel type of the plurality of uplink transmissions, a transmit power to the two or more CCs to transmit at least a subset of the plurality of uplink transmissions such that the transmit power does not exceed a maximum power threshold for the UE during at least a portion of the slot that includes the at least one of the PRACH transmission, the PUCCH transmission, the PUSCH transmission, or the SRS transmission.

\* \* \* \* \*